(12) United States Patent
Su et al.

(10) Patent No.: US 12,548,130 B2
(45) Date of Patent: Feb. 10, 2026

(54) IMAGE ENHANCEMENT VIA GLOBAL AND LOCAL RESHAPING

(71) Applicant: Dolby Laboratories Licensing Corporation, San Francisco, CA (US)

(72) Inventors: Guan-Ming Su, Fremont, CA (US); Harshad Kadu, Santa Clara, CA (US); Per Jonas Andreas Klittmark, Mountain View, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 288 days.

(21) Appl. No.: 18/262,611

(22) PCT Filed: Jan. 26, 2022

(86) PCT No.: PCT/US2022/013941
§ 371 (c)(1),
(2) Date: Jul. 24, 2023

(87) PCT Pub. No.: WO2022/164929
PCT Pub. Date: Aug. 4, 2022

(65) Prior Publication Data
US 2024/0095893 A1    Mar. 21, 2024

Related U.S. Application Data

(60) Provisional application No. 63/142,270, filed on Jan. 27, 2021.

(30) Foreign Application Priority Data

Jan. 27, 2021    (EP) ..................................... 21153722

(51) Int. Cl.
*G06T 5/90*    (2024.01)
*G06V 10/60*    (2022.01)

(52) U.S. Cl.
CPC ................ *G06T 5/90* (2024.01); *G06V 10/60* (2022.01); *G06T 2207/20208* (2013.01)

(58) Field of Classification Search
CPC ............ G06T 5/90; G06T 2207/20208; G06T 5/92; G06T 5/94; G06V 10/60
See application file for complete search history.

(56) References Cited

U.S. PATENT DOCUMENTS

| 10,080,026 B2 | 9/2018 | Su |
| 11,388,408 B2 | 7/2022 | Kadu |

(Continued)

FOREIGN PATENT DOCUMENTS

| JP | 2017502602 A | 1/2017 |
| WO | 2018005705 A1 | 1/2018 |

(Continued)

OTHER PUBLICATIONS

ITU-R BT.1886 "Reference Electro-Optical Transfer Function for Flat Panel Displays Used in HDTV Studio Production" Mar. 2011.

(Continued)

*Primary Examiner* — Gregory A Morse
*Assistant Examiner* — Rohan Tejas Mukundhan

(57) ABSTRACT

A first reshaping mapping is performed on a first image represented in a first domain to generate a second image represented in a second domain. The first domain is of a first dynamic range different from a second dynamic range of which the second domain is. A second reshaping mapping is performed on the second image represented in the second domain to generate a third image represented in the first domain. The third image is perceptually different from the first image in at least one of: global contrast, global saturation, local contrast, local saturation, etc. A display image is derived from the third image and rendered on a display device.

14 Claims, 18 Drawing Sheets

(56) References Cited

U.S. PATENT DOCUMENTS

| | | |
|---|---|---|
| 2016/0328830 A1* | 11/2016 | Pouli .................. G06T 5/94 |
| 2019/0320191 A1 | 10/2019 | Song |
| 2022/0408081 A1 | 12/2022 | Su |
| 2023/0156343 A1 | 5/2023 | Su |
| 2023/0164366 A1 | 5/2023 | Su |
| 2023/0300381 A1 | 9/2023 | Guan-Ming |
| 2023/0308667 A1 | 9/2023 | Gadgil |

FOREIGN PATENT DOCUMENTS

| | | | | |
|---|---|---|---|---|
| WO | WO-2020072651 A1 * | 4/2020 | ............ | G06T 5/009 |
| WO | WO-2020117603 A1 * | 6/2020 | ............ | H04N 19/98 |
| WO | 2022072884 A1 | 4/2022 | | |

OTHER PUBLICATIONS

ITU-R BT.2100-0, "Image Parameter Values for High Dynamic Range Television for Use in Production and International Programme Exchange" Jul. 2016.

SMPTE ST 2084:2014 "High Dynamic Range Electro-Optical Transfer Function of Mastering Reference Displays".

* cited by examiner

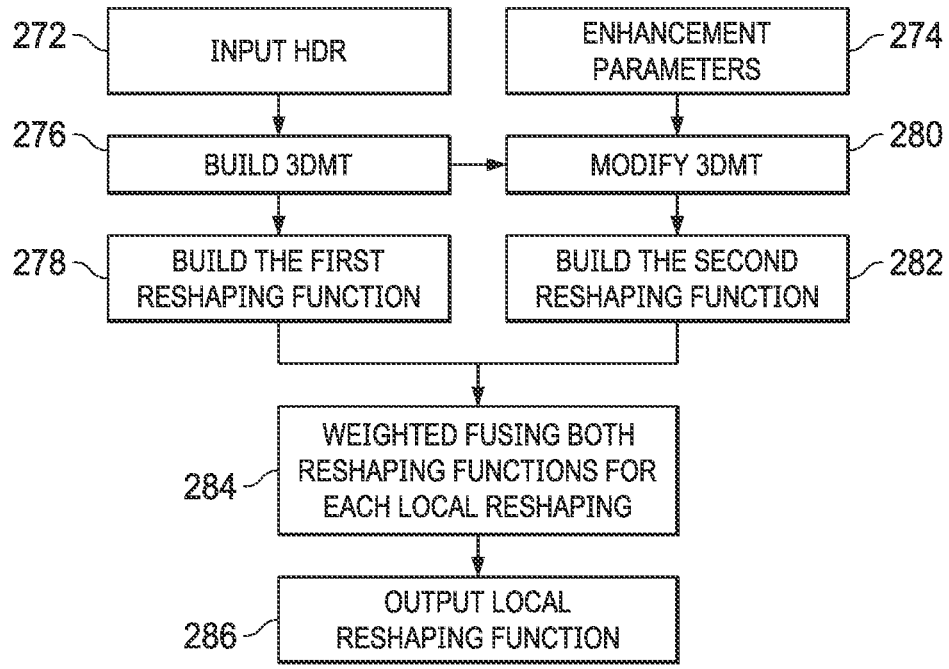
FIG. 2P
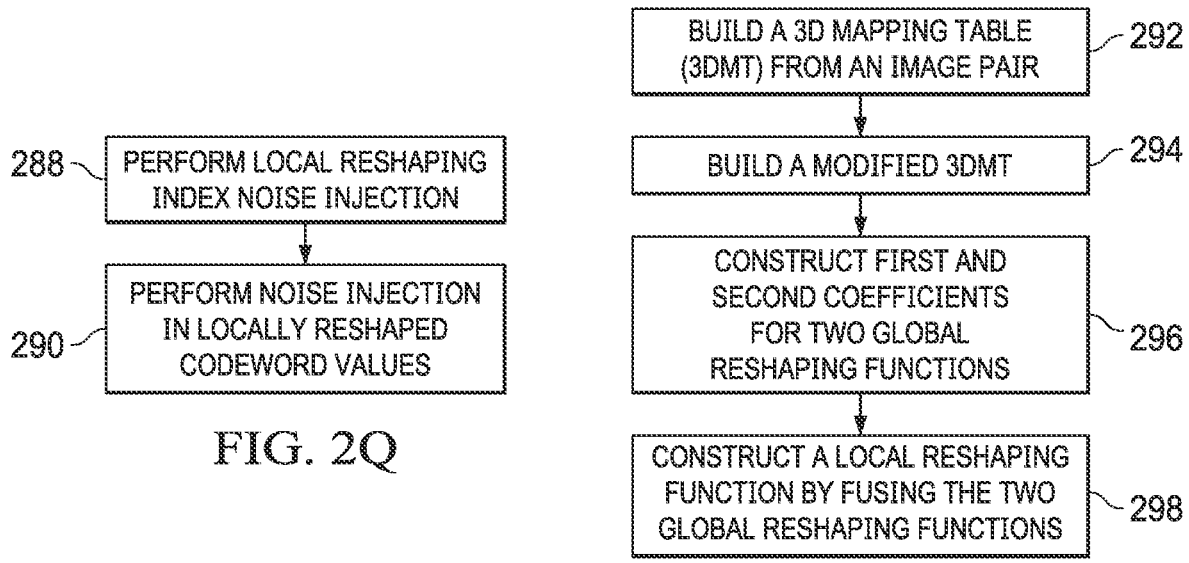
FIG. 2Q
FIG. 2R

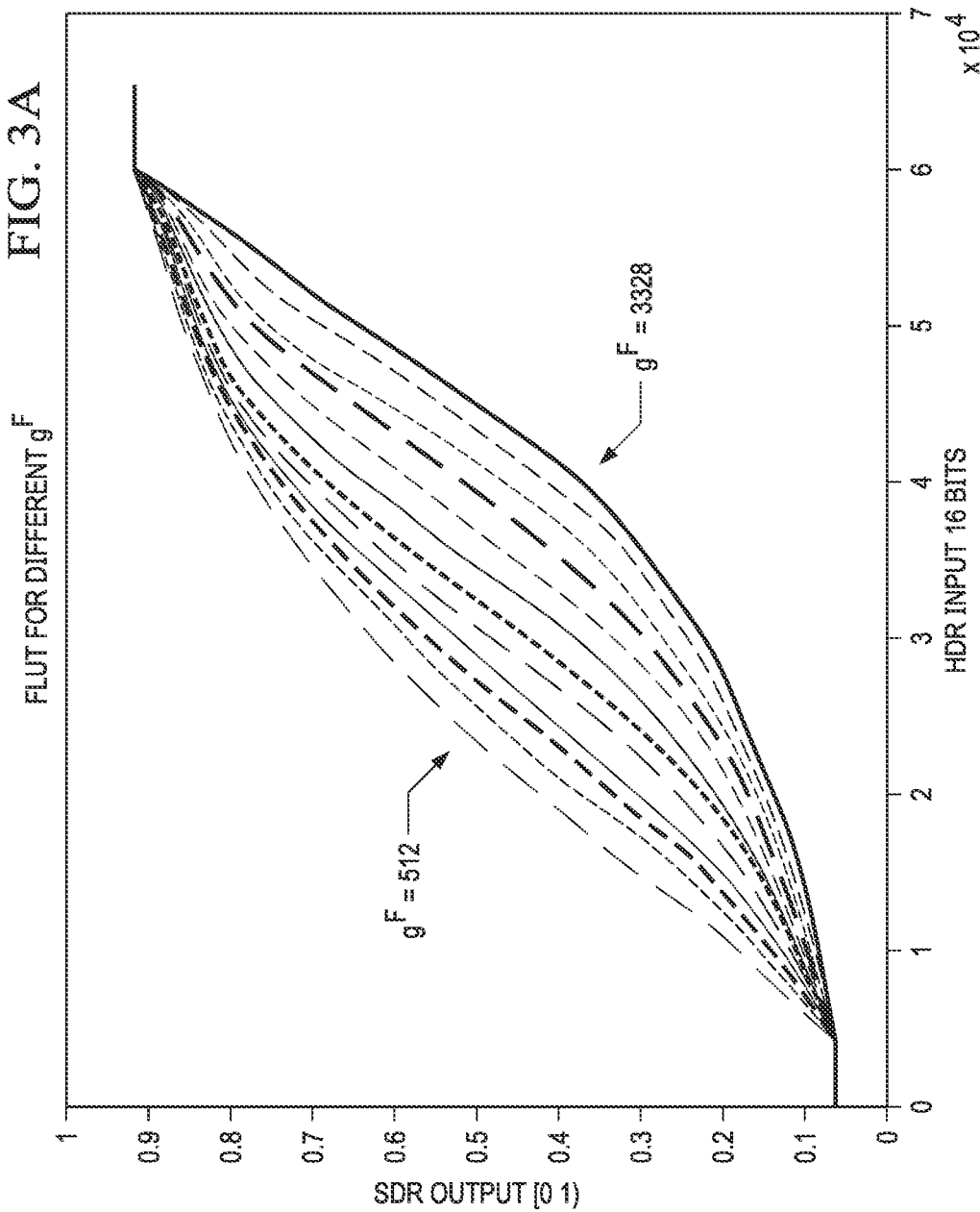

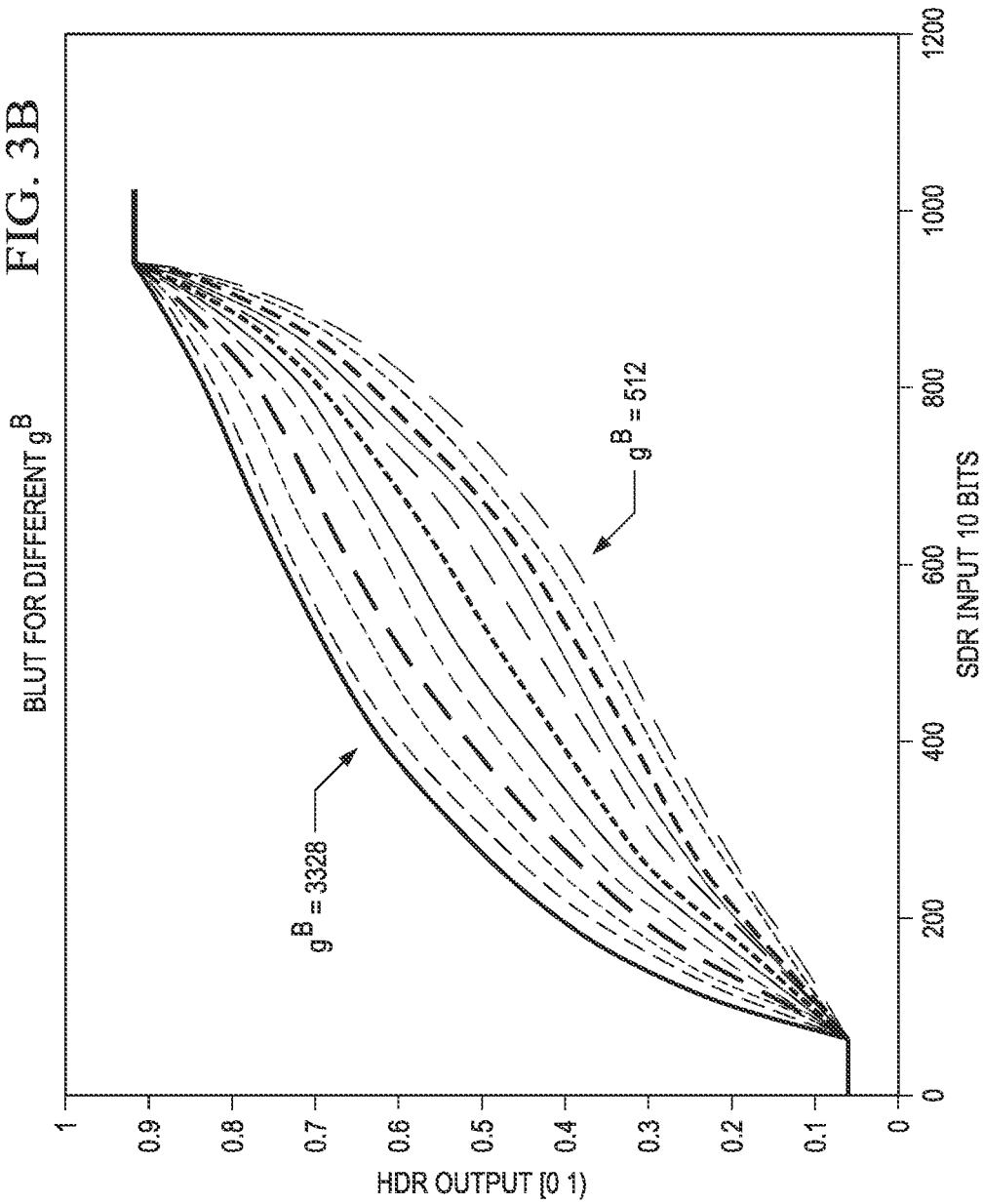

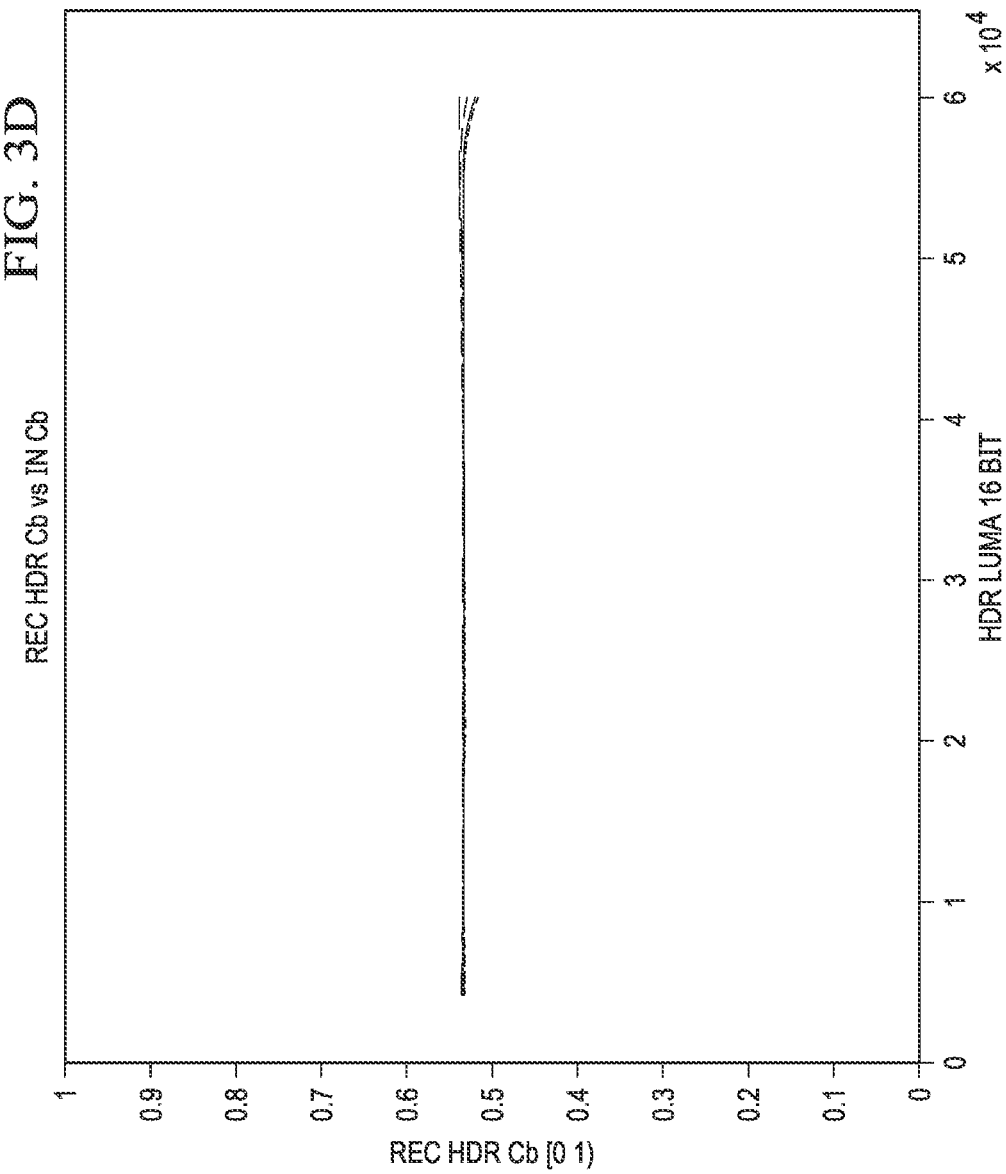

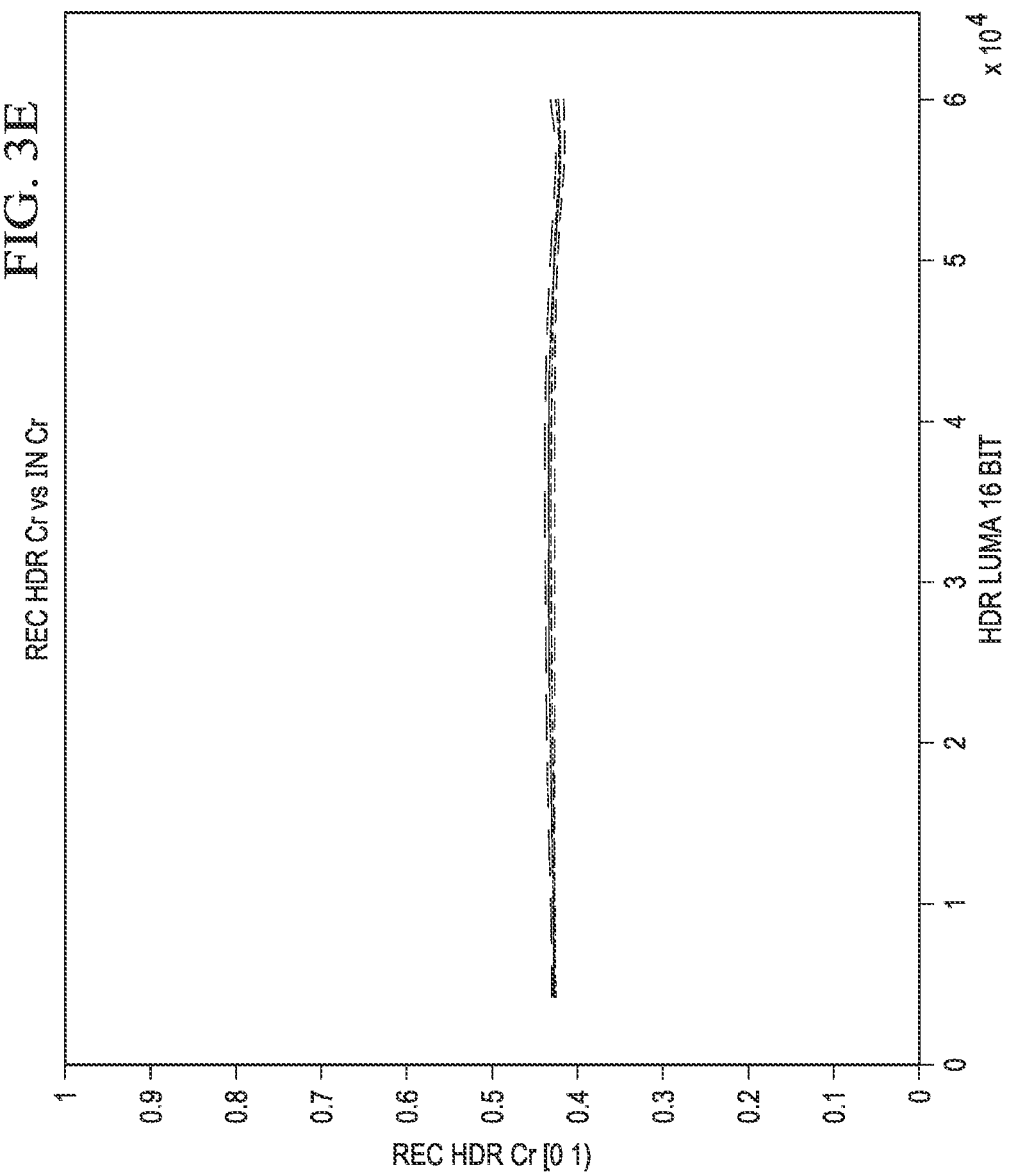

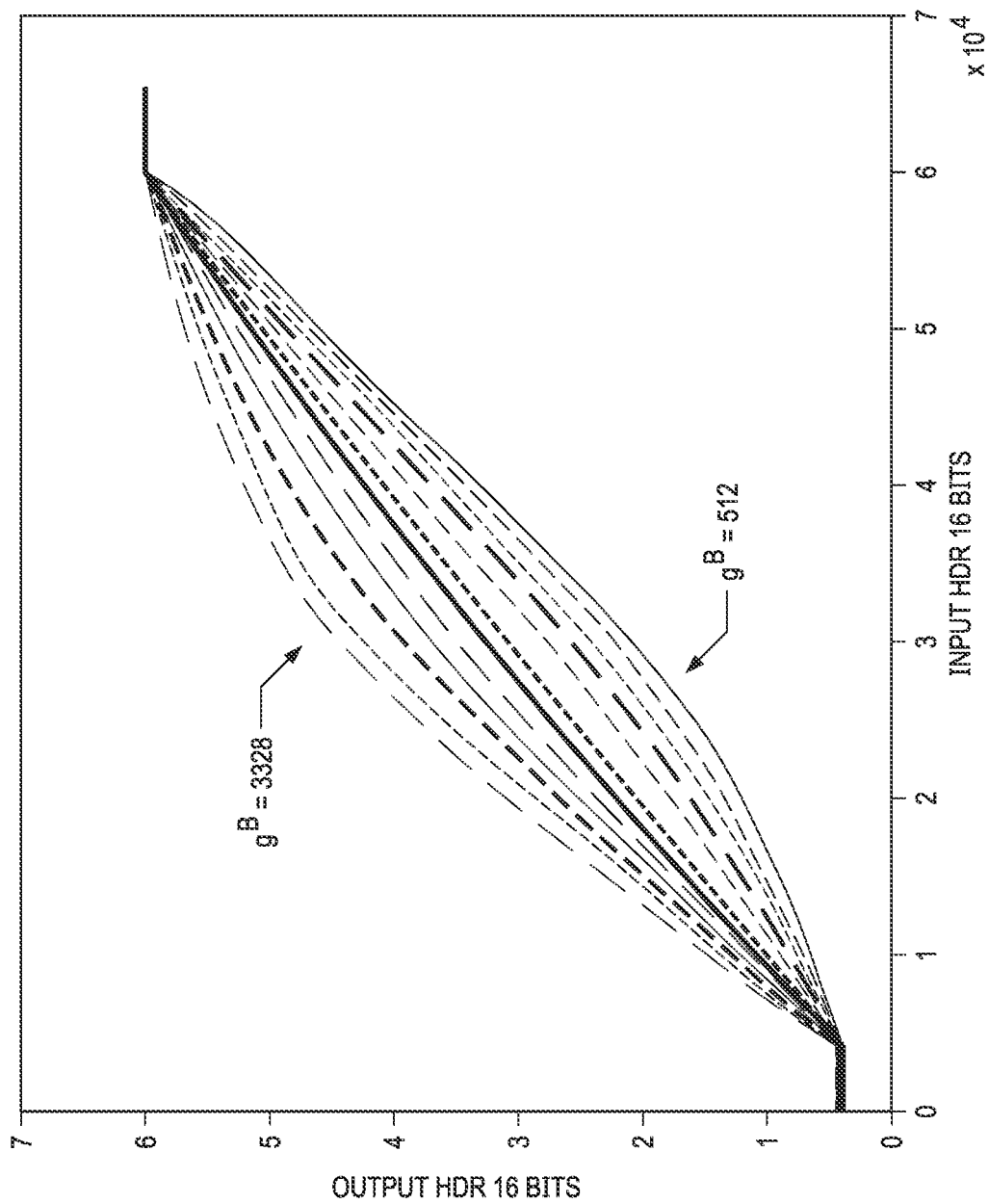

IMAGE ENHANCEMENT VIA GLOBAL AND LOCAL RESHAPING

CROSS-REFERENCE TO RELATED APPLICATIONS

This application is a U.S. National Stage application under U.S.C. 371 of International Application No. PCT/US2022/013941, filed on Jan. 26, 2022, which claims priority to U.S. Provisional Application No. 63/142,270 and European Patent Application No. 21153722.0, both filed on Jan. 27, 2021, each of which is incorporated by reference in its entirety.

TECHNOLOGY

The present disclosure relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. While perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE 2084 and Rec. ITU-R BT.2100, "Image parameter values for high dynamic range television for use in production and international programme exchange," (06/2017). As appreciated by the inventors here, improved techniques for converting input video content data to output video content with high dynamic range, high local contrast and vivid color are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not by way of limitation, in the figures of the accompanying drawings and in which like reference numerals refer to similar elements and in which:

FIG. 2N through FIG. 2P illustrate example flows for cross-channel local function generation; FIG. 2Q illustrates an example flow for local reshaping function selection dithering; FIG. 2R through FIG. 2T illustrate example mappings flows for generating coefficients for chroma local reshaping functions;

FIG. 3A illustrates example indexed luma global forward reshaping functions; FIG. 3B illustrates example indexed luma global backward reshaping functions; FIG. 3D and FIG. 3E illustrate example chroma codeword mappings each using a pair of global forward and backward reshaping functions with the same index value; FIG. 3G illustrates example luma backward functions with different index values.

DESCRIPTION OF EXAMPLE EMBODIMENTS

Figure 1:
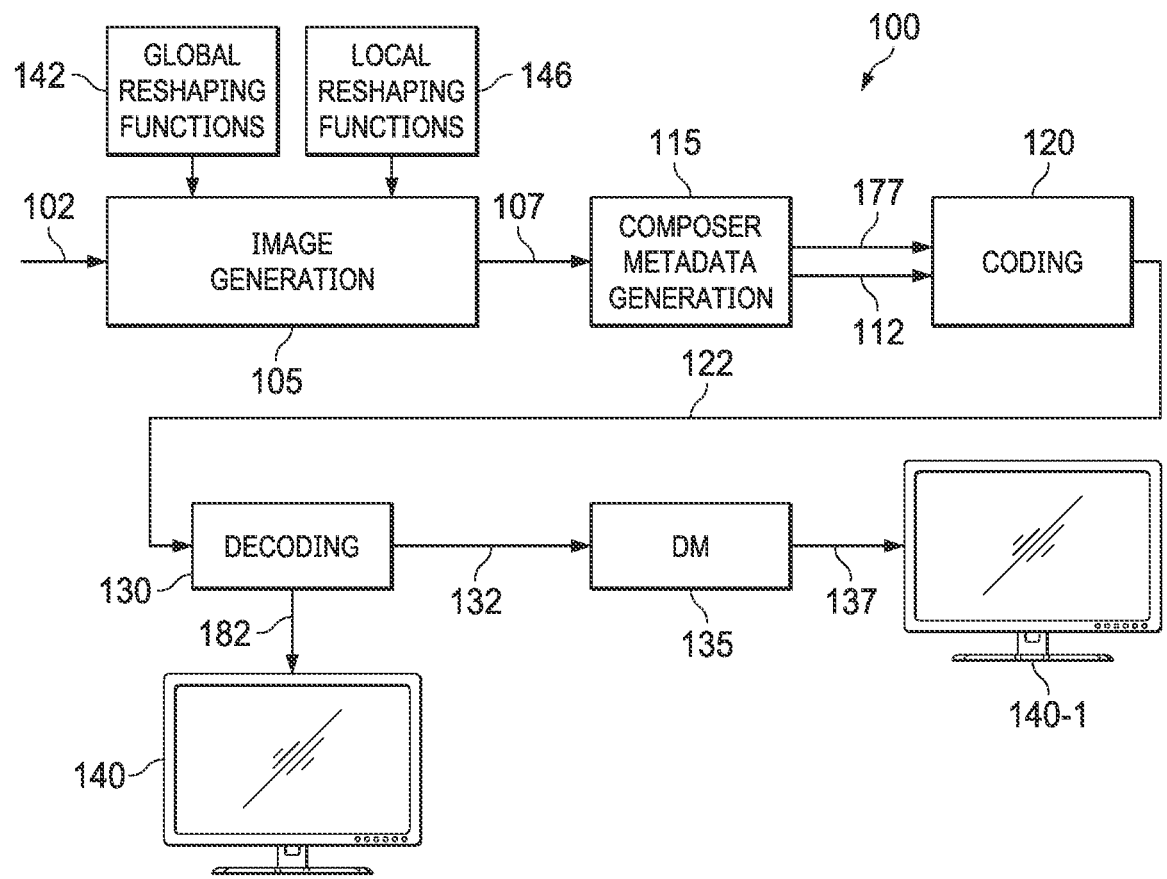
FIG. 1 depicts an example process of a video delivery pipeline.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

Summary

Forward or backward reshaping techniques as described herein can be implemented to reshape or convert input image data into output image data. Example reshaping or conversion operations may include a combination of one or more of: local reshaping operations, global reshaping operations, local forward reshaping operations, global forward reshaping operations, local backward reshaping operations, global backward reshaping operations, a combination of the foregoing, etc.

Global reshaping refers to conversion or reshaping operations that applies the same global (forward and/or backward) reshaping function/mapping to all pixels of an input image to generate a corresponding output image—such as a (e.g., forward, backward, circularly, etc.) reshaped image—depicting the same visual semantic content as the input image.

In contrast with global reshaping that applies the same reshaping function or mapping to all pixels of the input image, local reshaping refers to conversion or reshaping operations that apply different (forward and/or backward) reshaping functions or mappings to different pixels of the input image. Thus, in local reshaping, a first reshaping function applied to a first pixel of the input image may be a different function from a second reshaping function applied to a second different pixel of the input image.

Example global reshaping operations are described in U.S. Provisional Patent Application Ser. No. 62/136,402, filed on Mar. 20, 2015, (also published on Jan. 18, 2018, as U.S. Patent Application Publication Ser. No. 2018/0020224), and PCT Application Ser. No. PCT/US2019/031620, filed on May 9, 2019; PCT Application Ser. No. PCT/US2019/063796, "Interpolation of Reshaping Functions," filed on Nov. 27, 2019, also published, on Jun. 11, 2020, as WO 2020/117603; U.S. Provisional Patent Application Ser. No., 63/013,063, "Reshaping functions for HDR imaging with continuity and reversibility constraints," by G-M. Su, filed on Apr. 21, 2020; and U.S. Provisional Patent Application Ser. No. 63/013,807 "Iterative optimization of reshaping functions in single-layer HDR image codec," by G-M. Su and H. Kadu, filed on Apr. 22, 2020, the entire contents of all of which are hereby incorporated by reference as if fully set forth herein. Example local reshaping operations are described in U.S. Provisional Patent Application Ser. No. 63/086,699, filed on Oct. 2, 2020, their entire contents of which are hereby incorporated by reference as if fully set forth herein.

Reshaping techniques as described herein can be used to implement a unified image enhancement method to select, combine and/or mix various global and/or local reshaping operations to generate a reshaped or reconstructed image with better image qualities as compare with an input image used to generate the reshaped or reconstructed image.

For example, while HDR video provides a significant better viewing experience than counterpart SDR video in TV viewing applications, the HDR video may show a much subdued viewing experience comparable or similar to the counterpart SDR video in mobile device viewing applications.

Under techniques as described herein, HDR images in HDR video can be further enhanced in addition to existing SDR-to-HDR dynamic range enhancement. The further enhanced HDR images can look much more compelling than SDR images in the counterpart SDR video in TV viewing applications as well as in mobile device viewing applications. Additionally, optionally or alternatively, even for SDR video such as those carried in an SDR backward compatible video signal or a base layer of a layered video signal, SDR images in the SDR video can be enhanced with better local contrast and/or saturation to enrich or improve base layer viewing experience.

As used herein, "circular reshaping" or "circularly reshaped" refers to a combination of forward and backward reshaping.

Circular reshaping composed of global reshaping operations may be categorized into paired and unpaired forward/backward reshaping. An input image received by paired forward/backward global reshaping operations can be (e.g., fully, faithfully, subject to quantization errors, etc.) reconstructed with an output image generated by the paired forward/backward global reshaping operations. Brightness, tone, and/or saturation of an input image received by unpaired forward/backward global reshaping operations can be adjusted with an output image generated by the unpaired forward/backward global reshaping operations.

Local reshaping operations such as forward, backward and/or circular local reshaping may not be categorized into paired/unpaired category. Regardless of whether there exists a correspondence or relationship between local forward reshaping operations and local backward reshaping operations, the local forward reshaping operations and the local backward reshaping operations may not be used as a pair to generate a reconstruct image that is the (e.g., fully, faithfully, subject to quantization errors, etc.) same as an input image used to generate the reconstructed image by the local forward reshaping operations and the local backward reshaping operations.

Local reshaping operations as described herein, whether paired or unpaired, nevertheless can be used to increase the local contrast ratio and saturation and achieve a better local look in a reshaped and/or reconstructed image generated by the local reshaping operations.

In some operational scenarios, incoming image metadata as received with an input image from an image source (e.g., an upstream encoder, a media content server, a media streaming server, a production studio, etc.) is to be preserved or largely undisturbed in outgoing image metadata of an output video signal encoded with a reshaped or reconstructed image generated by reshaping operations as described herein.

Unpaired global reshaping operations might change codeword statistics or distributions in the output image too much in reference to the input image, thereby invalidating the incoming image metadata in part or in while or at least causing inaccuracies to the outgoing image metadata due to the change of codeword statistics or distributions by the unpaired global reshaping operations. In some operational scenarios, local reshaping operations can be applied in whole or in part—instead of the unpaired global reshaping operations—to minimize or reduce changes in codeword statistics/distributions in the output image in reference to the input image, thereby maintaining validity and/or accuracies of the incoming image metadata. As a result, some or all of the incoming image metadata can be preserved or undisturbed in the outgoing image metadata of the output video signal encoded with the output image.

Depending on use cases, different combinations of global/local reshaping functions/operations to enhance an image, for example generate an output image with a better look in terms of contrast ratio, tone and/or saturation than an input image received by the reshaping functions/operations.

A variety of methods can be used to generate reshaping functions as described herein. For example, local reshaping functions may be generated without limitation by using one or more of: (1) a self-derived method, (2) a pre-built method, (3) a hybrid method combing the self-derived method and the pre-built method, and so forth. Some or all of these methods can be deployed in an on-line/real-time reshaping use case, an off-line/non-real-time reshaping use case. For example, in some operational scenarios, local reshaping functions can be generated in real time from a family of off-line trained global reshaping functions.

In some operational scenarios, local reshaping can cause false contouring or banding artifact to be generated. The local reshaping increases slopes or contrasts in mapping functions and thus widens gaps between consecutive codewords in a codeword space of available codewords to encode image content in an image. Local reshaping function index dithering may be applied to alleviate or mask false contouring or banding artifact. Additionally, optionally or alternatively, film grain injection can be implemented in reshaped codewords to further alleviate or mask false contouring or banding artifact.

Example embodiments described herein relate to generating output images from input images. A first reshaping mapping is performed on a first image represented in a first domain to generate a second image represented in a second domain. The first domain is of a first dynamic range different from a second dynamic range of which the second domain is. A second reshaping mapping is performed on the second image represented in the second domain to generate a third image represented in the first domain. The third image is perceptually different from the first image in at least one of: global contrast, global saturation, local contrast, local saturation, etc. A display image is caused to be derived from the third image to be rendered on a display device.

Example Video Delivery Processing Pipeline

FIG. 1 depicts an example process of a video delivery pipeline (100) showing various stages from video capture/generation to an HDR or SDR display. Example HDR displays may include, but are not limited to, image displays operating in conjunction with TVs, mobile devices, home theaters, etc. Example SDR displays may include, but are not limited to, SDR TVs, mobile devices, home theater displays, head-mounted display devices, wearable display devices, etc.

It should be noted that image processing operations as described herein such as reshaping operations can be performed in either encoder/server side (before video compression) or decoder/playback side (after the video decompression) as well as in a video pre-processing system or block that provides input images for video encoding. To support playback side reshaping operations, the same system configuration depicted in FIG. 1 and different system configurations in addition to what is depicted in FIG. 1 may be used. A wide variety of different image metadata formats other than what is used by processing components as depicted in FIG. 1 may be used to convey image metadata in these system configurations.

Video frames such as a sequence of consecutive input (e.g., SDR, HDR, etc.) images 102 can be received by an image generation block 105. These images (102) may be received from a video source, generated by a video pre-processing system/block external or internal to the image generation block (105), or retrieved from a video data store. Some or all of the images (102) can be generated from source images, for example through (e.g., automatic with no human input, manual, automatic with human input, etc.) video editing or transformation operations, color grading operations, etc. The source images may be digitally captured (e.g. by a digital camera), generated by converting analog camera pictures captured on film to a digital format, generated by a computer (e.g. using computer animation, image rendering, etc.), and so forth. The images (102) may be images relating to one or more of: movie releases, archived media programs, media program libraries, video recordings/clips, media programs, TV programs, user-generated video contents, etc.

The image generation block (105) applies (e.g., local, global, local and global, etc.) reshaping operations to each input image in the sequence of consecutive input images (102) to generate a respective (e.g., reshaped, reconstructed, enhanced, further enhanced, etc.) output image in a sequence of corresponding consecutive (e.g., reshaped, reconstructed, enhanced, further enhanced, etc.) output images that depict the same visual semantic content as the input images (102)

but with the same or a different dynamic range, higher local contrasts, more vivid colors, etc., in comparison with the input images (102).

More specifically, based on codewords present in an input image of the input images (102), the image generation block (105) can select or construct global reshaping functions 142 and/or local reshaping functions 146 general or specific to the input image. The image generation block (105) can perform global reshaping operations based on the global reshaping functions (142) and/or perform local reshaping operations based on the local reshaping functions (146) to reshape or convert the input image into a corresponding output (e.g., reshaped, reconstructed, enhanced, further enhanced, etc.) image depicting the same visual semantic information as the input image. The image generation block (105) can perform global reshaping operations alone, local reshaping operations alone or a combination of global and/or local reshaping operations, and so on, to generate the corresponding output image from the input image. The output image may of the same or different dynamic range, higher local contrasts, more vivid colors, etc., as compared with the input image.

In some operational scenarios, some of the reshaping operations can be performed offline to generate pre-built reshaping mappings/functions based on training image data such as training HDR images, training SDR images, combinations/pairs of training HDR-SDR images, etc. These pre-built reshaping mappings/functions can be used or adapted directly or indirectly for the purpose of performing dynamic online reshaping operations in the image generation block (105) at runtime.

In some operational scenarios, the output images generated by the image generation block (105) can be provided to a composer metadata generation block 115 to generate forward reshaped SDR images 112 as well as to generate image metadata 177 (e.g., composer metadata, backward reshaping mappings, etc.). The image metadata (177) may include composer data to generate backward reshaping mappings which when applied to a forward reshaped SDR image generate a corresponding HDR image depicting the same visual semantic content as the forward reshaped SDR image. Some or all of the input images (102) can be provided to the composer metadata generation block (115) to facilitate or support forward reshaping operations that generate the forward reshaped SDR images (112) as well as facilitate or support generation of the image metadata or the backward reshaping mappings therein.

Example reshaping mappings/operations—including but not limited to backward mappings/operations, forward mappings/operations and/or circular mappings/operations—may include, but are not necessarily limited to only, those specified with one or more of: backward lookup tables (BLUTs), forward lookup tables (FLUTs), backward and forward reshaping functions/curves or polynomial sets, multivariate multiple regression (MMR) coefficients, tensor product B-spline (TPB) coefficients, any combinations of the foregoing, etc. Examples of MMR operations are described in U.S. Pat. No. 8,811,490, the entire contents of which are incorporated by reference in its entirety as if fully set forth herein. Examples of TPB operations are described in U.S. Provisional Application Ser. No. 62/908,770, titled "TENSOR-PRODUCT B-SPLINE PREDICTOR," filed on Oct. 1, 2019, the entire contents of which are incorporated by reference in its entirety as if fully set forth herein.

The reshaped SDR images (112) and the image metadata (177) may be encoded by a coding block 120 in a video signal 122 (e.g., a coded bitstream, etc.) or a set of consecutive video segments. Given the video signal (122), a recipient device such as a mobile phone can decide—as a part of internally processing or post-processing the video signal (122) on the device—to use the metadata along with the SDR image data to generate and render images with higher dynamic range such as HDR and more vivid color within display capabilities of the recipient device. Additionally, optionally or alternatively, the video signal (122) or video segments allow backwards compatibility with legacy SDR displays which can ignore the image metadata (177) and simply display SDR images represented in the SDR image data.

Example video signals or video segments may include, but are not necessarily limited to, single layer video signals/segments, etc. In some embodiments, the coding block (120) may comprise audio and video encoders, such as those defined by ATSC, DVB, DVD, Blu-Ray, and other delivery formats, to generate the video signal (122) or video segments.

The video signal (122) or video segments are then delivered downstream to receivers such as mobile devices, tablet computers, decoding and playback devices, media source devices, media streaming client devices, television sets (e.g., smart TVs, etc.), set-top boxes, movie theaters, and the like. In a downstream device, the video signal (122) or video segments are decoded by decoding block (130) to generate decoded images 182, which may be similar to or the same as the reshaped SDR images (112) subject to quantization errors generated in compression performed by the coding block (120) and decompression performed by the decoding block (130) and/or transmission errors and/or synchronization errors and/or errors caused by packet loss.

In a non-limiting example, the video signal (122) (or video segments) may be backward compatible SDR video signal (or video segments). Here, a "backward compatible" refers to a video signal or video segments that carry SDR images optimized (e.g., with specific artistic intent preserved, etc.) for SDR displays.

The decoding block (130) can also retrieve or decode the image metadata (177) from the video signal (122) or video segments. The image metadata (177) specifies backward reshaping mappings that can be used by the downstream decoders to perform backward reshaping on the decoded SDR images (182) to generate backward reshaped HDR images for rendering on an HDR (e.g., target, reference, etc.) display. The backward reshaping mappings represented in the image metadata (177) may be generated by the composer metadata generation block (115) through minimizing errors or differences between the backward reshaped HDR images generated with the image metadata (177) and the output images generated by the image generation block (115) with the global and/or local reshaping operations. As a result, the image metadata (177) helps ensure that the backward reshaped HDR images generated with the image metadata (177) by the receiver relatively closely and accurately approximate the output images generated by the image generation block (115) with the global and/or local reshaping operations.

Additionally, optionally, or alternatively, the image metadata (177) may include display management (DM) metadata that can be used by the downstream decoders to perform display management operations on the backward reshaped images to generate display images (e.g., HDR display images, etc.) optimized for rendering on an HDR display device.

In operational scenarios in which the receiver operates with (or is attached to) an SDR display 140 that supports the standard dynamic range or a relatively narrow dynamic range, the receiver can render the decoded SDR images directly or indirectly on the target display (140).

In operational scenarios in which the receiver operates with (or is attached to) an HDR display 140-1 that supports a high dynamic range (e.g., 400 nits, 1000 nits, 4000 nits, 10000 nits or more, etc.), the receiver can extract the composer metadata from (e.g., the metadata container in, etc.) the video signal (122) or video segments and use the composer metadata to compose HDR images (132), which may be backward reshaped images generated from backward reshaping the SDR images based on the composer metadata. In addition, the receiver can extract the DM metadata from the video signal (122) or video segments and apply DM operations (135) on the HDR images (132) based on the DM metadata to generate display images (137) optimized for rendering on the HDR display device (140-1) and render the display images (137) on the HDR display device (140-1).

For the purpose of illustration only, it has been described that global and/or local reshaping operations as described herein can be performed by an upstream device such as a video encoder to generate output images from input images. These output images are then used as target or reference images by the video encoder to generate backward reshaping metadata that helps recipient devices generate backward reshaped HDR images that relatively closely or accurately approximates the output images generated from the global and/or local reshaping operations.

It should be noted that, in various embodiments, some or all global and/or local reshaping operations can be performed by a video encoder alone, a video decoder alone, a video transcoder alone, or a combination of the foregoing.

Global and/or Local Reshaping Options

Figure 2A:
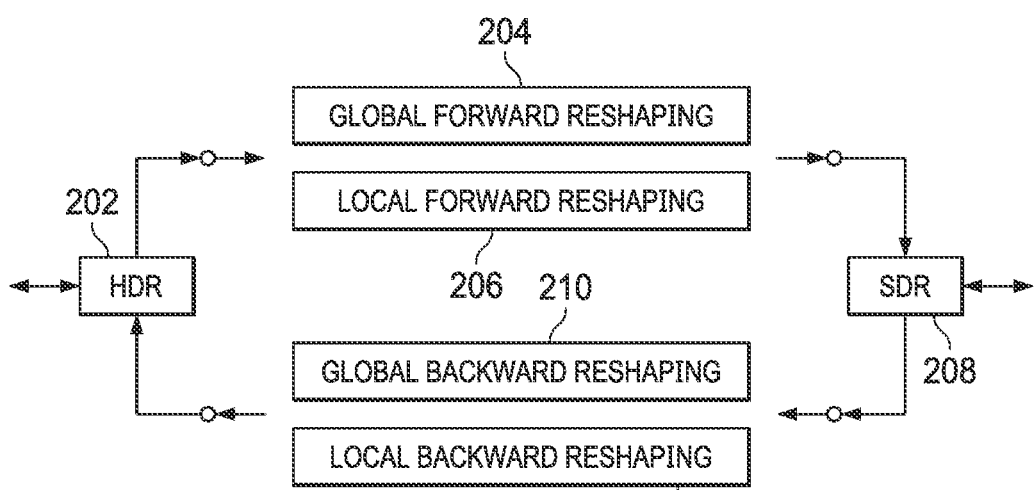
FIG. 2A illustrates an example architecture for applying global and/or local reshaping operations.

FIG. 2A illustrates an example architecture for applying global and/or local reshaping operations. Some of all the reshaping operations may be implemented or performed by an image processing system such as one or more processing blocks of FIG. 1 on the encoder side, one or more processing blocks of FIG. 1 on the encoder side, a combination of processing blocks of FIG. 1 on the encoder and decoder side, and so on.

As shown in FIG. 2A, block 202 represent an HDR video signal input/output interface. In various operational scenarios, the HDR video signal input/output interface (202) may be an HDR video signal input interface alone, an HDR video signal output interface alone, or a combination of an HDR video signal input interface and an HDR video signal output interface. In some operational scenarios, an input HDR video signal or input HDR images therein may be inputted or received with an HDR video input interface of the HDR video signal input/output interface (202). In some operational scenarios, an output HDR video signal or output HDR images therein may be outputted or sent with an HDR video output interface of the HDR video signal input/output interface (202).

Similarly, block 208 represent an SDR video signal input/output interface. In various operational scenarios, the SDR video signal input/output interface (208) may be an SDR video signal input interface alone, an SDR video signal output interface alone, or a combination of an SDR video signal input interface and an SDR video signal output interface. In some operational scenarios, an input SDR video signal or input SDR images therein may be inputted or received with an SDR video input interface of the SDR video signal input/output interface (208). In some operational scenarios, an output SDR video signal or output SDR images therein may be outputted or sent with an SDR video output interface of the SDR video signal input/output interface (208).

Blocks 204 and 206 represent options for forward reshaping operations, methods and/or functions in a forward reshaping path. Blocks 210 and 212 represent options for backward reshaping operations, methods and/or functions in a backward reshaping path. Each of the forward and backward reshaping path comprises options for global reshaping operations, methods and/or functions that may be designed to maintain overall (SDR or HDR) look(s) of SDR or HDR image(s) generated by these global reshaping operations, methods and/or functions.

In some operational scenarios, the forward global reshaping operations, methods and/or functions in the forward reshaping path form a (e.g., fully, faithfully, subject to quantization errors, etc.) revertible reshaping pair with the backward global reshaping operations, methods and/or functions in the backward reshaping path. In these operational scenarios, if an (e.g., input, received, etc.) HDR image is forward reshaped by the forward global reshaping operations, methods and/or functions in the forward reshaping path to generate a forward reshaped (e.g., SDR, etc.) image, then a reconstructed or backward reshaped image generated by applying the backward global reshaping operations, methods and/or functions in the backward reshaping path is the same as the (e.g., input, received, etc.) HDR image or closely approximates the (e.g., input, received, etc.) HDR image subject to possible quantization errors.

Likewise, if an (e.g., input, received, etc.) SDR image is backward reshaped by the backward global reshaping operations, methods and/or functions in the backward reshaping path to generate a backward reshaped (e.g., HDR, etc.) image, then a reconstructed or forward reshaped image generated by applying the forward global reshaping operations, methods and/or functions in the forward reshaping path is the same as the (e.g., input, received, etc.) SDR image or closely approximates the (e.g., input, received, etc.) SDR image subject to possible quantization errors.

While being able to enhance local visually perceptible characteristics, local reshaping operations, methods and/or functions in the forward or backward path—in contrast to the global reshaping operations, methods and/or functions—may not be revertible by, or may not form a revertible pair with, other global or local reshaping operations in the backward or forward path.

In various operational scenarios, as illustrated in FIG. 2A, depending on how and what specific reshaping operations, methods and/or functions are used and how and what specific input and/or output image interfaces (e.g., input and/or output SDR image interfaces, input and/or output HDR image interfaces, etc.) are used, an input video signal or input images therein can be HDR or SDR. Similarly, as illustrated in FIG. 2A, depending on how and what specific reshaping operations, methods and/or functions are used and how and what specific input and/or output interfaces are used, an output video signal or output (e.g., reconstructed, etc.) images therein can be HDR or SDR.

Various different combinations are illustrated as follows. First, the input signal is an HDR input signal, and the output signal is an HDR output signal. In this case, an input HDR image in the HDR input signal is processed by forward reshaping first followed by backward reshaping to generate a corresponding output HDR image (depicting the same visual semantic content as the input HDR image) in the HDR output signal. There are four (2*2=4) combinations formed by two options of using either global or local reshaping in the forward path times two options of sing either global or local reshaping in the backward path.

Second, the input signal is an HDR input signal, and the output signal is an SDR output signal. In this case, an input HDR image in the HDR input signal is processed by forward reshaping to generate a corresponding output SDR image (depicting the same visual semantic content as the input HDR image) in the SDR output signal. There are two combinations formed by two options of using either global or local reshaping in the forward path.

Third, the input signal is an SDR input signal, and the output signal is an HDR output signal. In this case, an input SDR image in the SDR input signal is processed by backward reshaping to generate a corresponding output HDR image (depicting the same visual semantic content as the input SDR image) in the HDR output signal. There are two combinations formed by two options of using either global or local reshaping in the backward path.

Fourth, the input signal is an SDR input signal, and the output signal is an SDR output signal. In this case, an input SDR image in the SDR input signal is processed by backward reshaping first followed by forward reshaping to generate a corresponding output SDR image (depicting the same visual semantic content as the input SDR image) in the SDR output signal. There are four (2*2=4) combinations formed by two options of using either global or local reshaping in the backward path times two options of sing either global or local reshaping in the forward path.

HDR Enhancement

A number of combinations as discussed above can be used to support HDR enhancement in an output HDR video signal reshaped from an input HDR video signal.

Figure 2B:
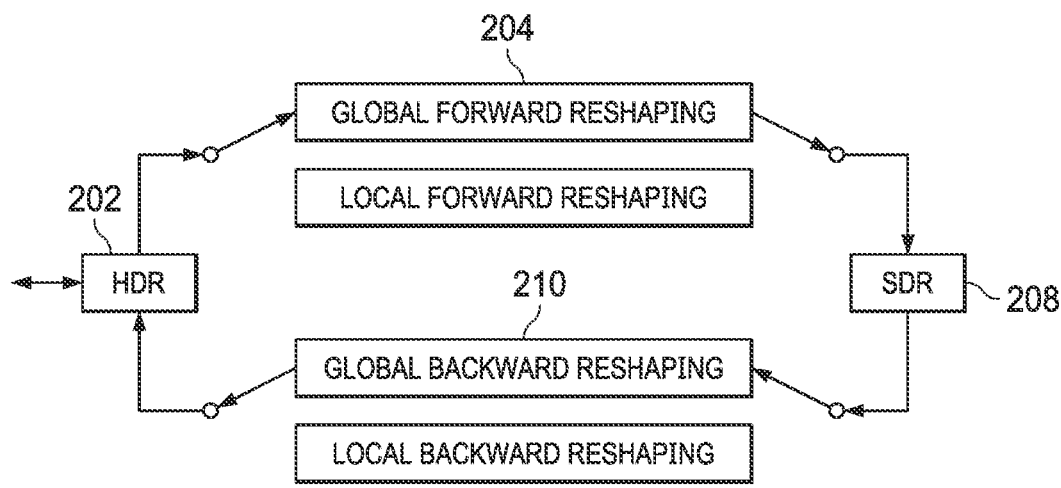
FIG. 2B through FIG. 2E illustrate example architectures for generating an output HDR video signal from an input HDR video signal.

FIG. 2B illustrates an example of generating an output HDR video signal from an input HDR video signal with global reshaping operations, methods and/or functions in both forward and backward paths. As shown, an input HDR image in the input HDR video signal received via an input HDR interface of the HDR input/output interface (202) may be converted into an output HDR image in the output HDR video signal sent via an output HDR interface of the HDR input/output interface (202) with the global forward reshaping (204) in the forward path and the global backward reshaping (210) in the backward path.

In operational scenarios in which the global forward reshaping (204) in the forward path and the global backward reshaping (210) in the backward path form a pair or are symmetric (e.g., revertible, mathematic inverse, mathematic inverse subject to quantization errors, etc.) with each other, then the output HDR image is identical to the (original) input HDR image (possibly subject to quantization errors) with no HDR enhancement. In some operational scenarios, a reshaped SDR image generated from performing the global forward reshaping (204) on the input HDR image may be a watchable non-enhanced SDR image.

In operational scenarios in which the global forward reshaping (204) in the forward path and the global backward reshaping (210) in the backward path do not form a pair or are asymmetric (e.g., non-revertible, non-mathematic inverse, non-mathematic inverse with differences not attributed to quantization errors etc.) with each other, then the output HDR image is changed from the (original) input HDR image with a different HDR look. For example, the global forward reshaping (204) in the forward path and the global backward reshaping (210) in the backward path can be used to generate the different HDR look with different brightness and saturation from brightness and saturation in the (original) look of the input HDR image. Additionally, optionally or alternatively, a reshaped SDR image generated from performing the global forward reshaping (204) on the input HDR image can be a watchable non-enhanced SDR image.

Figure 2C:
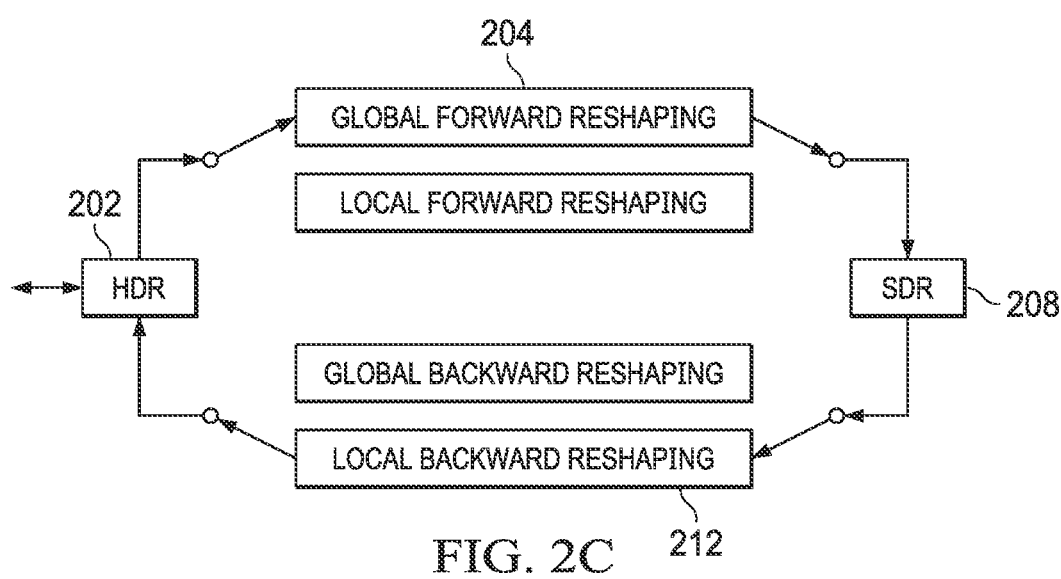

FIG. 2C illustrates an example of generating an output HDR video signal from an input HDR video signal with global forward reshaping operations, methods and/or functions in the forward path and local backward reshaping operations, methods and/or functions in the backward path. As shown, an input HDR image in the input HDR video signal received via an input HDR interface of the HDR input/output interface (202) may be converted into an output HDR image in the output HDR video signal sent via an output HDR interface of the HDR input/output interface (202) with the global forward reshaping (204) in the forward path and the local backward reshaping (212) in the backward path.

The output HDR image is enhanced owing to the use of local backward reshaping. Additionally, optionally or alternatively, a reshaped SDR image generated by performing the global forward reshaping (204) on the input HDR image can be a non-local enhanced SDR image.

Figure 2D:
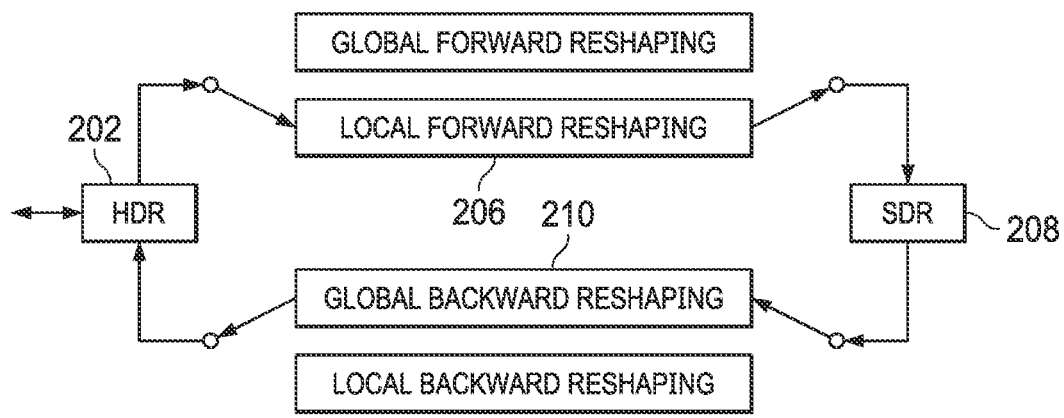

FIG. 2D illustrates an example of generating an output HDR video signal from an input HDR video signal with local forward reshaping operations, methods and/or functions in the forward path and global backward reshaping operations, methods and/or functions in the backward path. As shown, an input HDR image in the input HDR video signal received via an input HDR interface of the HDR input/output interface (202) may be converted into an output HDR image in the output HDR video signal sent via an output HDR interface of the HDR input/output interface (202) with the local forward reshaping (206) in the forward path and the global backward reshaping (210) in the backward path.

The output HDR image is enhanced owing to the use of local forward reshaping. A reshaped SDR image generated by performing the local forward reshaping (206) on the input HDR image is a local enhanced SDR image.

Figure 2E:
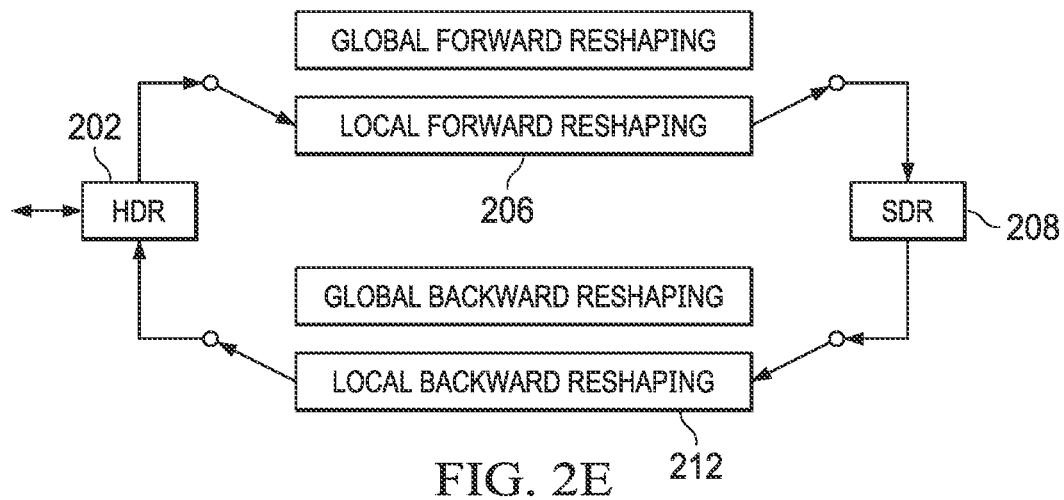

FIG. 2E illustrates an example of generating an output HDR video signal from an input HDR video signal with local forward reshaping operations, methods and/or functions in the forward path and local backward reshaping operations, methods and/or functions in the backward path. As shown, an input HDR image in the input HDR video signal received via an input HDR interface of the HDR input/output interface (202) may be converted into an output HDR image in the output HDR video signal sent via an output HDR interface of the HDR input/output interface (202) with the local forward reshaping (206) in the forward path and the local backward reshaping (212) in the backward path.

The output HDR image is doubly enhanced owing to the use of local forward reshaping and local backward reshaping in both forward and backward paths. A reshaped SDR image generated by performing the local forward reshaping (206) on the input HDR image is an enhanced SDR. Additionally, optionally or alternatively, global settings in one or both of the forward and backward paths can be asymmetric, thereby further changing the (original) HDR look of the input HDR image into a different HDR look of different global brightness and saturation as compared with the input HDR image.

Additionally, optionally or alternatively, in some operational scenarios, some or all of the foregoing operations in a combination of one or more options as discussed above can be iteratively performed in multiple round of global/local forward and global/local backward reshaping for generating further HDR and/or SDR enhancement in the output HDR image and the reshaped SDR image.

SDR Enhancement

A number of combinations as discussed above can be used to support SDR enhancement in an output SDR video signal reshaped from an input SDR video signal.

Figure 2F:
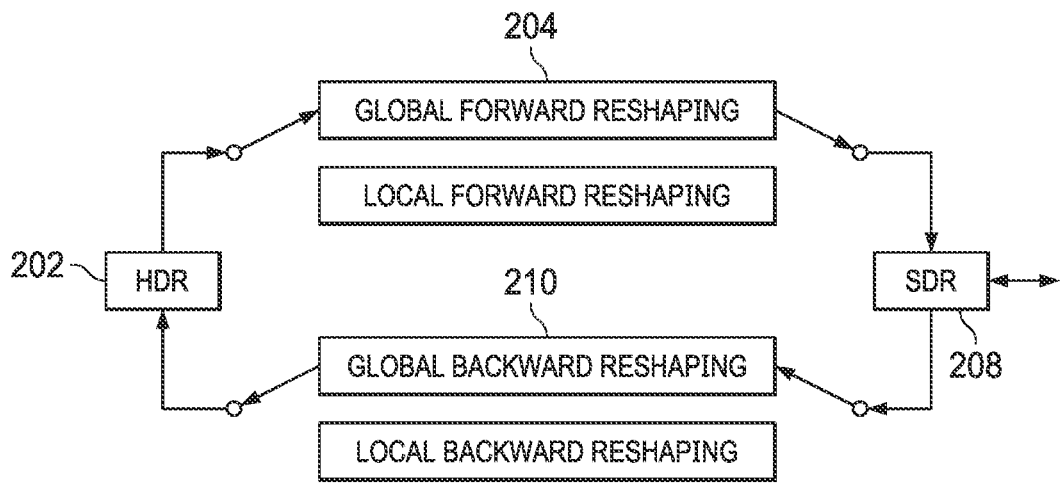
FIG. 2F through FIG. 2I illustrate example architectures for generating an output HDR video signal from an input HDR video signal.

FIG. 2F illustrates an example of generating an output SDR video signal from an input SDR video signal with global reshaping operations, methods and/or functions in both forward and backward paths. As shown, an input SDR image in the input SDR video signal received via an input SDR interface of the SDR input/output interface (208) may be converted into an output SDR image in the output SDR video signal sent via an output SDR interface of the SDR input/output interface (208) with the global forward reshaping (204) in the forward path and the global backward reshaping (210) in the backward path.

In operational scenarios in which the global forward reshaping (204) in the forward path and the global backward reshaping (210) in the backward path form a pair or are symmetric (e.g., revertible, mathematic inverse, mathematic inverse subject to quantization errors, etc.) with each other, then the output SDR image is identical to the (original) input SDR image (possibly subject to quantization errors) with no SDR enhancement. In some operational scenarios, a reshaped HDR image generated from performing the global backward reshaping (210) on the input SDR image may be a watchable non-enhanced HDR image.

In operational scenarios in which the global forward reshaping (204) in the forward path and the global backward reshaping (210) in the backward path do not form a pair or are asymmetric (e.g., non-revertible, non-mathematic inverse, non-mathematic inverse with differences not attributed to quantization errors etc.) with each other, then the output SDR image is changed from the (original) input SDR image with a different SDR look. For example, the global forward reshaping (204) in the forward path and the global backward reshaping (210) in the backward path can be used to generate the different SDR look with different brightness and saturation from brightness and saturation in the (original) look of the input SDR image. Additionally, optionally or alternatively, a reshaped HDR image generated from performing the global backward reshaping (210) on the input SDR image can be a watchable non-enhanced HDR image.

Figure 2G:
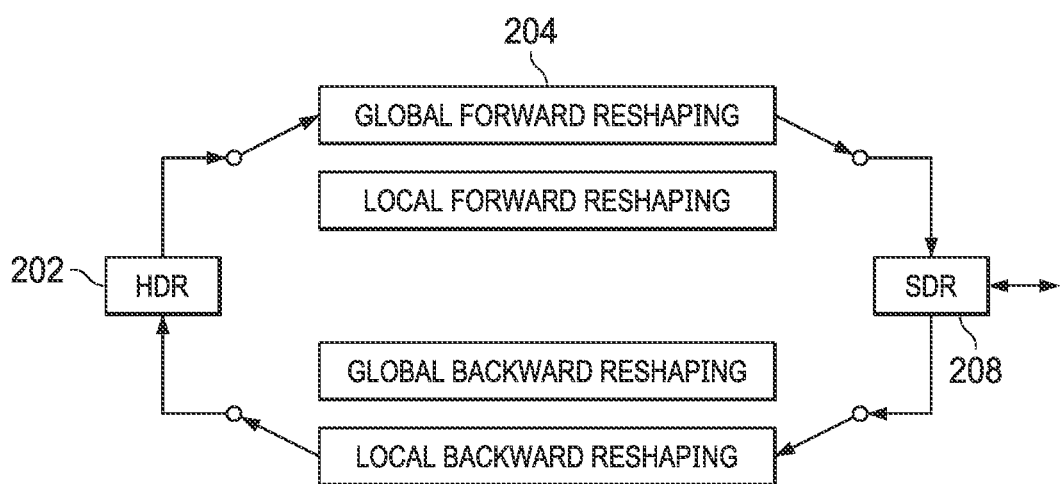

FIG. 2G illustrates an example of generating an output SDR video signal from an input SDR video signal with global forward reshaping operations, methods and/or functions in the forward path and local backward reshaping operations, methods and/or functions in the backward path. As shown, an input SDR image in the input SDR video signal received via an input SDR interface of the SDR input/output interface (208) may be converted into an output SDR image in the output SDR video signal sent via an output SDR interface of the SDR input/output interface (208) with the global forward reshaping (204) in the forward path and the local backward reshaping (212) in the backward path.

The output SDR image is enhanced owing to the use of local backward reshaping. Additionally, optionally or alternatively, a reshaped HDR image generated by performing the global backward reshaping (212) on the input SDR image can be a local enhanced HDR image.

Figure 2H:
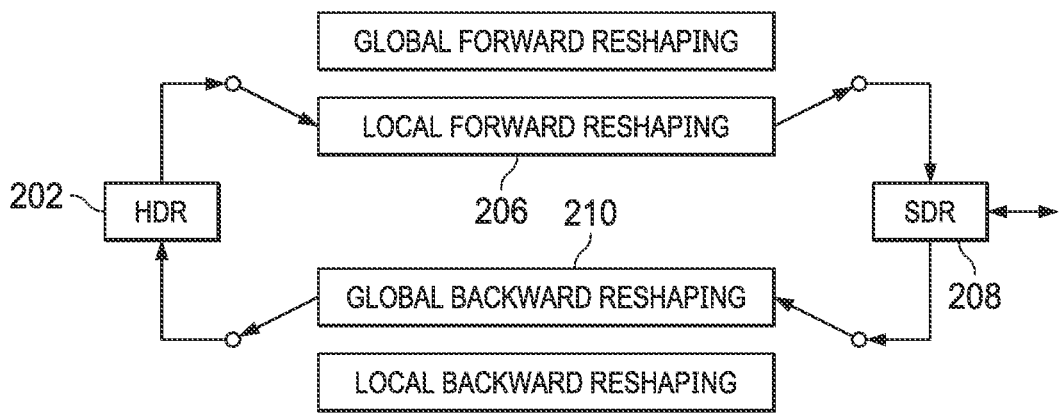

FIG. 2H illustrates an example of generating an output SDR video signal from an input SDR video signal with local forward reshaping operations, methods and/or functions in the forward path and global backward reshaping operations, methods and/or functions in the backward path. As shown, an input SDR image in the input SDR video signal received via an input SDR interface of the SDR input/output interface (208) may be converted into an output SDR image in the output SDR video signal sent via an output SDR interface of the SDR input/output interface (208) with the local forward reshaping (206) in the forward path and the global backward reshaping (210) in the backward path.

The output SDR image is enhanced owing to the use of local forward reshaping. Additionally, optionally or alternatively, a reshaped HDR image generated by performing the global backward reshaping (210) on the input SDR image can be a non-local enhanced HDR image.

Figure 2I:
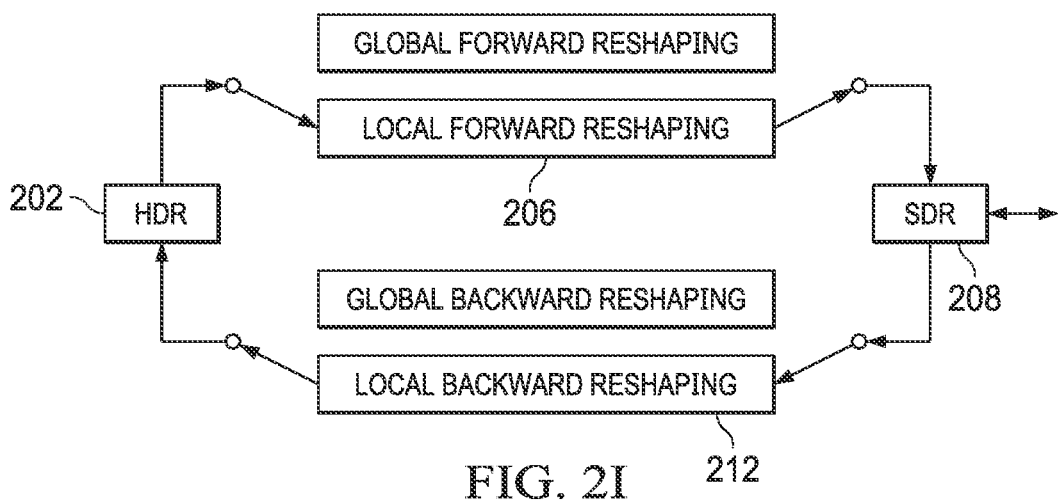

FIG. 2I illustrates an example of generating an output SDR video signal from an input SDR video signal with local forward reshaping operations, methods and/or functions in the forward path and local backward reshaping operations, methods and/or functions in the backward path. As shown, an input SDR image in the input SDR video signal received via an input SDR interface of the SDR input/output interface (208) may be converted into an output SDR image in the output SDR video signal sent via an output SDR interface of the SDR input/output interface (208) with the local forward reshaping (206) in the forward path and the local backward reshaping (212) in the backward path.

The output SDR image is doubly enhanced owing to the use of local forward reshaping and local backward reshaping in both forward and backward paths. A reshaped HDR image generated by performing the local backward reshaping (212) on the input SDR image is an enhanced HDR. Additionally, optionally or alternatively, global settings in one or both of the forward and backward paths can be asymmetric, thereby further changing the (original) SDR look of the input SDR image into a different SDR look of different global brightness and saturation as compared with the input SDR image.

Additionally, optionally or alternatively, in some operational scenarios, some or all of the foregoing operations in a combination of one or more options as discussed above can be iteratively performed in multiple round of global/local forward and global/local backward reshaping for generating further HDR and/or SDR enhancement in the output SDR image and the reshaped HDR image.

Revertible Enhancement

Figure 2J:
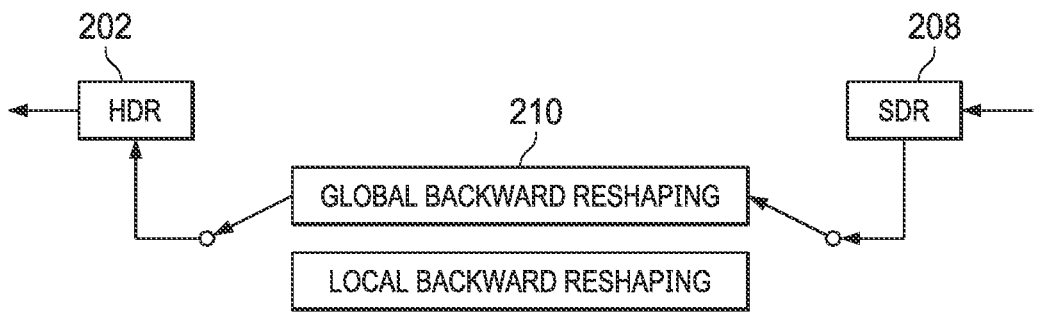
FIG. 2J illustrates an example video application in which source images are captured as SDR images by a mobile device in an input SDR video signal.

Revertible enhancement such as those based on global reshaping in both forward and backward paths can be applied in a number of video applications. FIG. 2J illustrates an example video application in which source images are captured as SDR images by a mobile device in an input SDR video signal. An SDR to HDR up-conversion may be implemented or performed with global backward reshaping (e.g., 210, etc.). Upconverted (or reshaped) HDR images with at least dynamic range enhancement can be generated by performing the global backward reshaping (210) on the (source or input) SDR images. As compared with global reshaping capable of being performed with relatively little or modest computing power, local reshaping may not be affordable or feasible owing to relatively limited computation power in mobile phone. Instead, the global backward reshaping (210) can be used to generate the (upconverted or reshaped) HDR images. The HDR images can be encoded as an output version of an HDR coded bitstream. This version of the HDR coded bitstream can be shared, previewed and/or displayed on a display screen of the mobile device.

The HDR images can be uploaded by way of the HDR coded bitstream to another device (e.g., a PC, a laptop, a cloud-based storage and/or computing system, a server, a media or video sharing system, etc) such as a more powerful machine. As illustrated in FIG. 2C, the HDR coded bitstream can be received as an input HDR video signal. The HDR images of the version of the HDR coded bitstream—as generated from the global backward reshaping (210) performed by the mobile device on the (original) SDR images—can be further enhanced by first using revertible global forward reshaping (204)—which forms a revertible pair or corresponds to the global backward reshaping (210) of FIG. 2J—to recover the (original) SDR images generated by (e.g., camera(s) operating in conjunction with, etc.) the mobile device. As illustrated in FIG. 2C, local backward reshaping (212) can be applied or performed on the recovered SDR images to generate (new) HDR images with an enhanced HDR look as compared with the HDR look of the HDR images of the version of the HDR coded bitstream.

Hence, in this video application involving the mobile device that acquires the original or input SDR images, the original or input SDR images can be recovered—from the HDR images of the version of the HDR coded bitstream generated by the mobile device—and viewed. Also, HDR images with at least dynamic range enhancement generated by the mobile device can be received—e.g., from the mobile device—and viewed. Further, HDR images with further enhancement can be generated—from performing local reshaping as described herein such as illustrated in FIG. 2C—and viewed.

Similarly, in a video application in which input HDR images are received in an input HDR video signal (e.g., generated by a mobile device, generated by a non-mobile device, generated by a camera, etc.), global forward reshaping can be performed on the HDR images to generate output SDR images. The output SDR images can be reverted back to the (original) input HDR images using global backward reshaping that forms a revertible pair or corresponds to the global forward reshaping. Additionally, optionally or alternatively, local forward reshaping can be performed on the HDR images to generate enhanced output SDR images, for example with local enhancement Global Reshaping In some operational scenarios, global reshaping functions or mappings used in global reshaping can be designed based on a scalable static framework for single-layer backward compatible (SLBC) video coding. An algorithm that ensures full revertability from one domain such as one of SDR and HDR domains to another domain such as the other of the SDR and HDR domains can be used in global reshaping as described herein. Different usages of global reshaping exist depending on whether forward and backward (global reshaping) functions used by the global reshaping form a revertible pair or not.

In some operational scenarios, paired forward and backward global reshaping functions are used in the scalable static framework for SLBC video encoding. In these operational scenarios, there may be a total number G (e.g., G=4096; covering all possible codeword values in a 12-bit codeword space, etc.) of fully revertible global forward and global backward reshaping function pairs. Each of the fully revertible global forward and global backward reshaping function pairs comprises a global forward reshaping function and a corresponding global backward reshaping function.

Denote global forward reshaping functions in the above mentioned revertible pairs (each of the global forward reshaping functions converts or forward reshapes codewords for luma and chroma channels of a first color space to forward reshaped codewords for luma and chroma channels of a second color space), as follows:

$$\text{Luma: } \{F_{<g>}^{F,Y}|g^{F,Y}=0, \ldots, G-1\} \quad (1\text{-}1)$$

$$\text{Chroma: } \{F_{<g>}^{F,Cx}|g^{F,Cx}=0, \ldots, G-1\} \quad (1\text{-}2)$$

where Y denotes the luma channel; Cx denotes the chroma channels, where x may be 0 (corresponding to C0 or the first chroma channel) or 1 (corresponding to C1 or the second chroma channel).

Similarly, denote global backward reshaping functions in the above mentioned revertible pairs (each of the global backward reshaping functions converts or forward reshapes codewords for luma and chroma channels of the second color space to backward reshaped codewords for luma and chroma channels of the first color space), as follows:

$$\text{Luma: } \{B_{<g>}^{B,Y}|g^{B,Y}=0, \ldots, G-1\} \quad (2\text{-}1)$$

$$\text{Chroma: } \{B_{<g>}^{B,Cx}|g^{B,Cx}=0, \ldots, G-1\} \quad (2\text{-}2)$$

As illustrated in FIG. 3A and expressions (1) above, the luma global forward reshaping functions may be indexed or looked up using different index values $g^{F,Y}$. Similarly, as illustrated in FIG. 3B and expressions (2) above, the luma global backward reshaping functions may be indexed or looked up using different index values $g^{B,Y}$.

A revertible pair—in a plurality of revertible pairs formed by the global forward reshaping functions in expressions (1) and the global backward reshaping functions in expressions (2)—may be formed by a global forward reshaping function in the global forward reshaping functions in expressions (1) and a global backward reshaping function (in the global backward reshaping functions in expressions (2)) corresponding to the global forward reshaping function.

The global forward reshaping function and the global backward reshaping function in the same revertible pair may be indexed with the same index value. The same pair of global forward and global backward reshaping functions can be used to recover an original input video signal or an input image therein in an output video signal or an output image. For example, given the g-th pair in the plurality of revertible pairs, where $g^{F,Y}=g^{B,Y}=g^{F,Cx}=g^{B,Cx}=g$, an input HDR image may be forward reshaped to a reshaped SDR image, and then backward reshaped to an output HDR that is the (e.g., fully, faithfully, subject to quantization errors, etc.) same as the input HDR image, as follows:

$$v = B_{<g>}^{Y}(F_{<g>}^{Y}(v)) \quad (3\text{-}1)$$

$$v = B_{<g>}^{Cx}(F_{<g>}^{Cx}(v)) \quad (3\text{-}2)$$

where v on the right hand side (RHS) represents the input HDR image; v on the left hand side (LHS) represents the output HDR image.

Given the same $g^{th}$ pair, an input SDR image may be backward reshaped to a reshaped HDR image, and then forward reshaped to an output SDR that is the (e.g., fully, faithfully, subject to quantization errors, etc.) same as the input SDR image, as follows:

$$s = F_{<g>}^{Y}(B_{<g>}^{Y}(s)) \quad (4\text{-}1)$$

$$s = F_{<g>}^{Cx}(B_{<g>}^{Cx}(s)) \quad (4\text{-}2)$$

where s on the RHS represents the input SDR image; s on the LHS represents the output SDR image.

Quantization errors or losses can occur when a reshaping function makes a bit depth conversion from a pre-reshaping bit depth (e.g., the total number of bits to code each codewords in a pre-reshaping image in a pre-shaping color space channel, etc.) to a post-reshaping bit depth (e.g., the total number of bits to code each codewords in a post-reshaping image in a post-shaping color space channel, etc.) such as from a 16-bit pre-reshaping video signal/image to a 10-bit post-reshaping video signal/image. If differences between an input image received by a revertible pair and an output image generated by the revertible pair are attributed to quantization errors or losses caused by bit-depth conversion(s), then the input image and the output image may still be deemed as the same.

Figure 3C:
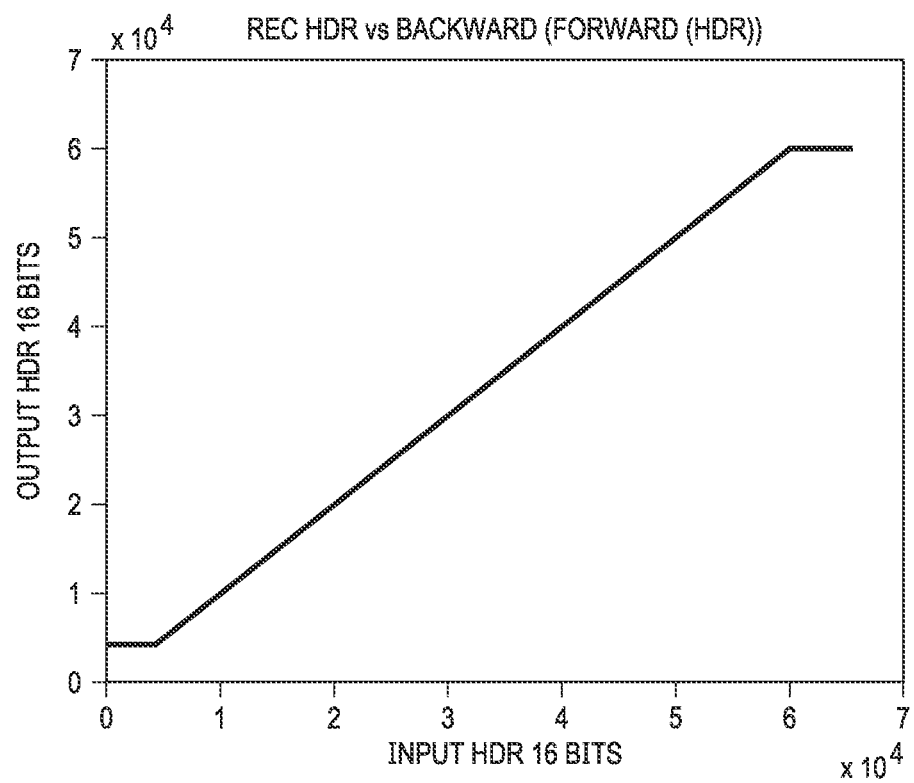
FIG. 3C and FIG. 3F illustrate example luma codeword mappings each using a pair of global forward and backward reshaping functions with the same index value.

FIG. 3C illustrates example luma codeword mapping using the same (revertible) pair of global forward and backward reshaping functions indexed by the same index value g for converting input luma codewords of an input HDR image (input bit depth=16 bits) into output luma codewords of an output HDR image (output bit depth=16 bits) using expression (3-1) above.

As shown, the input to output codeword mapping in the luma channel is almost a linear line (e.g., within the SMPTE specified range that clips at both ends of a defined luma value range, etc.). This implies luma codewords reconstructed or outputted in the output HDR image generated by the revertible pair is the same as, or very close to, luma codewords received in the input HDR image.

FIG. 3D and FIG. 3E illustrate example chroma codeword mapping using the same (revertible) pair of global forward and backward reshaping functions indexed by the same index value g for converting input chroma codewords of an input HDR image (16 bits) into output chroma codewords of an output HDR image (16 bits) using expression (3-2) above.

The input chroma codewords may form a group of colors with fixed Cb (e.g., 35000, etc.) and Cr (e.g., 28000, etc.) values but with varying luma codeword values.

As shown, the input-to-output codeword mapping in the chroma channel for this group of colors is almost a linear line. This implies chroma codewords reconstructed or outputted in the output HDR image generated by the revertible pair is the same as, or very close to, chroma codewords received in the input HDR image with respect to this group of colors for the varying luma codeword values.

Similarly, another group of colors with another set of fixed Cb and Cr codeword values (e.g., Cb as 25000 and Cr as 35000, etc.) but with varying luma codeword values can be used in chroma mapping using the revertible pair of the global forward and backward reshaping functions. It can be shown that the input-to-output codeword mapping in the chroma channel for such other group of colors is almost a linear line, similar to FIG. 3D and FIG. 3E. This implies chroma codewords reconstructed or outputted in the output HDR image generated by the revertible pair is the same as, or very close to, chroma codewords received in the input HDR image with respect to the other group of colors for the varying luma codeword values.

Figure 3F:
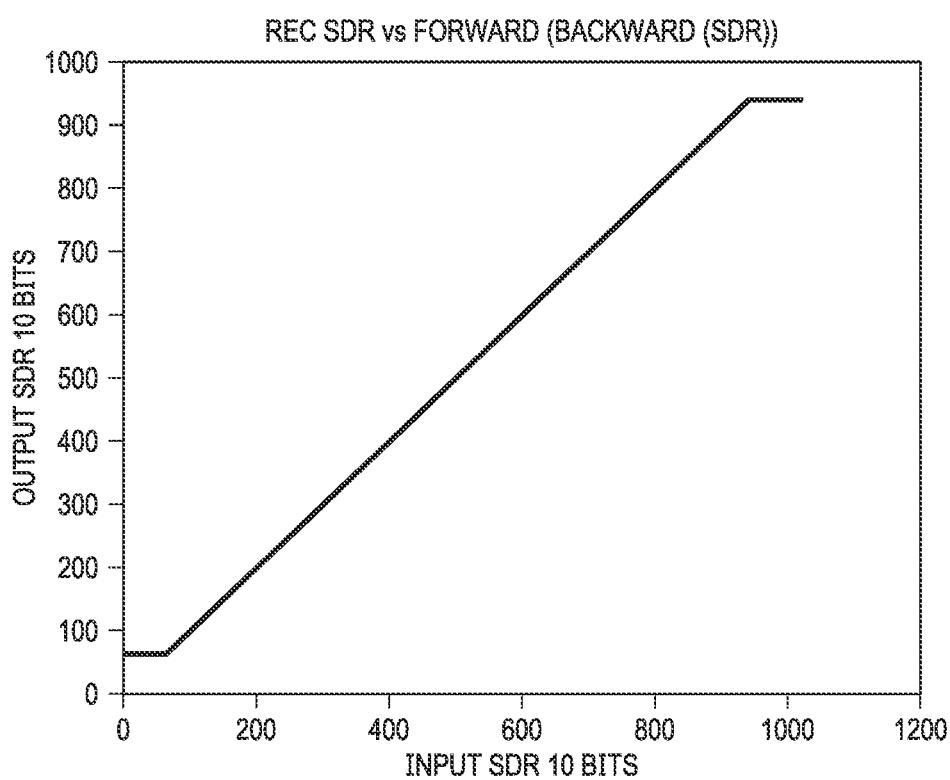

FIG. 3F illustrates example luma codeword mapping using the same (revertible) pair of global forward and backward reshaping functions indexed by the same index value g for converting input luma codewords of an input SDR image (input bit depth=10 bits) into output luma codewords of an output SDR image (output bit depth=16 bits) using expression (4-1) above.

As shown, the input to output codeword mapping in the luma channel is almost a linear line (e.g., within an entire codeword range as specified in an industry standard, etc.). This implies luma codewords reconstructed or outputted in the output SDR image generated by the revertible pair is the same as, or very close to, luma codewords received in the input SDR image.

Similarly, chroma codeword mapping can be performed with the revertible pair to map input SDR chroma codewords in the input SDR image to output SDR chroma codewords in the output SDR image.

In some operational scenarios, the global forward and backward reshaping functions in the revertible pair may be, but are not necessarily limited to only, MMR based forward and backward mappings/functions for chroma mapping and FLUT/BLUT based forward and backward mappings/functions for luma mapping.

An MMR based backward mapping/function in the revertible pair may be used to map input luma and chroma codewords in the input SDR image into backward reshaped chroma codewords in a backward reshaped HDR image. A BLUT based backward mapping/function in the revertible pair may be used to map input luma codewords in the input SDR image into backward reshaped luma codewords in the backward reshaped HDR image.

An MMR based forward mapping/function in the revertible pair may be used to map backward reshaped luma and chroma codewords in the backward reshaped HDR image into output chroma codewords in the output SDR image. A FLUT based forward mapping/function in the revertible pair may be used to map backward reshaped luma codewords in the backward reshaped HDR image into output luma codewords in the output SDR image.

As in the input-HDR-output-HDR conversion implemented with the revertible pair, input chroma codewords in the output SDR image can be recovered, or can be the same as, the output chroma codewords in the input SDR image in the input-SDR-output-SDR conversion implemented with the revertible pair, subject to possible quantization errors.

Un-Paired Forward and Backward Global Reshaping

Reshaping functions from different revertible pairs may not reproduce an input video signal (or an input image therein) in an output signal (or an output image therein) generated from reshaping operations performed on the input video signal (or the input image therein) based on these functions.

For the purpose of illustration only, forward luma and chroma reshaping functions may be indexed by first index values $g^{F,Y}$ and $g^{F,C_x}$, respectively, where the first index values may or may not equal each other. Similarly, backward luma and chroma reshaping functions may be indexed by second index values $g^{B,C}$ and $g^{B,C_x}$, respectively, where the second index values may or may not each other.

In some operational scenarios, in which the first and second index values are different among themselves, an input video signal (or an input image therein) may not be reproduced in an output signal (or an output image therein) generated from reshaping operations performed on the input video signal (or the input image therein) based on these functions, as follows.

$$\hat{v} = B_{<g^{B,Y>}}^{Y}(F_{<g^{F,Y>}}^{Y}(v)) \neq v \qquad (5\text{-}1)$$

$$\hat{v} = B_{<g^{B,C_x>}}^{C_x}(F_{<g^{F,C_x>}}^{C_x}(v)) \neq v \qquad (5\text{-}2)$$

However, in these operational scenarios, these reshaping functions, which may be referred to as unpaired forward and backward reshaping functions, can be applied, or used as a tool, to adjust input brightness and saturation of an input image into different brightness and saturation of an output image as global image enhancement.

Figure 3H:
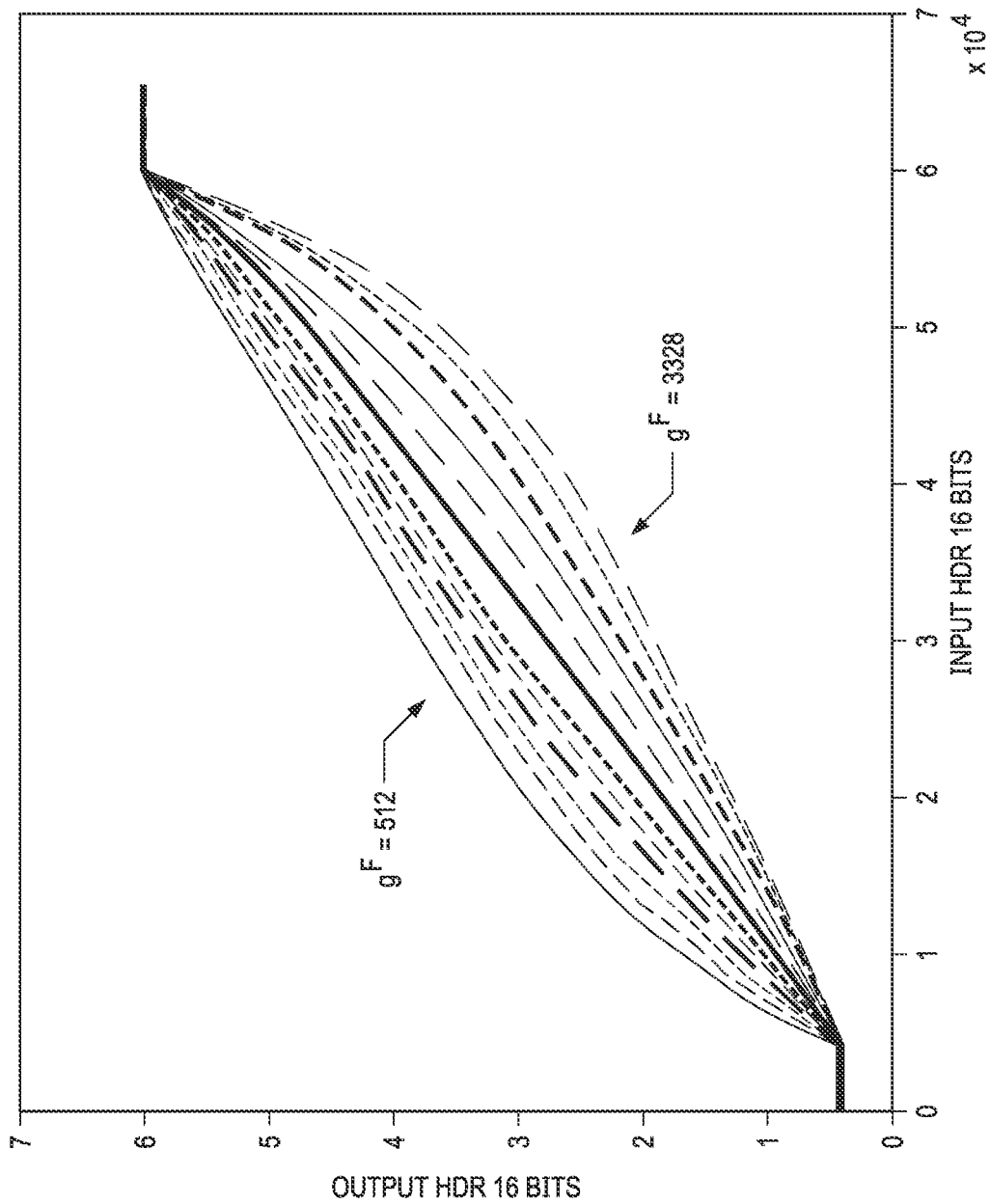
FIG. 3H illustrates example luma forward functions with different index values.

FIG. 3G illustrates example luma (or luminance) backward functions with various different index values $g^{B,C}$ ranging from 512 to 3328 (e.g., with a fixed forward index $g^{F,Y}=1792$, etc.). FIG. 3H illustrates example luma (or luminance) forward functions with different index values $g^{F,C}$ ranging from 512 to 3328 (e.g., with a fixed forward index $g^{F,Y}=1792$, etc.).

For luma forward and backward reshaping, if index values are selected such that $g^{B,Y}>g^{F,Y}$, then a reconstructed HDR image generated at least in part by performing the luma forward and backward reshaping functions with these index values on an input HDR image become brighter than the input HDR image. On the other hand, if the index values are selected such that $g^{B,Y}<g^{F,Y}$, then a reconstructed HDR image generated at least in part by performing the luma forward and backward reshaping functions with these index values on an input HDR image become darker than the input HDR image. A gap between the two index values, $\Delta g^Y = g^{B,Y} - g^{F,Y}$ affects the brightness change. In some operational scenarios, the greater a magnitude of the gap is, the larger the brightness change between the input image and the output image.

Similarly, for chroma forward and backward reshaping, if index values are selected such that $g^{B,C_x}>g^{F,C_x}$, where may be Cb or Cr, then a reconstructed HDR image generated at least in part by performing the chroma forward and backward reshaping functions with these index values on an input HDR image become more saturated than the input HDR image. On the other hand, if the index values are selected such that $g^{B,C_x}<g^{F,C_x}$, then a reconstructed HDR image generated at least in part by performing the chroma forward and backward reshaping functions with these index values on an input HDR image become less saturated than the input HDR image. A gap between the two index values, $\Delta g^{C_x}=g^{B,C_x}-g^{F,C_x}$ affects the saturation change. In some operational scenarios, the greater a magnitude of the gap is, the larger the saturation change between the input image and the output image.

Figure 2K:
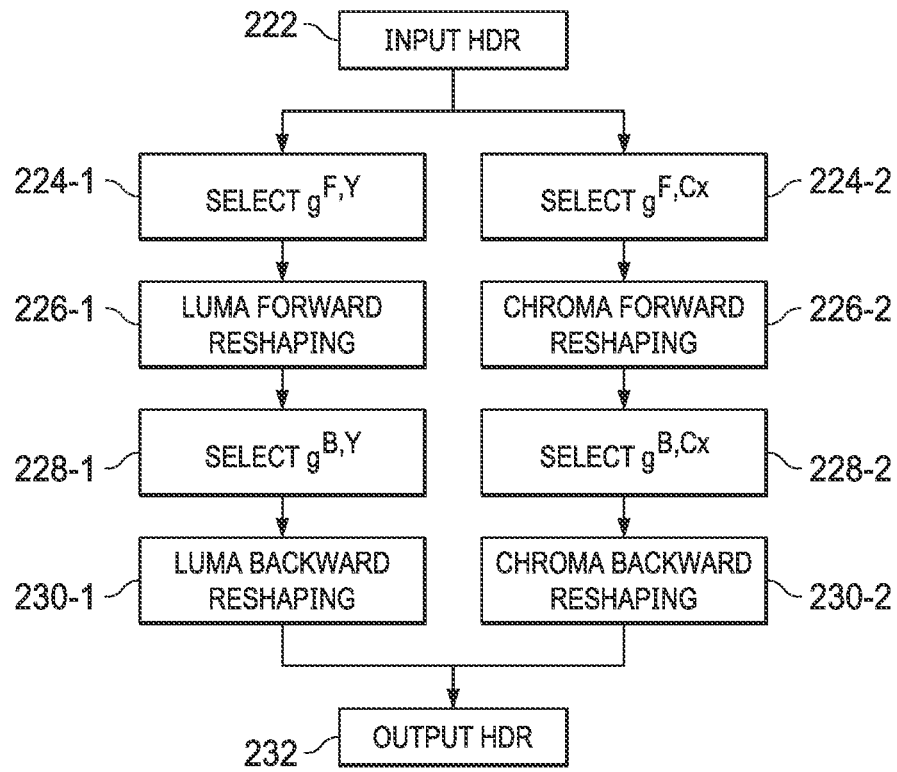
FIG. 2K illustrates an example flow using unpaired forward and backward reshaping functions to change brightness and/or saturation of an input video signal.

FIG. 2K illustrates an example flow using unpaired forward and backward reshaping functions to change brightness and/or saturation of an input video signal to different brightness and/or saturation of an output video signal. As in other flows illustrated herein, the flow of FIG. 2K may be performed by one or more computing devices such as a video encoder, a video transcoder, a video decoder, or a combination of the foregoing. For the purpose of illustration only, the input video signal and the output video signal are an input HDR video signal and an output HDR video signal, respectively.

Block 222 comprises receiving an input HDR image in the input HDR video signal. Blocks 224-1 and 224-2 comprise selecting first luma and chroma index values for forward reshaping functions. Blocks 226-1 and 226-2 comprise performing luma and chroma forward reshaping on the input HDR image based on luma and chroma forward reshaping functions indexed by the first index values to generate a forward reshaped image. Blocks 228-1 and 228-2 comprise selecting second luma and chroma index values for backward reshaping. Blocks 230-1 and 230-2 comprise performing luma and chroma backward reshaping on the forward reshaped image based on luma and chroma backward reshaping functions indexed by the second index values to generate a reconstructed HDR image with different brightness and/or different saturation from that of the input HDR image. Block 232 comprises outputting the reconstructed HDR image.

Local Reshaping and Guided Image

Figure 2L:
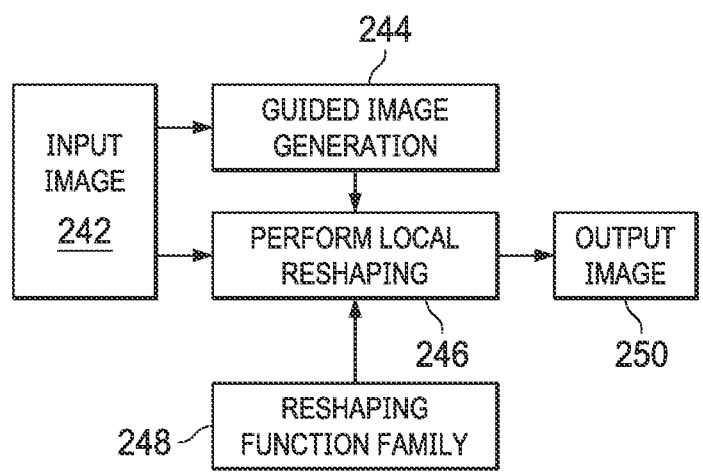
FIG. 2L illustrates an example luma and chroma local reshaping that can be performed on an input image to generate a locally reshaped output image.

FIG. 2L illustrates an example luma and chroma local reshaping 246 that can be performed on an input image 242 to generate a (locally reshaped) output image 250. Processing blocks of FIG. 2L—including but not limited to the luma and chroma local reshaping (246)—may be implemented or performed by one or more computing devices such as a video encoder, a video transcoder, a video decoder, or a combination of the foregoing.

As illustrated in FIG. 2L, two components may be used to assist or support the luma and chroma local reshaping (246).

The first component is a local reshaping function family 248 comprising a collection (or a total number L) of local reshaping functions denoted as $F_{<l>}(\ )$, where l is 0, 1, ... L−1. These local reshaping functions can be used or invoked as a part of the luma and chroma local reshaping operation. The local reshaping function family comprises a luma local reshaping function family denoted as $F_{<l>}^Y$ for luma local reshaping and a chroma local reshaping function family denoted as $F_{<l>}^{C_x}$ for chroma local reshaping.

The second component is guided image generation using a guided image generation operator (denoted as G) to generate a guided image (denoted as M) from the input image (denoted as V), as follows:

$$M=G(V) \quad (6)$$

The guided image, M, contains an individual (reshaping function) index value (in a value range of [0 L−1]) for each input pixel in some or all of the input image (242) to select which local reshaping function in the local reshaping function family to perform local reshaping on the input pixel to generate a corresponding output pixel in the output image (250). The guided image, M, can comprise different guided images, such as $M^Y$ and $M^{C_x}$ for luma and chroma local reshaping in different luma and chroma channels.

More specifically, given the guided image generated by the guided image generation (244), for each input pixel of the input image (242), the local reshaping (246) can look up specific reshaping function index value(s) stored—at the same row and same column as an image frame containing the input image (242)—in the guided image. The specific reshaping function index value(s) can then be used to select or identify specific local reshaping function(s) among the reshaping functions constituting the reshaping function family (248). The specific local reshaping function(s) can then be used to perform the luma and chroma local reshaping on the input pixel to generate a corresponding output pixel in the output image (250).

For the purpose of illustration only, local forward reshaping is discussed in detail. It should be noted that local backward reshaping can be similarly derived, implemented or performed. For simplicity reasons, superscripts such as "Y" and "Cx" may be removed in discussions herein.

Single-Channel Luma Local Reshaping

In some operational scenarios, output or reshaped luma codewords of an output image can be generated from performing single-channel luma local reshaping on input or pre-reshaped luma codewords of an input image. More specifically, an input luma codeword (e.g., sufficiently, etc.) for a pixel of the input image enables a local reshaping function to determine a mapped or reshaped luma codeword of a corresponding pixel of the output image, without using input chroma codewords for the pixel of the input image.

A luma local reshaping (function) family for single-channel luma local reshaping can be generated in a number of different ways.

In a first example, self-derived local reshaping may be used to generate a luma local reshaping family. The self-derived local reshaping refers to an approach under which the luma local reshaping family is derived from a luma global reshaping function. This (type of) luma local reshaping function family can be generated on the fly at runtime in response to each input image or a specific codeword distribution therein. The local reshaping function family may comprise luma local reshaping functions customized for each frame in different content.

In a second example, offline training may be used to generate a luma local reshaping family comprising pre-built luma local reshaping functions. This (type of) luma local reshaping function family may be applied to all input images in all content.

In a third example, hybrid offline and online operations may be used to generate a luma local reshaping family comprising luma local reshaping functions generated by performing some or all of the self-derived local reshaping from the pre-built global reshaping functions. Benefits of this hybrid method is to save or reduce computational costs in that luma reshaping functions can be built using a dynamic global function constructed in response to an input image at runtime and the pre-built local functions generated from training offline.

Self-Derived Single-Channel Local Reshaping

Two goals of luma local reshaping are to (a) increase local contrast ratio (2) while maintaining similar brightness in an output image generated from performing the luma local reshaping on an input image. The first goal can be achieved by increasing slopes of local reshaping functions such as those represented with tone curves. The second goal as mentioned above can be achieved by intersecting the (e.g., new, etc.) local reshaping functions with a global reshaping function at various locations. Example generation of local reshaping functions given a global reshaping function is described in U.S. Provisional Application Ser. No. 63/004,609, titled "BLIND LOCAL RESHAPING IN HDR IMAGING," filed on Apr. 3, 2020, the entire contents of which are incorporated by reference in its entirety as if fully set forth herein.

Figure 2M:
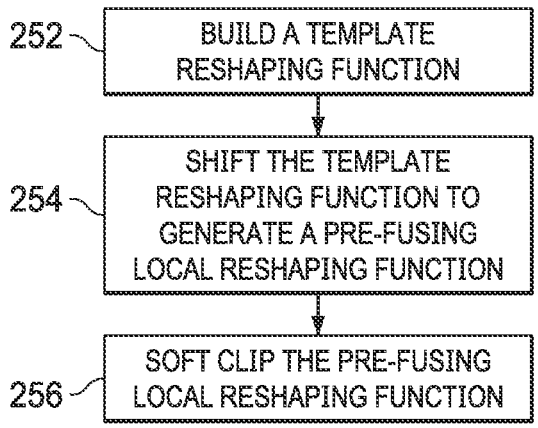
FIG. 2M illustrates an example flow for self-derived single-channel local function generation.

FIG. 2M illustrates an example flow for self-derived local function generation from a global reshaping function denoted as F( ). In some operational scenarios, the global reshaping function can be computed by a video codec in online operations, for example in response to receiving an input image for local reshaping. Such a global shaping function may be referred to as a (e.g., adaptive, runtime, etc.) dynamic global reshaping function. In some operational scenarios, the global reshaping function can be computed or pre-built by an image processing system in offline operations, for example not necessarily in response to receiving an input image for local reshaping. Such a global shaping function may be referred to as a (e.g., scalable, pre-configured, etc.) static global reshaping function.

Block 252 comprises building a template reshaping function. To do so, flat areas in the global reshaping function F( ) may be removed first to generate a modified reshaping curve or function. These flat areas may correspond sub-ranges outside an entire range of (e.g., valid, SMPTE, etc.) available codewords in a codeword space. The flat areas may be added back later in (e.g., finally, etc.) constructed local reshaping functions.

The modified reshaping curve or function can then be shifted until it touches the y-axis. As used herein, a plot or curve representing a local or global reshaping function (e.g., as illustrated in FIG. 3A, FIG. 3B, FIG. 3G and FIG. 3H, etc.) may be represented in a two-dimensional coordinate system in which the y-axis represents reshaped or output codewords while the x-axis represents pre-reshaped or input codewords. The shifting of the modified reshaping curve or function can be used to avoid or obviate corner case handling and facilitate scaling and shifting operations that generate local reshaping functions. Accordingly, a shifted modified reshaping function (denoted as F') may be constructed from the global reshaping function with flat area removing and shifting to the y-axis, as follows:

$$F'=\text{shift\_to\_Yaxis}(\text{remove\_flat}(F(\ )))\qquad(7)$$

To achieve higher local contrast ration mentioned as the first goal above, an x-axis scaling factor, denoted as $\alpha_{<I>}$, can be used. More specifically, if the x-axis scaling factor is set to be more than one (1) or $\alpha_{<I>}>1$ at an input codeword value, then a local neighborhood around the input codeword value along the x-axis is (e.g., proportional to the x-axis scaling factor, etc.) expanded thereby reducing or decreasing local contrast ratio (or increasing blur) at an x-axis location represented by the input codeword value. In other words, when the x-axis scaling factor $\alpha_{<I>}$ is greater than one (1), the curve is expanded along the x-axis. As the range (e.g., interval or difference used for derivative computation, etc.) along the x-axis increases and the mapped range (e.g., interval or difference used for the derivative computation, etc.) along the y-axis remains the same, the x-axis expanded curve has a smaller slope than the pre-expanded curve, thereby reducing the contrast ratio in the x-axis expanded curve as compared with the pre-expanded curve. On the other hand, if the x-axis scaling factor is set to be less than one (1) or $\alpha_{<I>}<1$ at the input codeword value, then the local neighborhood around the input codeword value along the x-axis may be (e.g., proportional to the x-axis scaling factor, etc.) compressed thereby increasing or enhancing the local contrast ratio (or sharpness) at the x-axis location represented by the input codeword value. In other words, when the x-axis scaling factor $\alpha_{<I>}$ is less than one (1), the curve is compressed along the x-axis. As the range (e.g., interval or difference used for derivative computation, etc.) along the x-axis decreases and the mapped range (e.g., interval or difference used for the derivative computation, etc.) along the y-axis remains the same, the x-axis compressed curve has a higher slope than the pre-compressed curve, thereby increasing the contrast ratio in the x-axis compressed curve as compared with the pre-compressed curve.

The x-axis scaling factor ($\alpha_{<I>}<1$) can be used to scale—e.g., along the x-axis as specified by the x-axis scaling factor—the shifted modified reshaping function at various input codeword values to generate a scaled (forward) function to increase local contrast ratio (or sharpness) in the scaled function at these input codeword values.

A template reshaping function (denoted as $F_{<I>}^{T}(\ )$) can be built or constructed by first transforming or shifting the template reshaping function into the scaled (or shifted) forward functions and then resampling the scaled function at various input codeword values corresponding to input codeword values used to encode the input image, as follows:

$$F_{<l>}{}^T(\ )=\text{resample}(F(\ ),\alpha_{<l>}) \tag{8}$$

In some operational scenarios, unequal local contrast ratio enhancement can be achieved among different local reshaping functions in the local reshaping family by using different values of the x-axis scaling factor in expression (8) above for different l values of the local reshaping functions.

In some operational scenarios, equal local contrast ratio enhancement can be achieved among some or all local reshaping functions in the local reshaping family by using the same value of the x-axis scaling factor in expression (8) above for l values of the local reshaping functions.

For the purpose of illustration only, equal local contrast ratio enhancement may be used with the same x-axis scaling factor $\alpha_{<l>}$ assigned or applied in the shifting and resampling operations in expression (8) above to generate the template reshaping function for all the local reshaping functions ($F_{<l>}{}^T(\ )=F^T(\ )$ for all l) in the local reshaping family. Hence, only one scaled and resampled function may be built from the global reshaping function with the same x-axis scaling factor $\alpha_{<l>}$ in expression (8) above as the template reshaping function for all the local reshaping functions.

Block 254 comprises shifting the template reshaping functions in expression (8) above to generate a pre-fusing local reshaping function that can be fused with the global reshaping function into the l-th local reshaping function in the local reshaping family. This shifting of the template reshaping function achieves the second goal, namely maintaining similar (e.g., locally average, locally filtered, global, etc.) brightness between the pre-fusing local reshaping functions and the global reshaping function.

The term "fusing" used throughout this disclosure refers to an interpolation or mix of two specified functions. In preferred embodiments, the mixing of functions comprises calculating a linear combination of the involved functions. The weights in the linear combination may be normalized to a given value. For example, the sum of weights may be 1. The term "pre-fusing" used throughout this disclosure is used in conjunction with reshaping functions. For example, a local reshaping function may be fused with a global reshaping function. The resulting fused reshaping function is still a local reshaping function despite its fusion with a global reshaping function, as the fused reshaping function still maintains the different functional characteristic on the pixel level from the pre-fusing local reshaping function. In order to distinguish the local reshaping function prior to fusion from the local reshaping function after fusing with the global reshaping function, an initial local reshaping function prior to fusing is referred to as "pre-fusing local reshaping function", while the fused result is referred to as "post-fusing local reshaping function", "fused local reshaping function" or simply "local reshaping function".

The term "pre-fusing" may also be applied to other reshaping functions, e.g. when fusing two global reshaping functions that further remain global and therefore need distinction whether the global reshaping function prior to fusing ("pre-fusing") or after fusing is to be addressed.

More specifically, an input pixel such as the i-th input codeword in the input image can be reshaped into an output pixel such as the i-th output codeword with the pre-fusing local reshaping function for the l-th local reshaping function indexed—in the local reshaping family—by a corresponding local reshaping function index value l stored in the i-th element (denoted as $m_i$) of the guided image M.

Denote the bit depth of the input image as $B^V$. An (entire) input codeword range of this bit depth may be partitioned into L uniform intervals with a corresponding interval center, as follows:

$$I^v = \frac{2^{B^V}}{L} \tag{9}$$

$$C_l^v = \text{round}((0.5+l)I^v) \tag{10}$$

To maintain similar (e.g., locally average, locally filtered, global, etc.) brightness around the input pixel between the global reshaping function and the pre-fusing local reshaping function for the l-th local reshaping function, a mapped or globally reshaped value of the (original) global reshaping function $F(C_l^v)$ at the center of the l-th interval of the input codeword range and the pre-fusing local reshaping function $F_{<l>}(C_l^v)$—as generated by shifting the template reshaping function—for the l-th local reshaping function at the same center of the l-th interval of the input codeword range may be constrained to satisfy the following condition/constraint:

$$F(C_l^v)=F_{<l>}(C_l^v) \tag{11}$$

This constraint can be used to determine an amount of shifting or a shift (value) for the pre-fusing local reshaping function $F_{<l>}(C_l^v)$ and apply the shift (value) to the template reshaping function to generate the pre-fusing local reshaping function $F_{<l>}(C_l^v)$ for the l-th local reshaping function, without recomputing the l-th local reshaping function or the pre-fusing local reshaping function $F_{<l>}(C_l^v)$ from scratch.

Hence, given $C_l^v$ as an input codeword, a corresponding mapped (or globally reshaped) value $F(C_l^v)$ may be obtained or looked up (e.g., from a curve, a function and/or a lookup table representing the global reshaping function $F(C_l^v)$, etc.). The corresponding mapped value $F(C_l^v)$ can then be used to determine an input codeword value $\phi_l^v$ such that the following equality condition (e.g., equal brightness, etc.) is satisfied:

$$F_{<l>}{}^T(\phi_l^v)=F(C_l^v) \tag{12}$$

Further, the input codeword value $\phi_l^v$ can be used to determine the shift (value) as follows:

$$a_l^v=C_l^v-\phi_l^v \tag{13}$$

Accordingly, the pre-fusing local reshaping function $F_{<l>}(C_l^v)$ for the l-th local reshaping function (for all l between 0 and L−1) can be obtained as a shifted version of the template reshaping function as follows:

$$F_{<l>}(v)=F_{<l>}{}^T(v-a_l^v) \tag{14}$$

After scaling and shifting operations are performed to increase or alter slopes of the global reshaping function into slopes of the template reshaping function, the template reshaping function or local reshaping functions generated from the template reshaping function may generate out-of-range values that would be hard clipped with the range of allowable codeword values, thereby possibly generating visual artifacts. To avoid or reduce hard clipping, soft clipping may be used by fusing the global and local functions together with respective weighting factors.

Block 256 comprises soft clipping the pre-fusing local reshaping function $F_{<l>}(C_l^v)$ by fusing the pre-fusing local reshaping function $F_{<l>}(C_l^v)$ with the global reshaping function. Given the pre-fusing local reshaping function $F_{<l>}(C_l^v)$ as generated in block 254 for the l-th local reshaping function, a global reshaping function weighting factor denoted as $\theta_{<l>}^{Y,G}$ and a local reshaping function weighting factor denoted as $\theta_{<l>}^{Y,L}$ may be respectively assigned to the global reshaping function and the pre-fusing local reshaping function $F_{<l>}(C_l^y)$ for the l-th local reshaping function. In some operational scenarios, the two weighting factors satisfy a constraint/condition as follows:

$$\theta_{<l>}^{Y,G} + \theta_{<l>}^{Y,L} = 1 \tag{15}$$

The (post-fusing) l-th local reshaping function can be given as follows:

$$F_{<l>}() = \theta_{<l>}^{Y,L} \cdot F_{<l>}() + \theta_{<l>}^{Y,G} \cdot F() \tag{16}$$

It should be noted that the foregoing operations can be implemented or performed to generate both local forward reshaping functions as well as local backward reshaping functions.

Pre-Built Single-Channel Local Reshaping

In some operational scenarios, in addition to or in place of the self-derived single-channel local reshaping as discussed above, a plurality of pre-built single-channel global reshaping functions $F_{<g>}^Y()$ respectively indexed by global reshaping function index values denoted as g can be obtained through offline training. These pre-built global reshaping functions may be used to generate local reshaping functions respectively indexed by local reshaping function index values l, for example in the forward path, as follows:

$$F_{<l>}() = F_{<g>}^Y() \tag{17-1}$$

where $$g = l \tag{17-2}$$

Similarly, in the backward path, local reshaping functions denoted as $B_{<l>}()$ can be generated from pre-built global reshaping functions denoted as $B_{<g>}^Y()$, as follows:

$$B_{<l>}() = B_{<g>}^Y() \tag{18}$$

Example derivation of local reshaping functions from global reshaping functions is described in U.S. Provisional Application Ser. No. 63/086,699, titled "ADAPTIVE LOCAL RESHAPING FOR SDR-TO-HDR UP-CONVERSION," filed on Oct. 2, 2020, the entire contents of which are incorporated by reference in its entirety as if fully set forth herein.

Hybrid of Pre-Defined and Self-Derived Single-Channel Local Reshaping

In some operational scenarios, a hybrid approach combining pre-defined and self-derived single-channel local reshaping may be used to generate local reshaping functions. More specifically, self-derived local reshaping as discussed above can be performed with respect to an existing pre-built global reshaping function, instead of a (e.g., dynamic, etc.) global reshaping function built in response to receiving an input image. For example, based on a codeword distribution of the input image, a specific pre-built global reshaping function may be selected from among a plurality of pre-built global reshaping functions (e.g., obtained through offline training, etc.). The specific pre-built global reshaping function may be used in the self-derived local reshaping as discussed above in place of the global reshaping function built in response to receiving the input image.

Cross-Channel Luma Local Reshaping

In some operational scenarios, output or reshaped luma codewords of an output image can be generated from performing cross-channel luma local reshaping on input or pre-reshaped luma and chroma codewords of an input image. More specifically, input luma and chroma codeword (e.g., sufficiently, etc.) for a pixel of the input image collectively enables a (e.g., TPB based, MMR based, etc.) local reshaping mapping to determine a mapped or reshaped luma codeword of a corresponding pixel of the output image.

A luma local reshaping (function) family for cross-channel luma local reshaping can be generated in a number of different ways. Similar to the single-channel luma local reshaping, the cross-channel luma local reshaping at least includes: (1) using self-derived local reshaping functions, (2) using pre-built reshaping functions, and (3) a hybrid of using both self-derived and pre-build reshaping functions.

Self-Derived Cross-Channel Luma Local Reshaping

In various operational scenarios, any in a variety of different (e.g., TPB, MMR, etc.) types of cross-channel luma reshaping functions may be used. For the purpose of illustration only, cross-channel luma reshaping functions may be Tensor-Product B-Spline (TPB) based. TPB based reshaping functions are capable of capturing wide non-linearity in luma reshaping.

Figure 2N:
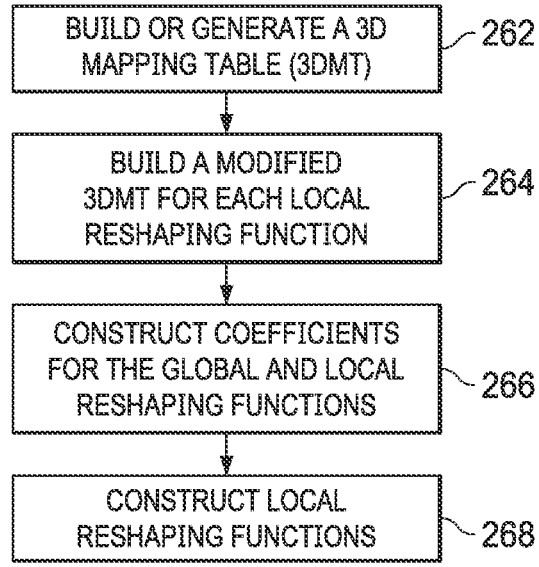
Figure 2O:
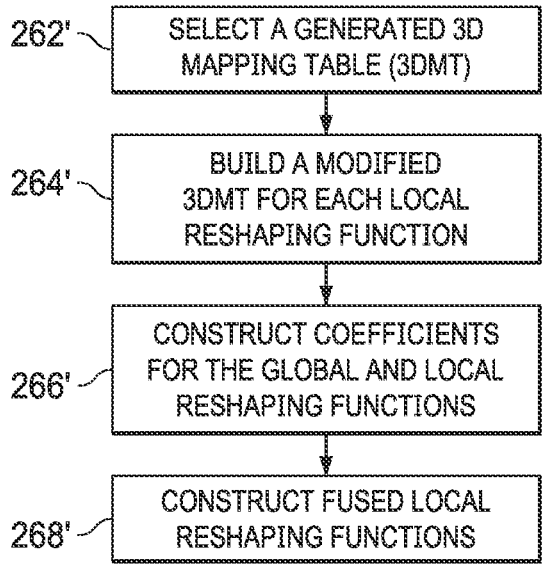

FIG. 2N illustrates an example flow for self-derived cross-channel local function generation based on an image pair comprising a first image and a second image. A TPB based local reshaping function may be generated with the flow to map input codewords of the first image to locally reshaped codewords approximating or reconstructing codewords of a reference image represented by the second image. For the purpose of illustration only, the first image in the image pair may be an HDR image, whereas the second image (or reference image) may be an SDR image. In an example, the SDR image may have been used (e.g., through previously performed content mapping, tone mapping and/or reshaping operations, etc.) to generate the HDR image. In another example, the SDR image may have been generated (e.g., through previously performed content mapping, tone mapping and/or reshaping operations, etc.) from the HDR image.

Block 262 comprises constructing or building a 3D mapping table (3DMT) from the image pair. Each pixel of the HDR image may include luma and chroma codewords denoted as $v_i = [v_i^y v_i^{c0} v_i^{c1}]^T$ in (e.g., three, etc.) color channels, denoted as y, c0 and c1 (or alternatively y, $C_0$, $C_1$) respectively, of an HDR color space or domain. Each pixel of the SDR image may include luma and chroma codewords denoted as $s_i = [s_i^y s_i^{c0} s_i^{c1}]^T$ in (e.g., three, etc.) color channels, denoted as y, c0 and c1 respectively, of an SDR color space or domain.

The HDR color space comprising available codewords in each of the three channels can be (e.g., uniformly, etc.) quantized or partitioned using a corresponding fixed number—such as $Q_y$, $Q_{C_0}$, $Q_{C_1}$ for each component—of one-dimensional bins. As a result, a three-dimensional histogram may be initialized to comprise ($Q_y \times Q_{C_0} \times Q_{C_1}$) cubes or 3D histogram bins.

Denote the 3D histogram as $\Omega^{Q,v}$, where $Q = [Q_y, Q_{C_0}, Q_{C_1}]$. The 3D histogram $\Omega^{Q,v}$ contains a total number ($Q_y \cdot Q_{C_0} \cdot Q_{C_1}$) of 3D histogram bins. A 3D histogram bin in the 3D histogram $\Omega^{Q,v}$ may be specified or indexed with a 3D bin index $q = (q_y, q_{C_0}, q_{C_1})$, where $q_{ch} = 0, \ldots, Q_{ch}-1$, for each $ch = \{y, C_0, C_1\}$, and used to represent—or store a count (e.g., total number, etc.) of—pixels having those three-channel quantized values within the 3D histogram bin.

A sum of (e.g., reference, mapped, etc.) codeword values in the SDR image may be computed for each 3D histogram bin in the 3D histogram. Let $\Psi_{y}^{Q,s}$, $\Psi_{C_0}^{Q,s}$ and $\Psi_{C_1}^{Q,s}$ be respective sums of codewords in the luma and chroma channels $\{y, C_0, C_1\}$ of the output domain, respectively.

Assume that each of the HDR image and the SDR image comprises P pixels. An example procedure to compute counts of HDR pixels in, and sums of SDR codeword values for, the 3D histogram bins of the 3D histogram is illustrated in TABLE 1 below.

TABLE 1

// STEP 1: initialization
$\Omega_q^{Q,v} = 0$ where $q = (q_y, q_{C_0}, q_{C_1})$ and
$q_{ch} = 0, \ldots, Q_{ch} - 1$, for each ch = $\{y, C_0, C_1\}$
$\Psi_{y,q}^{Q,s} = 0$ where $q = (q_y, q_{C_0}, q_{C_1})$ and
$q_{ch} = 0, \ldots, Q_{ch} - 1$, for each ch = $\{y, C_0, C_1\}$
$\Psi_{C_0,q}^{Q,s} = 0$ where $q = (q_y, q_{C_0}, q_{C_1})$ and
$q_{ch} = 0, \ldots, Q_{ch} - 1$, for each ch = $\{y, C_0, C_1\}$
$\Psi_{C_1,q}^{Q,s} = 0$ where $q = (q_y, q_{C_0}, q_{C_1})$ and
$q_{ch} = 0, \ldots, Q_{ch} - 1$, for each ch = $\{y, C_0, C_1\}$
// STEP 2: scan for each pixel in input image; compute histogram and sum for ( i = 0 ; i < P ; i ++ ){

$q_y = \left\lfloor \frac{v_i^y}{Q_y} \right\rfloor$;    // first image's luma quantized value $q_{C_0} = \left\lfloor \frac{v_i^{C_0}}{Q_{C_0}} \right\rfloor$;    // first image's chroma 0 quantized value $q_{C_1} = \left\lfloor \frac{v_i^{C_1}}{Q_{C_1}} \right\rfloor$;    // first image's chroma 1 quantized value $q = (q_y, q_{C_0}, q_{C_1})$,
$\Omega_q^{Q,v}$ ++;    // 3D histogram in $1^{st}$ image
$\Psi_{y,q}^{Q,s} = \Psi_{y,q}^{Q,s} + s_i^y$;    // Mapped $2^{nd}$ image's y values
$\Psi_{C_0,q}^{Q,s} = \Psi_{C_0,q}^{Q,s} + s_i^{c0}$;    // Mapped $2^{nd}$ image's $C_0$ values
$\Psi_{C_1,q}^{Q,s} = \Psi_{C_1,q}^{Q,s} + s_i^{c1}$;    // Mapped $2^{nd}$ image's $C_1$ values
}

Let $(v_q^{y,(B)}, v_q^{C_0,(B)}, v_q^{C_1,(B)})$ represent the center of the q-th (HDR) 3D histogram bin in the 3D histogram. An example procedure to precompute the centers of some or all of the 3D histogram bins in the 3D histogram is illustrated in TABLE 2 below.

TABLE 2

// Recall that the bin index $q = (q_y, q_{C_0}, q_{C_1})$.
for ($q_y = 0; q_y < Q_y; q_y$++)
  for ($q_{C_0} = 0; q_{C_0} < Q_{C_0}; q_{C_0}$++)
    for ($q_{C_1} = 0; q_{C_1} < Q_{C_1}; q_{C_1}$++) {

$v_q^{y,(B)} = \frac{(q_y + 0.5)}{Q_y}$    // normalized bin-value luma component in $1^{st}$ image $v_q^{C_0,(B)} = \frac{(q_{C_0} + 0.5)}{Q_{C_0}}$    // normalized bin-value C0 component in $1^{st}$ image $v_q^{C_1,(B)} = \frac{(q_{C_1} + 0.5)}{Q_{C_1}}$    // normalized bin-value C1 component in $1^{st}$ image

}

Next, among the 3D histogram bins in the 3D histogram, 3D histogram bins that have non-zero total numbers of pixels can be identified. All other 3D histogram bins that do not have any pixels—or that have total numbers of pixels below a minimum pixel number threshold in some other operational scenarios—can be discarded from further processing.

Let $q_0, q_1, \ldots q_{k-1}$, be k 3D histogram bins in which a count of HDR pixel $\Omega_q^{Q,v} \neq 0$. For these k 3D histogram bins, average values $\overline{\Psi}_{Y,q}^{Q,s}$, $\overline{\Psi}_{C_0,q}^{Q,s}$, $\overline{\Psi}_{C_1,q}^{Q,s}$ of SDR codewords can be computed based on sums of SDR codewords $\Psi_{y,q}^{Q,s}$, $\Psi_{C_0,q}^{Q,s}$, and $\Psi_{C_1,q}^{Q,s}$ and the total numbers of HDR pixels in the bins. An example procedure for such computation is illustrated in TABLE 3 below.

TABLE 3

// The non-zero bin index $q_i = (q_y, q_{C_0}, q_{C_1})$.
for (i = 0; i < k; i++) {

$\overline{\Psi}_{y,q_i}^{Q,s} = \frac{\Psi_{y,q_i}^{Q,s}}{\Omega_{q_i}^{Q,v}}$;    // Average 3D-Mapping $2^{nd}$ image y values $\overline{\Psi}_{C_0,q_i}^{Q,s} = \frac{\Psi_{C_0,q_i}^{Q,s}}{\Omega_{q_i}^{Q,v}}$;    // Average 3D-Mapping $2^{nd}$ image $C_0$ values $\overline{\Psi}_{C_1,q_i}^{Q,s} = \frac{\Psi_{C_1,q_i}^{Q,s}}{\Omega_{q_i}^{Q,v}}$;    // Average 3D-Mapping $2^{nd}$ image $C_1$ values

}

As a result, a plurality of mapping pairs from the first image (the HDR image in the present example) to the second image (the SDR image in the present example). Each such mapping pair may comprise the center of a 3D histogram bin—indexed by a valid q with a non-zero HDR pixel count—and an average of SDR codeword values for SDR pixels mapped from HDR pixels counted in the 3D histogram bin, as follows:

$$v_q^{(B)} = [v_q^{y,(B)}\ v_q^{C_0,(B)}\ v_q^{C_1,(B)}]^T \qquad (19\text{-}1)$$

$$\overline{\Psi}_q^{Q,s} = [\overline{\Psi}_{Y,q}^{Q,s}\ \overline{\Psi}_{C_0,q}^{Q,s}\ \overline{\Psi}_{C_1,q}^{Q,s}]^T \qquad (19\text{-}2)$$

In some operational scenarios, codeword values such as $v_q^{(B)}$ and $\overline{\Psi}_q^{Q,s}$ or HDR and SDR codeword values may be normalization for example into a normalized value range of [0 1].

Block 264 comprises building a modified 3DMT for each local reshaping function. To effectuate changes in local contrast ratio, a function denoted as $h_Y( )$ can be designed and applied to average SDR or mapped values $\overline{\Psi}_{Y,q}^{Q,s}$ in each 3D histogram bin (indexed by a valid q with a non-zero HDR pixel count) of the 3D histogram to obtain modified average SDR or mapped values $\widetilde{\Psi}_{Y,q}^{Q,s}$, as follows:

$$\widetilde{\Psi}_{Y,q}^{Q,s} = h_Y(\overline{\Psi}_{Y,q}^{Q,s}) \qquad (20)$$

A (e.g., center, etc.) point at which the global reshaping function and the l-th local reshaping function intersect—e.g., for the purpose of maintaining similar brightness between the global reshaping function and the l-th local reshaping function in a local neighborhood in which local contrast ratio is increased—may be given as follows:

$$C_l^y = \frac{l}{L} \qquad (21)$$

In some operational scenarios, the above mentioned function $h_Y( )$ used to effectuate changes in local contrast ratio may be defined with a linear scaling factor, denoted as $\alpha_{<l>}$ ($\alpha_{<l>} < 1$ for increasing local contrast ratio, $\alpha_{<l>} > 1$ for reducing local contrast ratio), for the l-th local reshaping function, such that expression (21) above can be rewritten as follows:

$$\overline{\Psi}^{Q,s}_{Y,q,<l>} = \text{clip3}\left(\frac{1}{\alpha_{<l>}}(\overline{\Psi}^{Q,s}_{Y,q} - C^y_l), 0, 1\right) \quad (22)$$

where clip3( ) is a clipping function limiting the first argument to a value rang of 0 to 1.

Block 266 comprises constructing TPB coefficients for the global reshaping function and each (e.g., the l-th local reshaping function, etc.) of the local reshaping functions.

Based on the (original) 3DMT pairs as defined in expressions (19) above, first TPB coefficients (denoted as $\overline{m}^{TPB,Y}$) for the global reshaping functions can be constructed. More specifically, the global reshaping function may be specified with the first TPB coefficients $\overline{m}^{TPB,Y}$ and a complete set of $D^y$ tensor product B-Spline basis functions denoted as $B_i^y$, where i represents an integer between 0 and $D^y-1$. A design matrix $S^Y$ may be defined based on the tensor product B-Spline basis functions and HDR luma and chroma codeword values $v_q^{(B)}$ of the 3D histogram bins in the 3D histogram in expression (19-1) above, as follows:

$$S^Y = \begin{bmatrix} B_0^y(v_0^{y,(B)}, v_0^{C_0,(B)}, v_0^{C_1,(B)}) & B_1^y(v_0^{y,(B)}, v_0^{C_0,(B)}, v_0^{C_1,(B)}) & \cdots & B_{D^y-1}^y(v_0^{y,(B)}, v_0^{C_0,(B)}, v_0^{C_1,(B)}) \\ B_0^y(v_1^{y,(B)}, v_1^{C_0,(B)}, v_1^{C_1,(B)}) & B_1^y(v_1^{y,(B)}, v_1^{C_0,(B)}, v_1^{C_1,(B)}) & \cdots & B_{D^y-1}^y(v_1^{y,(B)}, v_1^{C_0,(B)}, v_1^{C_1,(B)}) \\ \vdots & \vdots & & \vdots \\ B_0^y(v_{k-1}^{y,(B)}, v_{k-1}^{C_0,(B)}, v_{k-1}^{C_1,(B)}) & B_1^y(v_{k-1}^{y,(B)}, v_{k-1}^{C_0,(B)}, v_{k-1}^{C_1,(B)}) & \cdots & B_{D^y-1}^y(v_{k-1}^{y,(B)}, v_{k-1}^{C_0,(B)}, v_{k-1}^{C_1,(B)}) \end{bmatrix} \quad (23)$$

A vector $\bar{s}^Y$ may be constructed based on the average SDR or mapped values $\overline{\Psi}_q^{Q,s}$ of the 3D histogram bins in the 3D histogram in expression (19-2) above, as follows:

$$\bar{s}^Y = \begin{bmatrix} \overline{\Psi}^{Q,s}_{Y,0} \\ \overline{\Psi}^{Q,s}_{Y,1} \\ \vdots \\ \overline{\Psi}^{Q,s}_{Y,k-1} \end{bmatrix} \quad (24)$$

An optimized global reshaping solution or optimized values for the first TPB coefficients $\overline{m}^{TPB,Y}$ can be obtained (e.g., in a closed form, etc.) via the least squared solution, as follows:

$$\overline{m}^{TPB,Y} = ((S^Y)^T S^Y)^{-1}((S^Y)^T \bar{s}^Y) \quad (25)$$

The foregoing operations used to obtain the optimal values for the first TPB coefficients $\overline{m}^{TPB,Y}$ for the global reshaping function can be extended to obtain second TPB coefficients (denoted as $\overline{m}^{TPB,Y}_{<l>}$) for each of L local reshaping functions, (l=0, . . . , L−1). In these extended operations, the vector $\bar{s}^Y$ in expression (24) for the global reshaping function can be replaced with a respective vector denoted as $\bar{s}^Y_{<l>}$ for each of the L local reshaping functions (l=0, . . . , L−1) as follows:

$$\bar{s}^Y_{<l>} = \begin{bmatrix} \overline{\Psi}^{Q,s}_{Y,0,<l>} \\ \overline{\Psi}^{Q,s}_{Y,1,<l>} \\ \vdots \\ \overline{\Psi}^{Q,s}_{Y,k-1,<l>} \end{bmatrix} \quad (26)$$

Similar to the case of global reshaping functions, an optimized local reshaping solution or optimized values for the second TPB coefficients $\overline{m}^{TPB,Y}_{<l>}$ for each of the L local reshaping functions, (l=0, . . . , L−1), can be obtained (e.g., in a closed form, etc.) via the least squared solution, as follows:

$$\overline{m}^{TPB,Y}_{<l>} = ((S^Y)^T S^Y)^{-1}((S^Y)^T \bar{s}^Y_{<l>}) \quad (27)$$

Block 268 comprises constructing (e.g., fused, etc.) TPB based local reshaping functions. Similar to the single channel local reshaping/prediction, local reshaping functions with higher local contrast may generate out-of-range values that would be hard clipped with the range of allowable codeword values, thereby possibly generating visual artifacts. To avoid or reduce hard clipping, soft clipping may be used by fusing the global and local functions together with respective weighting factors.

Given the l-th local reshaping function as generated in block 266, a global reshaping function weighting factor denoted as $\theta_{<l>}^{Y,G}$ and a local reshaping function weighting factor denoted as $\theta_{<l>}^{Y,L}$ may be assigned to the global reshaping function and the l-th local reshaping function, respectively. In some operational scenarios, the two weighting factors satisfy a constraint/condition such as illustrated in expression (15) above. Hence local reshaping as described herein may be performed using fused local reshaping functions generated by fusing the first TPB coefficients for the global reshaping functions and the second TPB coefficients for the local reshaping functions as follows:

$$m^{TPB,Y}_{<l>} = \theta_{<l>}^{Y,G}\overline{m}^{TPB,Y} + \theta_{<l>}^{Y,L}\overline{m}^{TPB,Y}_{<l>} \quad (28)$$

Pre-Built Cross-Channel Luma Local Reshaping

In some operational scenarios, in addition to or in place of the self-derived cross-channel local reshaping as discussed above, a plurality of pre-built cross-channel global reshaping functions $F_{<g>}^Y( )$ respectively indexed by global reshaping function index values denoted as g can be obtained through offline training. These pre-built global reshaping functions may be used to generate local reshaping functions respectively indexed by local reshaping function index values l, for example in the forward path, as follows:

$$F_{<l>}( ) = F_{<g>}^Y( ) \quad (29\text{-}1)$$

where $$g = l \quad (29\text{-}2)$$

Similarly, in the backward path, local reshaping functions denoted as $B_{<l>}( )$ can be generated from pre-built global reshaping functions denoted as $B_{<g>}^Y( )$, as follows:

$$B_{<l>}( ) = B_{<g>}^Y( ) \quad (30)$$

Hybrid of Pre-Defined and Self-Derived
Cross-Channel Luma Local Reshaping

In some operational scenarios, a hybrid approach combining pre-defined and self-derived single-channel local reshaping may be used to generate local reshaping functions.

In some embodiments, one or more 3DMTs can be generated in offline training with one or more sets of training image pairs in training data, respectively. Each training image pair in the one or more respective sets of training image pairs may comprise an input HDR image and a corresponding input SDR image depicting the same visual semantic content as the input HDR image. In an example, the corresponding input SDR image may have been used (e.g., through previously performed content mapping, tone mapping and/or reshaping operations, etc.) to generate the input HDR image. In another example, the corresponding input SDR image may have been generated (e.g., through previously performed content mapping, tone mapping and/or reshaping operations, etc.) from the input HDR image.

Each 3DMT in the one or more 3DMTs can be generated with a respective set of training image pairs in the training data. Image data such as luma and chroma codewords in the respective set of training image pairs can be used to generate statistics collected in the corresponding 3DMT. These statistics can be used to form a plurality of 3DMT mapping pairs for the corresponding 3DMT. Some or all of the one or more 3DMTs, statistics and/or 3DMT mapping pairs in the one or more 3DMTs can be stored, cached and/or loaded at system bootup time.

Each 3DMT in the one or more 3DMTs can be indexed by a respective index value (e.g., g, etc.) for lookup purposes. In some operational scenarios, an index value (e.g., g, etc.) uniquely identifying a corresponding 3DMT in the one or more 3DMTs may be an L1 mid value. Example mid L values can be found in the previously mentioned U.S. Provisional Patent Application Ser. No. 63/086,699.

FIG. 20 illustrates an example flow for combining self-derived cross-channel local function generation and pre-built cross-channel local function generation.

Block 262' comprises reusing or selecting a 3DMT generated with a corresponding set of training image pairs. In some operational scenarios, a distribution of input codeword values determined from an input HDR image can be used to compute or predict an index value (denoted as g) such as a mid L value. The index value can be used to lookup, identify or select the 3DMT from among the one or more 3DMTs. The selected 3DMT may be generated based on image data in the g-th set of training image pairs including the g-th SDR data.

As a result, a plurality of 3DMT mapping pairs $\{v_q^{(B)}\}$ and $\{\Psi_q^{Q,s,<g>}\}$ may be constructed or generated from the 3DMT as follows:

$$v_q^{(B)} = [v_q^{y,(B)} \ v_q^{C_0,(B)} \ v_q^{C_1,(B)}]^T \quad (31\text{-}1)$$

$$\Psi_q^{Q,s,<g>} = [\Psi_{Y,q}^{Q,s,<g>} \ \Psi_{C_0,q}^{Q,s,<g>} \ \Psi_{C_1,q}^{Q,s,<g>}]^T \quad (31\text{-}2)$$

Block 264' comprises building an individual modified 3DMT for each local reshaping function (e.g., the l-th local reshaping function, etc.).

To effectuate changes in local contrast, a function denoted as $h_Y(\ )$ can be used to modify averages of SDR codewords values in the 3DMT mapping pairs, as follows:

$$\Psi_{Y,q}^{Q,s,<g>} = h_Y(\Psi_{Y,q}^{Q,s,<g>}) \quad (32)$$

A point at which the global reshaping function and the l-th local reshaping function intersect—e.g., for the purpose of maintaining similar brightness between the global reshaping function and the l-th local reshaping function in a local neighborhood in which local contrast ratio is increased—may be given as follows:

$$C_l^v = \frac{l}{L} \quad (33)$$

A linear scaling denoted as $\alpha_{<l>}$ ($\alpha_{<l>} < 1$ for increasing local contrast ratio, $\alpha_{<l>} > 1$ for reducing local contrast ratio) for the $l^{th}$ local reshaping function may be used in the following expression to change averages or mapped values of SDR codewords in the 3DMT mapping pairs, as follows:

$$\bar{\Psi}_{Y,q,<l>}^{Q,s,<l>} = \text{clip3}\left(\frac{1}{\alpha_{<l>}}\left(\bar{\Psi}_{Y,q}^{Q,s,<g>} - C_l^v\right), 0, 1\right) \quad (34)$$

Block 266' comprises constructing first TPB coefficients for the global reshaping function and second TPB coefficients for the l-th local reshaping function.

More specifically, based on the original 3DMT mapping pairs generated with the training data, the first TPB coefficients can be derived or generated with a design matrix $S^Y$ and a vector $\bar{s}^{Y,<g>}$, as follows:

$$S^Y = \begin{bmatrix} B_0^y(v_0^{y,(B)}, v_0^{C_0,(B)}, v_0^{C_1,(B)}) & B_1^y(v_0^{y,(B)}, v_0^{C_0,(B)}, v_0^{C_1,(B)}) & \cdots & B_{D^y-1}^y(v_0^{y,(B)}, v_0^{C_0,(B)}, v_0^{C_1,(B)}) \\ B_0^y(v_1^{y,(B)}, v_1^{C_0,(B)}, v_1^{C_1,(B)}) & B_1^y(v_1^{y,(B)}, v_1^{C_0,(B)}, v_1^{C_1,(B)}) & \cdots & B_{D^y-1}^y(v_1^{y,(B)}, v_1^{C_0,(B)}, v_1^{C_1,(B)}) \\ \vdots & \vdots & & \vdots \\ B_0^y(v_{k-1}^{y,(B)}, v_{k-1}^{C_0,(B)}, v_{k-1}^{C_1,(B)}) & B_1^y(v_{k-1}^{y,(B)}, v_{k-1}^{C_0,(B)}, v_{k-1}^{C_1,(B)}) & \cdots & B_{D^y-1}^y(v_{k-1}^{y,(B)}, v_{k-1}^{C_0,(B)}, v_{k-1}^{C_1,(B)}) \end{bmatrix} \quad (35)$$

$$\bar{s}^{Y,<g>} = \begin{bmatrix} \bar{\Psi}_{Y,0}^{Q,s,<g>} \\ \bar{\Psi}_{Y,1}^{Q,s,<g>} \\ \vdots \\ \bar{\Psi}_{Y,k-1}^{Q,s,<g>} \end{bmatrix} \quad (36)$$

where $B_0^y(,,), \ldots, B_{D^y-1}^y(,,)$ represent TPB basis functions.

An optimized global reshaping solution or optimized values for the first TPB coefficients $\bar{m}_{<l>}^{TPB,Y,<g>}$ can be obtained (e.g., in a closed form, etc.) via the least squared solution, as follows:

$$\bar{m}_{<l>}^{TPB,Y,<g>} = ((S^Y)^T S^Y)^{-1}((S^Y)^T \bar{s}^{Y,<g>}) \quad (37)$$

The foregoing operations used to obtain the optimal values for the first TPB coefficients $\bar{m}_{<l>}^{TPB,Y,<g>}$ for the global reshaping function can be extended to obtain second TPB coefficients (denoted as $\bar{m}_{<l>}^{TPB,Y,<g>}$) for each of the L local reshaping functions, (l=0, ..., L−1). In these extended operations, the vector $\bar{s}^Y$ in expression (36) for the global reshaping function can be replaced with a respective vector denoted as $\bar{s}_{<l>}^{Y,<g>}$ for each of the L local reshaping functions (l=0, ..., L−1) as follows:

$$\bar{s}_{<l>}^{Y,<g>} = \begin{bmatrix} \bar{\Psi}_{Y,0,<l>}^{Q,s,<g>} \\ \bar{\Psi}_{Y,1,<l>}^{Q,s,<g>} \\ \vdots \\ \bar{\Psi}_{Y,k-1,<l>}^{Q,s,<g>} \end{bmatrix} \quad (38)$$

Similar to the case of global reshaping functions, an optimized local reshaping solution or optimized values for the second TPB coefficients $\bar{m}_{<l>}^{TPB,Y,<g>}$ for each of the L local reshaping functions, (l=0, ..., L−1), can be obtained (e.g., in a closed form, etc.) via the least squared solution, as follows:

$$\bar{m}_{<l>}^{TPB,Y,<g>} = ((S^Y)^T S^Y)^{-1}((S^Y)^T \bar{s}_{<l>}^{Y,<g>}) \quad (39)$$

Block 268' comprises constructing (e.g., fused, etc.) TPB based local reshaping functions. Similar to the single channel local reshaping/prediction, local reshaping functions with higher local contrast may generate out-of-range values that would be hard clipped with the range of allowable codeword values, thereby possibly generating visual artifacts. To avoid or reduce hard clipping, soft clipping may be used by fusing the global and local functions together with respective weighting factors.

Given the l-th local reshaping function as generated in block 266', a global reshaping function weighting factor denoted as $\theta_{<l>}^{Y,G}$ and a local reshaping function weighting factor denoted as $\theta_{<l>}^{Y,L}$ may be assigned to the global reshaping function and the l-th local reshaping function, respectively. In some operational scenarios, the two weighting factors satisfy a constraint/condition such as illustrated in expression (15) above. Hence local reshaping as described herein may be performed using fused local reshaping functions generated by fusing the first TPB coefficients for the global reshaping functions and the second TPB coefficients for the local reshaping functions as follows:

$$m_{<l>}^{TPB,Y,<g>} = \theta_{<l>}^{Y,G} \bar{m}_{<l>}^{TPB,Y,<g>} + \theta_{<l>}^{Y,L} \bar{\bar{m}}_{<l>}^{TPB,Y,<g>} \quad (40)$$

FIG. 2P illustrates an example flow using 3DMTs to generate a plurality of cross-channel local reshaping functions for performing (e.g., forward, etc.) local reshaping on an input HDR image 272. The cross-channel local reshaping functions can be generated at least in part based on enhancement parameters 274 such as $\alpha_{<l>}$, $\theta_{<l>}^{Y,G}$ and $\theta_{<l>}^{Y,L}$ for effectuating local contrast changes and soft clipping.

Block 276 comprises building a 3DMT using a 3D histogram with mapping pair (or entries) storing counts of HDR pixels in the input HDR image (272) and averages of a corresponding input SDR image in an image pair formed by the input HDR image and the input SDR image.

In an example, the corresponding input SDR image may have been used (e.g., through previously performed content mapping, tone mapping and/or reshaping operations, etc.) to generate the HDR image (272). In another example, the corresponding input SDR image may have been generated (e.g., through previously performed content mapping, tone mapping and/or reshaping operations, etc.) from the HDR image (272).

Block 278 comprises using the 3DMT to build a global reshaping function. For example, first TPB coefficients may be generated to specify the global reshaping function with a complete set of tensor product B-spline basis functions.

Block 280 comprises using the enhancement parameters for local contrast changes $\alpha_{<l>}$ to modify the 3DMT into a respective modified 3DMT represented by a modified 3D histogram for each cross-channel local reshaping function in the plurality of cross-channel local reshaping functions used for local reshaping.

Block 282 comprises using the modified 3DMT to build a pre-fusing local reshaping function. The pre-fusing local reshaping function can be fused with the global reshaping function into the cross-channel local reshaping function in the plurality of cross-channel local reshaping functions used for local reshaping. For example, second TPB coefficients may be generated to specify the pre-fusing local reshaping function with the tensor product B-spline basis functions.

Block 284 comprises using the enhancement parameters $\theta_{<l>}^{Y,G}$ and $\theta_{<l>}^{Y,L}$ for soft clipping to perform weighted fusing with both the global reshaping function and the pre-fusing local reshaping function to generate the corresponding fused cross-channel local reshaping function. Block 286 comprises outputting the plurality of (fused) cross-channel local reshaping functions.

Guidance Image for Luma Local Reshaping

A guided image M=G(V) may be generated in one or more different methods to provide local reshaping function index values for pixels of an input image. In some operational scenarios, to avoid or reduce visual artifacts such as halo artifacts (e.g., near edges of image features/objects, near or around boundary between background and foreground, etc.), a multi-level edge-preserving filter may be applied to generate the guided image. Example guided image generation with multi-level edge-preserving filtering can be found in the previously mentioned U.S. Provisional Application Ser. No. 63/086,699.

While local reshaping can increase the local contrast ratio, it can also increase the possibility to introduce false contouring or banding artifacts, especially when the local reshaping is performed from an high bit depth input domain (or input color space) to a low bit depth domain (or output color space) with output images having a lower bit depth than input images.

Film grain injection on a high bit depth video signal encoded with the input images—such as described in U.S. Provisional Application Ser. No. 63/061,937, titled "ADAPTIVE STREAMING WITH FALSE CONTOURING ALLEVIATION," filed on Aug. 6, 2020, the entire contents of which are incorporated by reference in its entirety as if fully set forth herein—may not be sufficient to avoid or significantly reduce banding artifacts, as the output domain has fewer available codewords than the input domain. This banding artifact problem can become worse when local contrast ratio is increased by the local reshaping. Additionally, optionally or alternatively, film grain noise may be significantly introduced at the expense of resulting in an annoying visual look.

To overcome or ameliorate the banding artifact problem, local reshaping function selection dithering may be implemented or performed to avoid or reduce banding artifacts.

FIG. 2Q illustrates an example flow for local reshaping function selection dithering. Block 288 comprises performing local reshaping index noise injection. For example, Gaussian noise may be injected into local reshaping function indexes, $m_i$, in the guided image M to generate a noise injected guided image comprising noise injected local reshaping function indexes $\tilde{m}_i$, as follows:

$$\tilde{m}_i = \text{clip3}(\text{round}(m_i + n_i^I), 0, L-1) \quad (41)$$

where $n_i^I$ represents Gaussian random noise $N(0, \sigma^2)$.

Block 290 comprises performing noise injection in locally reshaped codeword values generated with local reshaping functions selected based on the noise injected guided image or the noise injected local reshaping function indexes $\tilde{m}_i$ therein.

The locally (e.g., forward, etc.) reshaped codeword values can be given by $F_{<\tilde{m}_i>}(v_i)$ for each pixel (e.g., the i-th pixel, etc.) of the input image with a respective noise injected index value $\tilde{m}_i$ in the noise injected guided image. Final output locally reshaped values may be generated by adding a luma modulated film grain noise—such as described in the previously mentioned U.S. Provisional Application Ser. No. 63/061,937—to the locally reshaped codeword values, as follows:

$$\tilde{s}_i = F_{<\tilde{m}_i>}(v_i) + g(v_i) n_i^f \qquad (42)$$

where $n_i^f$ represents film grain noise such as Gaussian random noise and $g(v_i)$ represents a luma modulation function used to adjust noise strengths in different luminance sub-ranges.

In some operational scenarios, the luma modulation function can be based on global reshaping function. In some operational scenarios, the luma modulation function can be based on local reshaping function. An entire luma range of the input domain (or color space) can be partitioned into multiple non-overlapping bins with an interval denoted as $\Delta_v$. A discrete slope in interval k can be given as follows:

For (or based on) global reshaping $$F'_{<g>}(k\Delta_v) = \frac{F_{<g>}((k+1)\Delta_v) - F_{<g>}(k\Delta_v)}{\Delta_v} \qquad (43\text{-}1)$$

For (or based on) local reshaping $$F'_{<\tilde{m}_i>}(k\Delta_v) = \frac{F_{<\tilde{m}_i>}((k+1)\Delta_v) - F_{<\tilde{m}_i>}(k\Delta_v)}{\Delta_v} \qquad (43\text{-}2)$$

The maximum or highest slope $F_{<\,>}^{',max}$ among all k, < > is either global as <g> or local <$\tilde{m}_i$> may be identified, as follows:

$$F_{<\,>}^{',max} = \max\{F'_{<\,>}(k\Delta_v)\} \qquad (44)$$

Slopes for all bins can be normalized with the maximum slope, as follows:

$$\bar{F}'_{<\,>}(k\Delta_v) = \frac{F'_{<\,>}(k\Delta_v)}{F_{<\,>}^{',max}} \qquad (45)$$

where $\bar{F}'_{<\,>}(k\Delta_v)$ on the LHS represents the normalized slopes, whereas $F'_{<\,>}(k\Delta_v)$ on the RHS represents the pre-normalized slopes.

The higher value $\bar{F}'_{<\,>}(k\Delta_v)$ is for a bin, the more codewords the bin is allocated so the lower the banding risk is for that bin—as a result, noise injected in that bin can be smaller. On the other hand, the lower value $\bar{F}'_{<\,>}(k\Delta_v)$ is for a bin, the few codewords the bin is allocated so the higher the banding risk is for that bin—as a result, noise injected in that bin can be higher.

In some operational scenarios, the luma modulation function can be defined, depending an inverse function of normalized slope $\bar{F}'_{<\,>}(k\Delta_v)$.

Denote maximum and minimum noise strengths (e.g., as specified by a user, preconfigured, dynamically configurable, etc.) to be added in expression (42) above as $\psi_{max}$ and $\psi_{min}$, specified from user. For each input codeword $v_i$ in the input image, an applicable noise strength as represented by the luma modulation function can be designed or derived, as follows:

$$\psi_{v_i} = \psi_{min} + (\psi_{max} - \psi_{min})\left(1 - \bar{F}'_{<\,>}\left(\left\lfloor \frac{v_i}{\Delta_v} \right\rfloor\right)\right) \qquad (46)$$

where $\lfloor \cdot \rfloor$ represents the floor operation.

To avoid or reduce computation costs, the luma modulation function can be derived in expression (46) above depend on slopes computed with the global reshaping function.

In some operational scenarios, a combination of local reshaping function index dithering and film grain noise injection in locally reshaped codeword values can effectively avoid or reduce banding artifacts, especially when the output images are 8-bit images.

Chroma Local Reshaping

In some operational scenarios, output or reshaped chroma codewords of an output image can be generated from performing (e.g., cross-channel, etc.) chroma local reshaping on input or pre-reshaped chroma codewords of an input image based on the input or pre-reshaped luma and chroma codewords of the input image.

A chroma local reshaping (function) family for chroma local reshaping can be generated in a number of different ways such as self-derived local reshaping, pre-built local reshaping, a combination or hybrid of the foregoing, etc.

Either MMR or TPB based techniques can be implemented or performed to construct chroma local reshaping mappings/functions. Methods and/or processes used to build or generate operational parameters for chroma local reshaping such as coefficients for both MMR-based or TPB based local reshaping functions are the same or similar to each other with the (e.g., only, main, etc.) difference being basis functions used in the optimization problem for obtaining optimized values for the coefficients. For MMR, polynomial basis functions/terms are used as basis functions in conjunction with MMR coefficients. For TPB, tensor-productor B-Spline basis functions are used as basis functions in conjunction with TPB coefficients. Both MMR or TPB reshaping functions involve building 3DMT and modifying the 3DMT.

Self-Derived Chroma Local Reshaping

It may not be straightforward to directly derive local chroma reshaping functions from a (e.g., free-form, etc.) global chroma reshaping function, as chroma reshaping may use (e.g., MMR based, TPB based, etc.) cross-color channel predictors. Similar to cross-channel luma local reshaping, cross-channel chroma local reshaping on an input image can go back to an original 3DMT relating to a global reshaping function or mapping and make modification to the original 3DMT to obtain local reshaping functions or mappings for local changes (e.g., local enhanced saturation, local diminished saturation, etc.). The 3DMT can be constructed in online and/or offline computation. In some operational scenarios, two global chroma reshaping functions for each of the two chroma channels Cb and Cr can be generated and fused with to generate a respective local reshaping function of the two (e.g., post-fusing, etc.) local reshaping functions for each of the two chroma channels Cb and Cr.

FIG. 2R illustrates an example flow for generating (e.g., MMR based, TPB based, etc.) coefficients for chroma local reshaping functions/mappings using self-derived chroma local reshaping.

Block 292 comprises building a 3DMT relating to a global reshaping function or mapping, for example, based on an image pair (e.g., a to-be-locally-reshaped HDR image and a corresponding SDR image, etc.). The 3DMT can be built using the same or similar operations—such as described in TABLEs (1) through (3) above—used to cross-channel luma local reshaping.

As a result, a plurality of 3DMT mapping pairs as illustrated in expressions (19) can be generated for the 3DMT. The plurality of 3DMT mapping pairs can then be used to derive the global reshaping function or mapping as well as to be modified or enhanced for the purpose of generating a second global chroma reshaping functions or mappings.

Block 294 comprises modifying the 3DMT or mapped values in the mapping pairs. To effectuate changes in saturation, a function denoted as $h_c(\ )$ can be designed and applied to average SDR or mapped values $\Psi_{Y,q}^{Q,s}$ in each 3D histogram bin (indexed by a valid q with a non-zero HDR pixel count) of the 3D histogram to obtain modified average SDR or mapped values $\Psi_{Y,q}^{Q,s}$, as follows:

$$(\tilde{\Psi}_{C_0,q}^{Q,s}, \tilde{\Psi}_{C_1,q}^{Q,s}) = h_c(\Psi_{C_0,q}^{Q,s}, \Psi_{C_1,q}^{Q,s}) \quad (47)$$

The function $h_c(\ )$ comprises first converting shifted Cb/Cr (e.g., in reference to a neural color point of (0.5, 0.5) instead of the non-neutral color origin (0,0), etc.) in the Cartesian coordinate system of Cb (denoted as $C_0$) and Cr (denoted as $C_1$) to a polar coordinate system of polar radius ρ and polar angle θ, as follows:

$$\theta_{C,q}^{Q,s} = \mathrm{atan2}(\Psi_{C_0,q}^{Q,s}-0.5, \Psi_{C_1,q}^{Q,s}-0.5) \quad (48\text{-}1)$$

$$\rho_{C,q}^{Q,s} = \sqrt{(\Psi_{C_0,q}^{Q,s}-0.5)^2 + (\Psi_{C_1,q}^{Q,s}-0.5)^2} \quad (48\text{-}2)$$

The function $h_c(\ )$ comprises further applying a non-linear function or mapping on saturation represented by the polar radius $\rho_{C,q}^{Q,s}$, as follows:

$$\tilde{\rho}_{C,q}^{Q,s} = \begin{cases} \rho_{C,q}^{Q,s} & \text{if } \rho_{C,q}^{Q,s} < \delta_c \\ \dfrac{(M_c - \delta_c)}{(M_c - \delta_c)^\beta}(\rho_{C,q}^{Q,s} - \delta_c)^\beta + \delta_c & \text{if } \rho_{C,q}^{Q,s} \geq \delta_c \end{cases} \quad (49)$$

where $\delta_c$ represents a threshold for maintaining linear mapping in near neutral colors. $M_c$ represents the maximal possible value of $\rho_{C,q}^{Q,s}$, which is 0.5 when the chroma values are normalized and shifted in reference to the neutral color point (05, 0.5) instead of the non-neutral color origin (0,0). β represents a (e.g., pre-configured, adaptable, actual, etc.) design parameter used to effectuate saturation changes. Example values of $\delta_c$ may, but are not necessarily limited to, only, include 0.05. Example values of β may, but are not necessarily limited to only, include 0.5.

As shown in expression (49) above, for near neural colors (e.g., $\rho_{C,q}^{Q,s} < \delta_c$, etc.), linear mapping is used to avoid or prevent changing the near neutral colors, more specifically their hues.

Figure 3I:
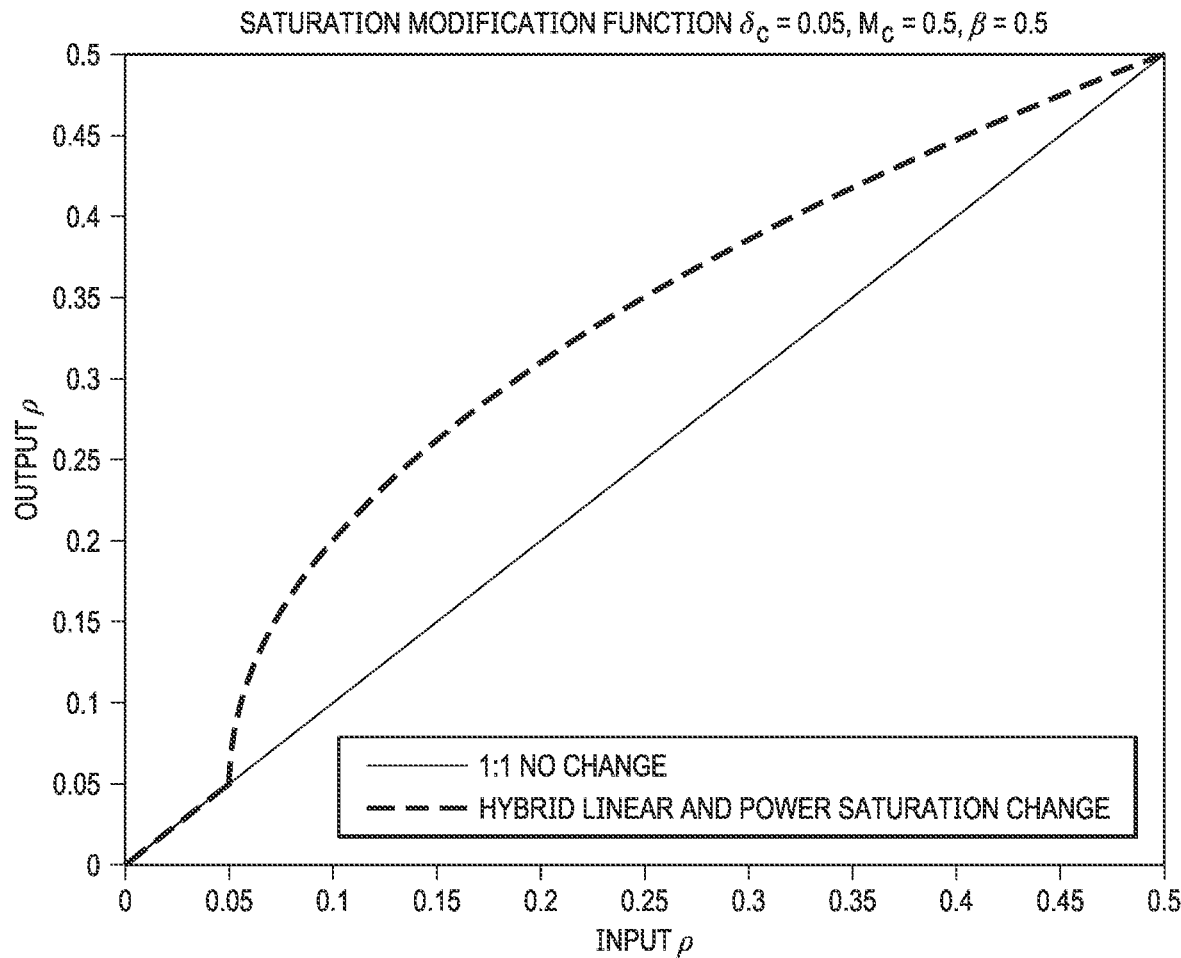
FIG. 3I illustrates an example non-linear function used to effectuate changes in saturation.

FIG. 3I illustrates an example non-linear function $h_c(\ )$ used to effectuate changes in saturation as specified in expression (49) above.

Modified shifted Cb/Cr values generated from the non-linear function $h_c(\ )$ can be converted from the polar coordinate system back to the Cartesian coordinate system. The modified shifted Cb/Cr values converted into the Cartesian coordinate system can be shifted back to generate modified Cb/Cr values by adding back an offset of 0.5, as follows:

$$\tilde{\Psi}_{C_0,q}^{Q,s} = \mathrm{clip3}(\tilde{\rho}_{C,q}^{Q,s}*\cos(\theta_{C,q}^{Q,s})+0.5, 0, 1) \quad (50\text{-}1)$$

$$\tilde{\Psi}_{C_1,q}^{Q,s} = \mathrm{clip3}(\tilde{\rho}_{C,q}^{Q,s}*\sin(\theta_{C,q}^{Q,s})+0.5, 0, 1) \quad (50\text{-}1)$$

The modified Cb/Cr values in expressions (50) above can be used in part to form a plurality of modified 3DMT mapping pairs for a modified 3DMT, as follows:

$$v_q^{(B)} = [v_q^{y,(B)}\ v_q^{C_0,(B)}\ v_q^{C_1,(B)}]^T \quad (51\text{-}1)$$

$$\tilde{\Psi}_q^{Q,s} = [\Psi_{Y,q}^{Q,s}\ \tilde{\Psi}_{C_0,q}^{Q,s}\ \tilde{\Psi}_{C_1,q}^{Q,s}]^T \quad (51\text{-}2)$$

Block 296 comprises constructing or generating first (e.g., MMR, TPB, etc.) coefficients for the global reshaping function from the plurality of (original) 3DMT mapping pairs as well as constructing or generating second (e.g., MMR, TPB, etc.) coefficients for the second globalreshaping function from the plurality of modified 3DMT mapping pairs in the modified 3DMT.

For example, based on the original 3DMT pairs built with original colors, the first coefficients can be constructed or generated with a design matrix $S^{C_x}$ and a vector $\bar{s}^{C_x}$, as follows:

$$S^{C_x} = \begin{bmatrix} B_0^{C_x}\!\left(v_0^{y,(B)}, v_0^{C_0,(B)}, v_0^{C_1,(B)}\right) & B_1^{C_x}\!\left(v_0^{y,(B)}, v_0^{C_0,(B)}, v_0^{C_1,(B)}\right) & \cdots & B_{D_{C_x}-1}^{C_x}\!\left(v_0^{y,(B)}, v_0^{C_0,(B)}, v_0^{C_1,(B)}\right) \\ B_0^{C_x}\!\left(v_1^{y,(B)}, v_1^{C_0,(B)}, v_1^{C_1,(B)}\right) & B_1^{C_x}\!\left(v_1^{y,(B)}, v_1^{C_0,(B)}, v_1^{C_1,(B)}\right) & \cdots & B_{D_{C_x}-1}^{C_x}\!\left(v_1^{y,(B)}, v_1^{C_0,(B)}, v_1^{C_1,(B)}\right) \\ \vdots & \vdots & & \vdots \\ B_0^{C_x}\!\left(v_{k-1}^{y,(B)}, v_{k-1}^{C_0,(B)}, v_{k-1}^{C_1,(B)}\right) & B_1^{C_x}\!\left(v_{k-1}^{y,(B)}, v_{k-1}^{C_0,(B)}, v_{k-1}^{C_1,(B)}\right) & \cdots & B_{D_{C_x}-1}^{C_x}\!\left(v_{k-1}^{y,(B)}, v_{k-1}^{C_0,(B)}, v_{k-1}^{C_1,(B)}\right) \end{bmatrix} \quad (52)$$

$$\bar{s}^{C_x} = \begin{bmatrix} \bar{\Psi}_{C_x,0}^{Q,s} \\ \bar{\Psi}_{C_x,1}^{Q,s} \\ \vdots \\ \bar{\Psi}_{C_x,k-1}^{Q,s} \end{bmatrix} \quad (53)$$

where $B_0^y(,,), \ldots, B_{D^y-1}^y(,,)$ represent MMR/TPB basis functions.

An optimized global reshaping solution or optimized values for the first coefficients (denoted as $\overline{m}^{C_x}$) can be obtained (e.g., in a closed form, etc.) via the least squared solution, as follows:

$$\overline{m}^{C_x} = ((S^{C_x})^T S^{C_x})^{-1} ((S^{C_x})^T \overline{s}^{C_x}) \tag{54}$$

The foregoing operations used to obtain the optimal values for the first coefficients $\overline{m}^{C_x}$ for the global reshaping function can be extended to obtain the second coefficients (denoted as $\overline{\overline{m}}^{C_x}$) for the second global reshaping function.

In these extended operations, the vector $\overline{s}^Y$ in expression (54) for the global reshaping function can be replaced with a respective vector denoted as $\overline{\overline{s}}^{C_x}$ for the second global local reshaping function as follows:

$$\overline{\overline{s}}^{C_x} = \begin{bmatrix} \overline{\overline{\Psi}}_{C_x,0}^{Q,s} \\ \overline{\overline{\Psi}}_{C_x,1}^{Q,s} \\ \vdots \\ \overline{\overline{\Psi}}_{C_x,k-1}^{Q,s} \end{bmatrix} \tag{55}$$

Similar to the case of global reshaping functions, an optimized local reshaping solution or optimized values for the second coefficients $\overline{\overline{m}}^{C_x}$ for the second global reshaping function can be obtained (e.g., in a closed form, etc.) via the least squared solution, as follows:

$$\overline{\overline{m}}^{C_x} = ((S^{C_x})^T S^{C_x})^{-1} ((S'^{C_x})^T \overline{\overline{s}}^{C_x}) \tag{56}$$

Block 298 comprises constructing (e.g., fused, MMR based, TPB based, etc.) local reshaping functions.

Given the first and second global reshaping functions as generated in block 296, a first global reshaping function weighting factor denoted as $\theta_{<l>}^{C_x,G1}$ and a second global reshaping function weighting factor denoted as $\theta_{<l>}^{C_x,G2}$ may be assigned to the first global reshaping function and the second global reshaping function, respectively. In some operational scenarios, the two weighting factors satisfy a constraint/condition as follows:

$$\theta_{<l>}^{C_x,G1} + \theta_{<l>}^{C_x,G2} = 1 \tag{57}$$

Hence local reshaping as described herein may be performed using fused local reshaping functions generated by fusing the first coefficients for the global reshaping functions and the second coefficients for the second global reshaping functions as follows:

$$m_{<l>}^{C_x} = \theta_{<l>}^{C_x,G1} \overline{m}^{C_x} + \theta_{<l>}^{C_x,G2} \overline{\overline{m}}^{C_x} \tag{58}$$

Pre-Built Cross-Channel Chroma Local Reshaping

In some operational scenarios, in addition to or in place of the self-derived cross-channel local reshaping as discussed above, a plurality of pre-built cross-channel global reshaping functions $F_{<g>}^{C_x}()$ respectively indexed by global reshaping function index values denoted as $g$ can be obtained through offline training with the g-th training data set comprising respective SDR-HDR image pairs.

For example, a plurality of 3DMT mapping pair $\{v_q^{(B)}\}$ and $\{\Psi_q^{Q,s,<g>}\}$ can be generated based on the g-th training data set as follows:

$$v_q^{(B)} = [v_q^{y,(B)} \ v_q^{C_0,(B)} \ v_q^{C_1,(B)}]^T \tag{59}$$

$$\Psi_q^{Q,s,<g>} = [\Psi_{y,q}^{Q,s,<g>} \ \Psi_{C_0,q}^{Q,s,<g>} \ \Psi_{C_1,q}^{Q,s,<g>}]^T \tag{60}$$

The g-th global reshaping function can be obtained, for example with the least squared solution approach as discussed above, as follows:

$$F_{<g>}^{C_x}() = ((S^{C_x})^T S^{C_x})^{-1} ((S^{C_x})^T \overline{s}^{C_x,<g>}) \tag{61}$$

These pre-built global reshaping functions may be used to generate local reshaping functions respectively indexed by local reshaping function index values l, for example in the forward path, as follows:

$$F_{<l>}^{C_x}() = F_{<g>}^{C_x}() \tag{62-1}$$

where $$g=l \tag{62-2}$$

Similarly, in the backward path, local reshaping functions denoted as $B_{<l>}^{C_x}()$ can be generated from pre-built global reshaping functions denoted as $B_{<g>}^{C_x}()$ as follows:

$$B_{<l>}^{C_x}() = B_{<g>}^{C_x}() \tag{63}$$

Hybrid of Pre-Defined and Self-Derived Chroma Local Reshaping

In some operational scenarios, a hybrid approach combining pre-defined and self-derived cross-channel chroma local reshaping may be used to generate local chroma reshaping functions.

In some embodiments, two or more 3DMTs can be generated in offline training with one or more sets of training image pairs in training data, respectively. Each training image pair in the two or more respective sets of training image pairs may comprise an input HDR image and a corresponding input SDR image depicting the same visual semantic content as the input HDR image. In an example, the corresponding input SDR image may have been used (e.g., through previously performed content mapping, tone mapping and/or reshaping operations, etc.) to generate the input HDR image. In another example, the corresponding input SDR image may have been generated (e.g., through previously performed content mapping, tone mapping and/or reshaping operations, etc.) from the input HDR image.

Each 3DMT in the two or more 3DMTs can be generated with a respective set of training image pairs in the training data. Image data such as luma and chroma codewords in the respective set of training image pairs can be used to generate statistics collected in the corresponding 3DMT. These statistics can be used to form a plurality of 3DMT mapping pairs for the corresponding 3DMT.

Each 3DMT in the two or more 3DMTs can be indexed by a respective index value (e.g., g, etc.) for lookup purposes. In some operational scenarios, an index value (e.g., g, etc.) uniquely identifying a corresponding 3DMT in the two or more 3DMTs may be an L1 mid value.

Two or more pre-built global chroma reshaping functions can be built from the two or more (original, unmodified) 3DMTs, respectively, using the self-derived local reshaping way approach as previously discussed. The two or more 3DMTs can be enhanced or modified with the same saturation factor or two or more different saturation factors to generate two or more modified 3DMTs, Two or more pre-fusing second global chroma reshaping functions can be built from the two or more modified 3DMTs, respectively, using the self-derived local reshaping way approach as previously discussed. Furthermore, the two or more global chroma reshaping functions from the two or more (original, unmodified) 3DMTs can be fused with the two or more pre-fusing second global chroma reshaping functions generated from the two or more modified 3DTMs, respectively, to generate two or more pre-built local chroma reshaping functions, using the self-derived local reshaping way approach as previously discussed.

Figure 2S:
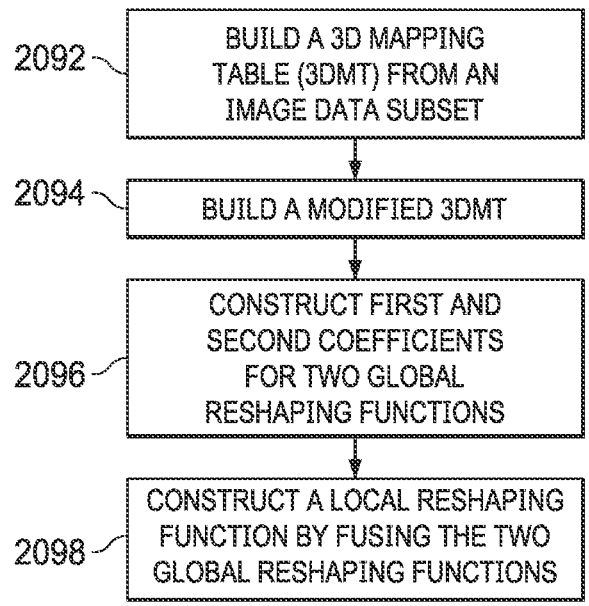

FIG. 2S illustrates an example flow for generating (e.g., MMR based, TPB based, etc.) coefficients for chroma local reshaping functions/mappings using a combination of pre-defined and self-derived chroma local reshaping.

Block 2092 comprises building a 3DMT relating to a global reshaping function or mapping based on an image data subset such as the g-th set of training image pairs selected from a plurality of sets of training image pairs. The 3DMT can be built using the same or similar operations—such as described in TABLEs (1) through (3) above—used to cross-channel luma local reshaping.

As a result, a plurality of 3DMT mapping pairs as illustrated in expressions (19) can be generated for the 3DMT, as follows:

$$v_q^{(B)} = [v_q^{y,(B)} \; v_q^{C_0,(B)} \; v_q^{C_1,(B)}]^T \quad (64\text{-}1)$$

$$\Psi_q^{Q,s,<g>} = [\Psi_{Y,q}^{Q,s,<g>} \Psi_{C_0,q}^{Q,s,<g>} \Psi_{C_1,q}^{Q,s,<g>}]^T \quad (64\text{-}2)$$

The plurality of 3DMT mapping pairs in expressions (64) can then be used to derive the global reshaping function or mapping as well as to be modified or enhanced for the purpose of generating a second chroma reshaping function or mapping. Block 2094 comprises modifying the 3DMT or mapped values in the mapping pairs to generate a modified 3DMT.

To effectuate changes in saturation, a function denoted as $h_c(\;)$ can be designed and applied to average SDR or mapped values $\Psi_q^{Q,s,<g>}$ in each 3D histogram bin (indexed by a valid q with a non-zero HDR pixel count) of the 3D histogram to obtain modified average SDR or mapped values $\widetilde{\Psi}_{C_1,q}^{Q,s,<g>}$, as follows:

$$(\widetilde{\Psi}_{C_0,q}^{Q,s,<g>}, \widetilde{\Psi}_{C_1,q}^{Q,s,<g>}) = h_c(\Psi_{C_0,q}^{Q,s,<g>}, \Psi_{C_1,q}^{Q,s,<g>}) \quad (65)$$

The function $h_c(\;)$ comprises first converting shifted Cb/Cr (e.g., in reference to a neural color point of (0.5, 0.5) instead of the non-neutral color origin (0,0), etc.) in the Cartesian coordinate system of Cb (denoted as $C_0$) and Cr (denoted as $C_1$) to a polar coordinate system of polar radius $\rho$ and polar angle $\theta$, as follows:

$$\theta_{C,q}^{Q,s,<g>} = \operatorname{atan2}(\Psi_{C_0,q}^{Q,s,<g>} - 0.5, \Psi_{C_1,q}^{Q,s,<g>} - 0.5) \quad (66\text{-}1)$$

$$\rho_{C,q}^{Q,s,<g>} = \sqrt{(\Psi_{C_0,q}^{Q,s,<g>} - 0.5)^2 + (\Psi_{C_1,q}^{Q,s,<g>} - 0.5)^2} \quad (66\text{-}2)$$

The function $h_c(\;)$ comprises further applying a non-linear function or mapping on saturation represented by the polar radius $\rho_{C,q}^{Q,s,<g>}$, as follows:

$$\tilde{\rho}_{C,q}^{Q,s,<g>} = \begin{cases} \rho_{C,q}^{Q,s,<g>} & \text{if } \rho_{C,q}^{Q,s,<g>} < \delta_c \\ \dfrac{(M_c - \delta_c)}{(M_c - \delta_c)^\beta}(\rho_{C,q}^{Q,s,<g>} - \delta_c)^\beta + \delta_c & \text{if } \rho_{C,q}^{Q,s,<g>} \geq \delta_c \end{cases} \quad (67)$$

where $\delta_c$ represents a threshold for maintaining linear mapping in near neutral colors. $M_c$ represents the maximal possible value of $\rho_{C,q}^{Q,s,<g>}$, which is 0.5 when the chroma values are normalized and shifted in reference to the neutral color point (05, 0.5) instead of the non-neutral color origin (0,0). $\beta$ represents a (e.g., pre-configured, adaptable, actual, etc.) design parameter used to effectuate saturation changes. Example values of $\delta_c$ may, but are not necessarily limited to only, include 0.05. Example values of $\beta$ may, but are not necessarily limited to only, include 0.5.

As shown in expression (67) above, for near neural colors (e.g., $\rho_{C,q}^{Q,s,<g>} < \delta_c$, etc.), linear mapping is used to avoid or prevent changing the near neutral colors, more specifically their hues.

Modified shifted Cb/Cr values generated from the non-linear function $h_c(\;)$ can be converted from the polar coordinate system back to the Cartesian coordinate system. The modified shifted Cb/Cr values converted into the Cartesian coordinate system can be shifted back to generate modified Cb/Cr values by adding back an offset of 0.5, as follows:

$$\widetilde{\Psi}_{C_0,q}^{Q,s,<g>} = \operatorname{clip3}(\tilde{\rho}_{C,q}^{Q,s,<g>} * \cos(\theta_{C,q}^{Q,s,<g>}) + 0.5, 0, 1) \quad (68\text{-}1)$$

$$\widetilde{\Psi}_{C_1,q}^{Q,s,<g>} = \operatorname{clip3}(\tilde{\rho}_{C,q}^{Q,s,<g>} * \sin(\theta_{C,q}^{Q,s,<g>}) + 0.5, 0, 1) \quad (68\text{-}2)$$

The modified Cb/Cr values in expressions (68) above can be used to form a plurality of modified 3DMT mapping pairs in the modified 3DMT, as follows:

$$v_q^{(B)} = [v_q^{y,(B)} \; v_q^{C_0,(B)} \; v_q^{C_1,(B)}]^T \quad (69\text{-}1)$$

$$\widetilde{\Psi}_q^{Q,s,<g>} = [\widetilde{\Psi}_{Y,q}^{Q,s,<g>} \widetilde{\Psi}_{C_0,q}^{Q,s,<g>} \widetilde{\Psi}_{C_1,q}^{Q,s,<g>}]^T \quad (69\text{-}2)$$

Block 2096 comprises constructing or generating first (e.g., MMR, TPB, etc.) coefficients for the global reshaping function from the plurality of (original) 3DMT mapping pairs as well as constructing or generating second (e.g., MMR, TPB, etc.) coefficients for the second global reshaping function from the plurality of modified 3DMT mapping pairs.

For example, based on the original 3DMT pairs built with original colors, the first coefficients can be constructed or generated with a design matrix $S^{C_x}$ and a vector $\bar{s}^{C_x,<g>}$, as follows:

$$S^{C_x} = \begin{bmatrix} B_0^{C_x}\!\left(v_0^{y,(B)}, v_0^{C_0,(B)}, v_0^{C_1,(B)}\right) & B_1^{C_x}\!\left(v_0^{y,(B)}, v_0^{C_0,(B)}, v_0^{C_1,(B)}\right) & \cdots & B_{D^{C_x}-1}^{C_x}\!\left(v_0^{y,(B)}, v_0^{C_0,(B)}, v_0^{C_1,(B)}\right) \\ B_0^{C_x}\!\left(v_1^{y,(B)}, v_1^{C_0,(B)}, v_1^{C_1,(B)}\right) & B_1^{C_x}\!\left(v_1^{y,(B)}, v_1^{C_0,(B)}, v_1^{C_1,(B)}\right) & \cdots & B_{D^{C_x}-1}^{C_x}\!\left(v_1^{y,(B)}, v_1^{C_0,(B)}, v_1^{C_1,(B)}\right) \\ \vdots & \vdots & & \vdots \\ B_0^{C_x}\!\left(v_{k-1}^{y,(B)}, v_{k-1}^{C_0,(B)}, v_{k-1}^{C_1,(B)}\right) & B_1^{C_x}\!\left(v_{k-1}^{y,(B)}, v_{k-1}^{C_0,(B)}, v_{k-1}^{C_1,(B)}\right) & \cdots & B_{D^{C_x}-1}^{C_x}\!\left(v_{k-1}^{y,(B)}, v_{k-1}^{C_0,(B)}, v_{k-1}^{C_1,(B)}\right) \end{bmatrix} \quad (70)$$

$$\bar{s}^{C_x,<g>} = \begin{bmatrix} \bar{\Psi}_{C_x,0}^{Q,s,<g>} \\ \bar{\Psi}_{C_x,1}^{Q,s,<g>} \\ \vdots \\ \bar{\Psi}_{C_x,k-1}^{Q,s,<g>} \end{bmatrix} \quad (71)$$

where $B_0^y(,,), \ldots, B_{D^y-1}^y(,,)$ represent MMR/TPB basis functions.

An optimized global reshaping solution or optimized values for the first coefficients (denoted as $\overline{m}^{C_x,<g>}$) can be obtained (e.g., in a closed form, etc.) via the least squared solution, as follows:

$$\overline{m}^{C_x,<g>} = ((S^{C_x})^T S^{C_x})^{-1}((S^{C_x})^T \overline{s}^{C_x,<g>}) \qquad (72)$$

The foregoing operations used to obtain the optimal values for the first coefficients $\overline{m}^{C_x,<g>}$ for the global reshaping function can be extended to obtain second coefficients (denoted as $\overline{\overline{m}}^{C_x,<g>}$) for the second global reshaping function In these extended operations, the vector $\overline{s}^Y$ in expression (24) for the global reshaping function can be replaced with a respective vector denoted as $\overline{\overline{s}}^{C_x,<g>}$ as follows:

$$\overline{\overline{s}}^{C_x,<g>} = \begin{bmatrix} \overline{\Psi}_{C_x,0}^{Q,s,<g>} \\ \overline{\Psi}_{C_x,1}^{Q,s,<g>} \\ \vdots \\ \overline{\Psi}_{C_x,k-1}^{Q,s,<g>} \end{bmatrix} \qquad (73)$$

An optimized local reshaping solution or optimized values for the second coefficients $\overline{\overline{m}}^{C_x,<g>}$, can be obtained (e.g., in a closed form, etc.) via the least squared solution, as follows:

$$\overline{\overline{m}}^{C_x,<g>} = ((S^{C_x})^T S^{C_x})^{-1}((S'^{C_x})^T \overline{\overline{s}}^{C_x,<g>}) \qquad (74)$$

Block 2098 comprises constructing (e.g., fused, MMR based, TPB based, etc.) local reshaping functions.

Given the two global reshaping functions as generated in block 2096, a first global reshaping function weighting factor denoted as $\theta_{<l>}^{C_x,G1}$ and second global reshaping function weighting factor denoted as $\theta_{<l>}^{C_x,G2}$ may be assigned to the first global reshaping function and the second global reshaping function, respectively. In some operational scenarios, the two weighting factors satisfy a constraint/condition as follows:

$$\theta_{<l>}^{C_x,G1} + \theta_{<l>}^{C_x,G2} = 1 \qquad (75)$$

Hence local reshaping as described herein may be performed using fused local reshaping functions generated by fusing the first coefficients for the global reshaping functions and the second coefficients for the second global reshaping functions as follows:

$$m_{<l>}^{C_x,<g>} = \theta_{<l>}^{C_x,G1} \overline{m}^{C_x,<g>} + \theta_{<l>}^{C_x,G2} \overline{\overline{m}}^{C_x,<g>} \qquad (76)$$

For the purpose of illustration only, mid L1 values predicted or estimated from 12-bit (offline) training input images are used as index values denoted as <g> in expressions (64) through (76) above. Given a bit depth of 12 bits, the index values <g> can be a value selected from a value range of [0, 4095]. Similarly, given a bit depth of 10 bits, the index values <g> can be a value selected from a value range of [0, 1023].

Likewise, mid L1 values predicted or estimated from 12-bit (e.g., actual, non-training, to-be-enhanced, online processed, etc.) input images are used as index values denoted as <l> in expressions (64) through (76) above. Given a bit depth of 12 bits, the index values <l> can be a value selected from a value range of [0, 4095]. Similarly, given a bit depth of 10 bits, the index values <l> can be a value selected from a value range of [0, 1023].

Memory space, volatile or non-volatile storage space, etc., used to store operational parameters such as MMR or TPB coefficients for each and every reshaping function/mapping of all possible combinations of index values <g> and/or <l> can be relatively large and expensive.

In some operational scenarios, only operational parameters such as MMR or TPB coefficients for a proper subset of (e.g., representative, etc.) index values in all the possible combination of index values <g> and/or <l> are computed or generated offline and stored/cached in memory space or storage. For example, the entire value range of all possible combinations can be partitioned or divided (e.g., by 16, 64, 128, 256, etc.) into a plurality of sub-ranges. A representative index value <g> or <l> is (e.g., evenly, at a specific position, every 16, every 64, every 128, every 256, etc.) selected for each sub-range in the plurality of sub-ranges. Operational parameters such as MMR or TPB coefficients { $\overline{m}^{C_x,<g>}$ } and { $\overline{\overline{m}}^{C_x,<g>}$ } for the representative index values <g> (and corresponding <l> values) are computed or generated offline and stored/cached in memory space or storage.

During a system bootup of an image processing system that is to perform local reshaping operations on input images, the operational parameters such as MMR or TPB coefficients { $\overline{m}^{C_x,<g>}$ } and { $\overline{\overline{m}}^{C_x,<g>}$ } for the representative index values <g> (and corresponding <l> values) are retrieved, loaded or otherwise made available.

At runtime, local reshaping as described herein can be performed on input images with any index values <l> in a relatively wide value range such as [0, 4095], [0, 1023], etc. For index values not covered by the pre-generated index values <g> (and corresponding <l> values), operational parameters such as MMR or TPB coefficients may not be readily available at the beginning of the system bootup from the memory space or storage. For an index value <l> not among the representative index values, interpolation operations may be performed after the available operational parameters such as MMR or TPB coefficients for (e.g., two closest, etc.) index values covered by the pre-generated index values <g> and/or <l> are retrieved, loaded or otherwise made available.

Figure 2T:
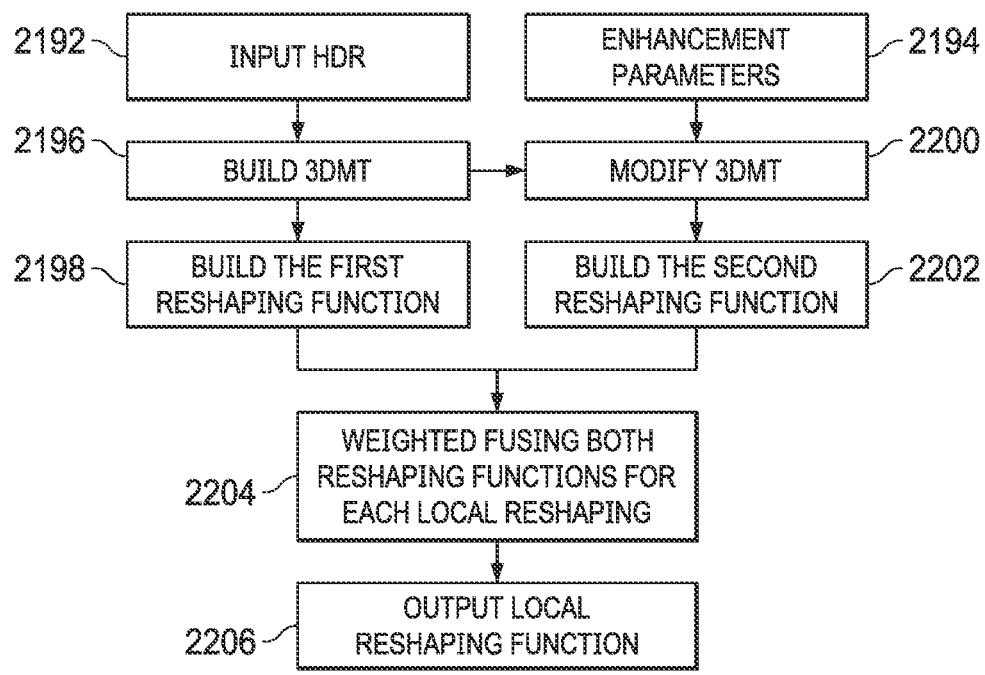

FIG. 2T illustrates an example flow for 3DMT based chroma local reshaping function or mapping generation. For the purpose of illustration, an MMR or TPB based chroma local reshaping function is to be generated to enhance local saturation of an input HDR image 2192. The chroma local reshaping function (or mapping) can be generated at least in part based on enhancement parameters 2194 such as $\delta_c$, $M_c$, $\beta$, $\theta_{<l>}^{C_x,G1}$ and $\theta_{<l>}^{C_x,G2}$ for effectuating local saturation changes and soft clipping.

Block 2196 comprises building a 3DMT using a 3D histogram with bins storing counts of HDR pixels in the input HDR image (2192) and averages of a corresponding input SDR image in an image pair formed by the input HDR image and the input SDR image.

In an example, the corresponding input SDR image may have been used (e.g., through previously performed content mapping, tone mapping and/or reshaping operations, etc.) to generate the HDR image (2192). In another example, the corresponding input SDR image may have been generated (e.g., through previously performed content mapping, tone mapping and/or reshaping operations, etc.) from the HDR image (2192).

Block 2198 comprises using the 3DMT to build a global chroma reshaping function. For example, first MMR or TPB coefficients may be generated to specify the global chroma reshaping function with a complete set of MMR terms or tensor product B-spline basis functions.

Block 2200 comprises using the enhancement parameters for local saturation changes $\delta_c$, $M_c$, $\beta$ to modify the 3DMT into a respective modified 3DMT comprising modified mapping pairs.

Block 2202 comprises using the modified 3DMT to build a second global chroma reshaping function. The second global chroma reshaping function can be fused with the first global reshaping function. For example, second MMR or TPB coefficients may be generated to specify the global reshaping function with the MMR terms or tensor product B-spline basis functions.

Block 2204 comprises using the enhancement parameters $\theta_{<I>}^{C_x,G1}$ and $\theta_{21\ I>}^{C_x,G2}$ to perform weighted fusing with both global chroma reshaping functions derived from the original and modified 3DMTs to generate a corresponding fused cross-channel local reshaping function. Block 2206 comprises outputting the (fused) cross-channel local reshaping function.

Similar to local luma reshaping, local chroma reshaping may use a guidance image with index values to identify specific local chroma reshaping functions/mappings for specific input pixels of an input image. There are multiple different ways to construct the guidance image for the local chroma reshaping. In a first example, the guidance image may be a luma independent guidance image constructed based on chroma codewords in the input image or a saturation image computed from the input image. In a second example, the guidance image may be constructed based on luma and chroma codewords in the input image. In a third example, the same guidance image for local luma reshaping can be used as or to derive the guidance image for local chroma reshaping. Depending on a color sampling format such as 444 or 420, the guidance image for the local luma reshaping can be downsampled as appropriate to fit a chroma channel image size. In many operational scenarios, the luma guidance image can be reused for chroma reshaping while still providing a better look including enhanced local saturation in a locally reshaped image without introducing visual artifacts.

Example Process Flows

Figure 4:
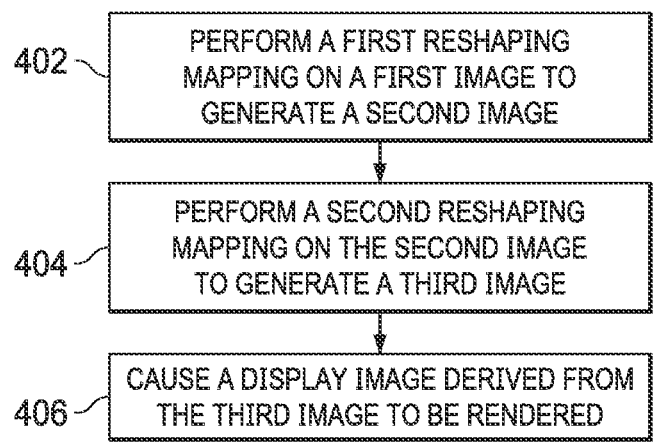
FIG. 4 illustrates an example process flow.

FIG. 4 illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 402, an image processing system performs a first reshaping mapping on a first image represented in a first domain to generate a second image represented in a second domain. The first domain is of a first dynamic range different from a second dynamic range of which the second domain is.

In block 404, the image processing system performs a second reshaping mapping on the second image represented in the second domain to generate a third image represented in the first domain. The third image is perceptually different from the first image in at least one of: global contrast, global saturation, local contrast, local saturation, etc.

In block 406, the image processing system causes a display image derived from the third image to be rendered on a display device.

In an embodiment, the first reshaping mapping and the second reshaping mapping form one of: (a) a combination a global forward reshaping mapping and a global backward reshaping mapping; (b) a combination of a global backward reshaping mapping and a global forward reshaping mapping; (c) a combination a global forward reshaping mapping and a local backward reshaping mapping; (d) a combination a global backward reshaping mapping and a local forward reshaping mapping; (e) a combination of a local backward reshaping mapping and a global forward reshaping mapping; (f) a combination of a local forward reshaping mapping and a global backward reshaping mapping; (g) a combination a local forward reshaping mapping and a local backward reshaping mapping; (h) a combination of a local backward reshaping mapping and a local forward reshaping mapping; etc.

In an embodiment, the first dynamic range for the first image and the second dynamic range for the second image form one of: a combination of a high dynamic range (HDR) for the first image and a standard dynamic range (SDR) for the second image; a combination of an SDR for the first image and an HDR for the second image; etc.

In an embodiment, an encoded image is generated from a third reshaping mapping performed on the second image; the encoded image is encoded in a video signal received by a recipient device; the recipient device generates the display image from a decoded version of the encoded image received with the video signal.

In an embodiment, the first image represented in the first domain is generated and uploaded by a mobile device.

In an embodiment, at least one of the first reshaping mapping and the second reshaping mapping includes a luma local reshaping mapping.

In an embodiment, the luma local reshaping mapping represents one of: (a) a single-channel luma local reshaping mapping that generates, independent of input chroma codewords, output luma codewords from input luma codewords; (b) a cross-channel luma local reshaping mapping that generates output luma codewords from both input luma codewords and input chroma codewords; etc.

In an embodiment, the luma local reshaping mapping represents the cross-channel luma local reshaping mapping; the cross-channel luma local reshaping mapping is generated by fusing a cross-channel luma global reshaping mapping and a pre-fusing cross-channel luma local reshaping mapping; the cross-channel luma global reshaping is generated using a three-dimensional mapping table (3DMT) computed using codewords in an image pair; the pre-fusing cross-channel luma local reshaping mapping is generated using a modified 3DMT derived from modifying the 3DMT with a local contrast enhancement function.

In an embodiment, at least one of the first reshaping mapping and the second reshaping mapping includes a chroma local reshaping mapping.

In an embodiment, the chroma local reshaping mapping represents one of: (a) a cross-channel MMR chroma local reshaping mapping that generates output chroma codewords from input luma codewords and input chroma codewords; (b) a cross-channel TPB chroma local reshaping mapping that generates output chroma codewords from both input luma codewords and input chroma codewords; etc.

In an embodiment, the chroma local reshaping mapping is generated by fusing a first cross-channel chroma global reshaping mapping and a second cross-channel chroma global reshaping mapping; the first cross-channel chroma global reshaping is generated using a three-dimensional mapping table (3DMT) computed using codewords in an image pair; the second cross-channel chroma global reshaping mapping is generated using a modified 3DMT derived from modifying the 3DMT with a saturation enhancement function.

In an embodiment, image filtering is applied to at least one of the first image, the second image or an image derived from the second image with a noise-injected guidance image to reduce banding artifacts; the noise guidance image comprise per-pixel noise-injected local reshaping function indexes; a filtered image comprises codewords generated from the image filtering with the noise-injected guidance image; the codewords in the filtered image are applied with further noise injection to generate noise injected codewords.

In an embodiment, the second image is received by a video encoder as an input image in a sequence of input images; the sequence of input images as received by the video encoder is encoded by the video encoder into a video signal.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the inventio comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
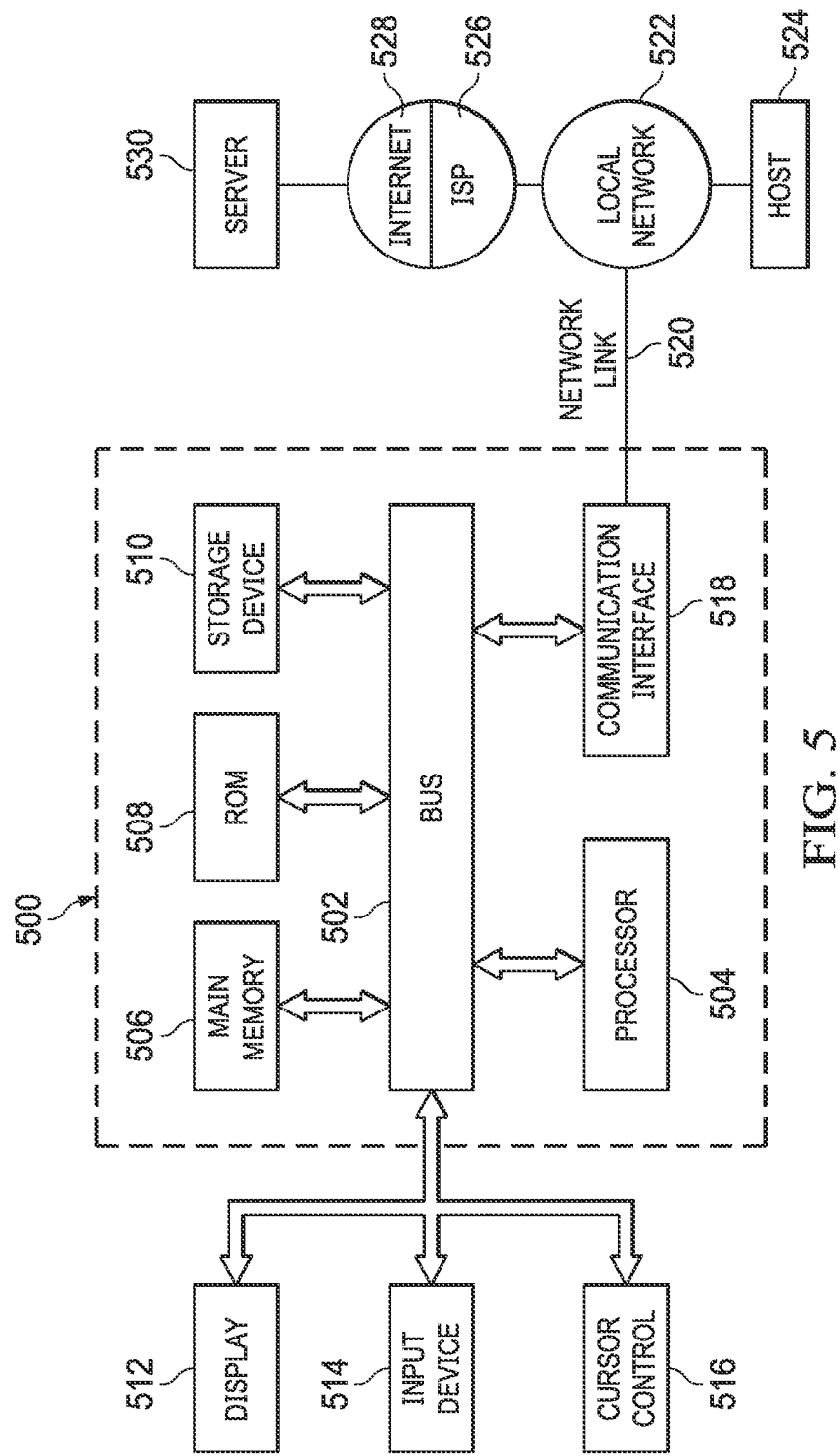
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Exemplary Embodiments

The invention may be embodied in any of the forms described herein, including, but not limited to the following Enumerated Example Embodiments (EEEs) which describe structure, features, and functionality of some portions of embodiments of the present invention.

EEE1. A method for enhancing images, comprising:
performing a first reshaping mapping on a first image represented in a first domain to generate a second image represented in a second domain, wherein the first domain is of a first dynamic range different from a second dynamic range of which the second domain is;

performing a second reshaping mapping on the second image represented in the second domain to generate a third image represented in the first domain, wherein the third image is perceptually different from the first image in at least one of: global contrast, global saturation, local contrast, or local saturation;

causing a display image derived from the third image to be rendered on a display device.

EEE2. The method of EEE1, wherein the first reshaping mapping and the second reshaping mapping form one of: (a) a combination a global forward reshaping mapping and a global backward reshaping mapping; (b) a combination of a global backward reshaping mapping and a global forward reshaping mapping; (c) a combination a global forward reshaping mapping and a local backward reshaping mapping; (d) a combination a global backward reshaping mapping and a local forward reshaping mapping; (e) a combination of a local backward reshaping mapping and a global forward reshaping mapping; (f) a combination of a local forward reshaping mapping and a global backward reshaping mapping; (g) a combination a local forward reshaping mapping and a local backward reshaping mapping; or (h) a combination of a local backward reshaping mapping and a local forward reshaping mapping.

EEE3. The method of EEE1 or EEE2, wherein the first dynamic range for the first image and the second dynamic range for the second image form one of: a combination of a high dynamic range (HDR) for the first image and a standard dynamic range (SDR) for the second image; or a combination of an SDR for the first image and an HDR for the second image.

EEE4. The method of any of EEE1-EEE3, wherein an encoded image is generated from a third reshaping mapping performed on the second image, wherein the encoded image is encoded in a video signal received by a recipient device, wherein the recipient device generates the display image from a decoded version of the encoded image received with the video signal.

EEE5. The method of any of EEE1-EEE4, wherein the first image represented in the first domain is generated and uploaded by a mobile device.

EEE6. The method of any of EEE1-EEE5, wherein at least one of the first reshaping mapping and the second reshaping mapping includes a luma local reshaping mapping.

EEE7. The method of EEE6, wherein the luma local reshaping mapping represents one of: (a) a single-channel luma local reshaping mapping that generates, independent of input chroma codewords, output luma codewords from input luma codewords; or (b) a cross-channel luma local reshaping mapping that generates output luma codewords from both input luma codewords and input chroma codewords.

EEE8. The method of EEE7, wherein the luma local reshaping mapping represents the cross-channel luma local reshaping mapping; wherein the cross-channel luma local reshaping mapping is generated by fusing a cross-channel luma global reshaping mapping and a pre-fusing cross-channel luma local reshaping mapping; wherein the cross-channel luma global reshaping is generated using a three-dimensional mapping table (3DMT) computed using codewords in an image pair; wherein the pre-fusing cross-channel luma local reshaping mapping is generated using a modified 3DMT derived from modifying the 3DMT with a local contrast enhancement function.

EEE9. The method of any of EEE1-EEE8, wherein at least one of the first reshaping mapping and the second reshaping mapping includes a chroma local reshaping mapping.

EEE10. The method of EEE9, wherein the chroma local reshaping mapping represents one of: (a) a cross-channel multivariate multiple regression (MMR) chroma local reshaping mapping that generates output chroma codewords from input luma codewords and input chroma codewords; or (b) a cross-channel tensor product B-spline (TPB) chroma local reshaping mapping that generates output chroma codewords from both input luma codewords and input chroma codewords.

EEE11. The method of EEE9 or EEE10, wherein the chroma local reshaping mapping is generated by fusing a first cross-channel chroma global reshaping mapping and a second cross-channel chroma global reshaping mapping; wherein the first cross-channel chroma global reshaping is generated using a three-dimensional mapping table (3DMT) computed using codewords in an image pair; wherein the second cross-channel chroma global reshaping mapping is generated using a modified 3DMT derived from modifying the 3DMT with a local saturation enhancement function.

EEE12. The method of any of EEE1-EEE11, wherein image filtering is applied to at least one of the first image, the second image or an image derived from the second image with a noise-injected guidance image to reduce banding artifacts; wherein the noise guidance image comprise per-pixel noise-injected local reshaping function indexes; wherein a filtered image comprises codewords generated from the image filtering with the noise-injected guidance image; wherein the codewords in the filtered image are applied with further noise injection to generate noise injected codewords.

EEE13. The method of any of EEE1-EEE12, wherein the second image is received by a video encoder as an input image in a sequence of input images; wherein the sequence of input images as received by the video encoder is encoded by the video encoder into a video signal.

EEE14. A method for enhancing images, comprising:
building a three-dimensional mapping table (3DMT) from one or more first images encoded with first codewords in a first codeword space and one or more second images encoded with second codewords in a second codeword space, wherein the one or more first images correspond to the one or more second images, wherein the first codeword space is partitioned into a plurality of bins, wherein the 3DMT stores a plurality of mapping pairs each of which corresponds to a respective bin in the plurality of bins and includes (a) a count of first codewords, in the one or more first images, located in the respective bin and (b) an average second luma codeword value of second codewords, in the one or more second images, to which the first codewords correspond;

applying a local contrast enhancement operation to the average second luma codeword value in each mapping pair in the plurality of mapping pairs to geneate a modified 3DMT;

generating a global luma reshaping function from the 3DMT and a local luma reshaping function from the modified 3DMT;

generating a final local luma reshaping function from the global luma reshaping function and the local luma reshaping function;

applying the final local luma reshaping function to an input image to generate a local contrast enhanced image, wherein a display image is derived from the local contrast enhanced image and rendered on a display device.

EEE14. A method for enhancing images, comprising:
building a three-dimensional mapping table (3DMT) from one or more first images encoded with first codewords in a first codeword space and one or more second images encoded with second codewords in a second codeword space, wherein the one or more first images correspond to the one or more second images, wherein the first codeword space is partitioned into a plurality of bins, wherein the 3DMT stores a plurality of mapping pairs each of which corresponds to a respective bin in the plurality of bins and includes (a) a count of first codewords, in the one or more first images, located in the respective bin and (b) average chroma codeword values of second codewords, in the one or more second images, to which the first codewords correspond;
applying one or more local saturation enhancement operations to the average chroma codeword values in each mapping pair in the plurality of mapping pairs to generate a modified 3DMT;
generating, for each chroma channel, a global chroma reshaping function from the 3DMT and a second global chroma reshaping function from the modified 3DMT;
generating, for each chroma channel, a final local luma reshaping function from the global chroma reshaping function and the second global chroma reshaping function;
applying, for each channel, the final local chroma reshaping function to an input image to generate a local saturation enhanced image, wherein a display image is derived from the local saturation enhanced image and rendered on a display device.

EEE15. The method of any of EEE1-EEE14, wherein the image filtering represents guided image filtering applied with a guided image; wherein the guided image includes high frequency feature values computed for a plurality of pixel locations as respectively weighted by inverses of image gradients computed for the plurality of pixel locations in one of one or more channels of the guided image.

EEE16. The method of any of EEE1-EEE15, wherein the guided image includes guided image values derived based at least in part on a set of halo reduction operational parameters; the method further comprising:
for each image pair among a plurality of image pairs, computing, with a plurality of sets of candidate values for the set of the halo reduction operational parameters, a region-based texture measure in a local foreground area among one or more local foreground areas as a ratio of variances of a training image of the first dynamic range and a corresponding training image of the second dynamic range in the image pair, wherein the one or more local foreground areas are sampled from a foreground mask identified in the training image of the first dynamic range in the image pair;
for each image pair among the plurality of image pairs, computing, with the plurality of sets of candidate values for the set of the halo reduction operational parameters, a halo measure in a local halo artifact area among one or more local halo artifact areas as a correlation coefficient between a training image of the first dynamic range and a corresponding training image of the second dynamic range in the image pair, wherein the one or more local halo artifact areas are sampled from a halo mask identified in the corresponding training image of the second dynamic range;
computing, for the plurality of sets of candidate values for the set of halo reduction operational parameters, respective weighted sums of (a) all region-based texture measures for all local foreground areas sampled from foreground masks identified in training images of the first dynamic range in the plurality of image pairs and (b) all halo measures for all local halo artifact areas sampled from halo masks identified in corresponding training images of the second dynamic range in the plurality of image pairs;
determining a set of optimized values for the set of halo reduction operational parameters, wherein the set of optimized values is used to generate a minimized weighted sum of (a) all the region-based texture measures for all the local foreground areas sampled from the foreground masks identified in the training images of the first dynamic range in the plurality of image pairs and (b) all the halo measures for all the local halo artifact areas sampled from the halo masks identified in the corresponding training images of the second dynamic range in the plurality of image pairs;
applying the image filtering in multiple spatial kernel size levels to the input image with the set of optimized values for the set of halo reduction operational parameters.

EEE16. A computer system configured to perform any one of the methods recited in EEE1-EEE15.

EEE17. An apparatus comprising a processor and configured to perform any one of the methods recited in EEE1-EEE15.

EEE18. A non-transitory computer-readable storage medium having stored thereon computer-executable instruction for executing a method in accordance with any of the methods recited in EEE1-EEE15.

The invention claimed is:
1. A method for enhancing images, comprising:
performing a first reshaping mapping on a first image represented in a first domain to generate a second image represented in a second domain, wherein the first domain is of a first dynamic range different from a second dynamic range of which the second domain is;
performing a second reshaping mapping on the second image represented in the second domain to generate a third image represented in the first domain, wherein the third image is different from the first image in at least one of: global contrast, global saturation, local contrast, or local saturation, wherein a difference in at least one of global contrast and global saturation is caused by at least one of a first and second reshaping mapping that is represented by the same function applied to all pixels of the respective image, and wherein a difference in at least one of local contrast and local saturation is caused by at least one of a first and second reshaping mapping that is represented by a function that can be selected at a pixel level of the respective image, wherein at least one of the first reshaping mapping and the second reshaping mapping includes a luma local reshaping mapping; wherein the luma local reshaping mapping represents a cross-channel luma local reshaping mapping that generates output luma codewords from both input luma codewords and input chroma codewords; wherein the cross-channel luma local reshaping mapping is generated by fusing a cross-channel luma global reshaping mapping and a cross-channel luma local reshaping mapping prior to fusing; wherein fusing the cross-channel luma global reshaping mapping and the cross-channel luma local reshaping mapping prior to fusing comprises calculating a linear combination of the cross-channel luma global reshaping mapping and the cross-channel luma local reshaping mapping prior to fusing; wherein the cross-channel luma global reshaping is generated using a three-dimensional mapping table (3DMT) computed using codewords in an image pair represented by the first and second images; wherein the cross-channel luma local reshaping mapping prior to fusing is generated using a modified 3DMT derived from modifying the 3DMT with a local contrast enhancement function; and causing a display image derived from the third image to be rendered on a display device.

2. The method of claim 1, further comprising:
building the three-dimensional mapping table (3DMT) from one or more first images encoded with first codewords in a first codeword space and one or more second images encoded with second codewords in a second codeword space, wherein the one or more first images correspond to the one or more second images, wherein the first codeword space is partitioned into a plurality of bins, wherein the 3DMT stores a plurality of mapping pairs each of which corresponds to a respective bin in the plurality of bins and includes (a) a count of first codewords, in the one or more first images, located in the respective bin and (b) an average second luma codeword value of second codewords, in the one or more second images, to which the first codewords correspond.

3. The method of claim 1, wherein at least one of the first reshaping mapping and the second reshaping mapping includes a chroma local reshaping mapping wherein the chroma local reshaping mapping is generated by fusing a first cross-channel chroma global reshaping mapping and a second cross-channel chroma global reshaping mapping; wherein fusing the first cross-channel chroma global reshaping mapping and the second cross-channel chroma global reshaping mapping comprises calculating a linear combination of the first cross-channel chroma global reshaping mapping and the second cross-channel chroma global reshaping mapping; wherein the first cross-channel chroma global reshaping is generated using a three-dimensional mapping table (3DMT) computed using codewords in an image pair represented by the first and second images; wherein the second cross-channel chroma global reshaping mapping is generated using a modified 3DMT derived from modifying the 3DMT with a local saturation enhancement function.

4. The method of claim 3, further comprising:
building a three-dimensional mapping table (3DMT) from one or more first images encoded with first codewords in a first codeword space and one or more second images encoded with second codewords in a second codeword space, wherein the one or more first images correspond to the one or more second images, wherein the first codeword space is partitioned into a plurality of bins, wherein the 3DMT stores a plurality of mapping pairs each of which corresponds to a respective bin in the plurality of bins and includes (a) a count of first codewords, in the one or more first images, located in the respective bin and (b) average chroma codeword values of second codewords, in the one or more second images, to which the first codewords correspond.

5. The method of claim 3, wherein the chroma local reshaping mapping represents one of: (a) a cross-channel multivariate multiple regression (MMR) chroma local reshaping mapping that generates output chroma codewords from input luma codewords and input chroma codewords; or (b) a cross-channel tensor product B-spline (TPB) chroma local reshaping mapping that generates output chroma codewords from both input luma codewords and input chroma codewords.

6. The method of claim 1, wherein at least one of the first reshaping mapping and the second reshaping mapping includes a luma local reshaping mapping; wherein the luma local reshaping mapping represents a single-channel luma local reshaping mapping that generates, independent of input chroma codewords, output luma codewords from input luma codewords.

7. The method of claim 1, wherein the first reshaping mapping and the second reshaping mapping form one of: (a) a combination of a global forward reshaping mapping and a global backward reshaping mapping; (b) a combination of a global backward reshaping mapping and a global forward reshaping mapping; (c) a combination of a global forward reshaping mapping and a local backward reshaping mapping; (d) a combination of a global backward reshaping mapping and a local forward reshaping mapping; (e) a combination of a local backward reshaping mapping and a global forward reshaping mapping; (f) a combination of a local forward reshaping mapping and a global backward reshaping mapping; (g) a combination of a local forward reshaping mapping and a local backward reshaping mapping; or (h) a combination of a local backward reshaping mapping and a local forward reshaping mapping.

8. The method of claim 1, wherein the first dynamic range for the first image and the second dynamic range for the second image form one of: a combination of a high dynamic range (HDR) for the first image and a standard dynamic range (SDR) for the second image; or a combination of an SDR for the first image and an HDR for the second image.

9. The method of claim 1, wherein an encoded image is generated from a third reshaping mapping performed on the second image, wherein the encoded image is encoded in a video signal received by a recipient device, wherein the recipient device generates the display image from a decoded version of the encoded image received with the video signal.

10. The method of claim 1, wherein the first image represented in the first domain is generated and uploaded by a mobile device.

11. The method of claim 1, wherein image filtering is applied to at least one of the first image, the second image or an image derived from the second image with a noise-injected guidance image to reduce banding artifacts; wherein image filtering comprises generating a guided image from the image to be filtered, the guided image providing local reshaping function index values for pixels of the image to be filtered; wherein the noise-injected guidance image is calculated from the guided image and comprise per-pixel noise-injected local reshaping function indexes; wherein a filtered image comprises codewords generated from the image filtering with the noise-injected guidance image; wherein the codewords in the filtered image are applied with further noise injection to generate noise injected codewords.

12. The method of claim 1, wherein the second image is received by a video encoder as an input image in a sequence of input images; wherein the sequence of input images as received by the video encoder is encoded by the video encoder into a video signal.

13. An apparatus comprising one or more processors and configured to perform the method recited in claim 1.

14. A non-transitory computer-readable storage medium having stored thereon computer-executable instruction for executing a method with one or more processors in accordance with the method recited in claim 1.

* * * * *